United States Patent
Palanki

(10) Patent No.: US 9,036,538 B2
(45) Date of Patent: May 19, 2015

(54) FREQUENCY HOPPING DESIGN FOR SINGLE CARRIER FDMA SYSTEMS

(75) Inventor: Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1346 days.

(21) Appl. No.: 11/209,246

(22) Filed: Aug. 22, 2005

(65) Prior Publication Data

US 2006/0233124 A1    Oct. 19, 2006

Related U.S. Application Data

(60) Provisional application No. 60/672,575, filed on Apr. 19, 2005, provisional application No. 60/691,755, filed on Jun. 16, 2005.

(51) Int. Cl.
*H04W 4/00* (2009.01)
*H04B 1/7143* (2011.01)
*H04L 27/26* (2006.01)

(52) U.S. Cl.
CPC .......... *H04B 1/7143* (2013.01); *H04L 27/2608* (2013.01)

(58) Field of Classification Search
USPC .......... 375/132, 260, 340; 370/347, 256, 319, 370/337, 480, 478, 329, 341; 455/450, 434
See application file for complete search history.

(56) References Cited

U.S. PATENT DOCUMENTS

| | | |
|---|---|---|
| 4,393,276 A | 7/1983 | Steele |
| 4,554,668 A | 11/1985 | Deman et al. |
| 4,747,137 A | 5/1988 | Matsunaga |
| 4,783,779 A | 11/1988 | Takahata et al. |
| 4,783,780 A | 11/1988 | Alexis |
| 4,975,952 A | 12/1990 | Mabey et al. |
| 5,008,900 A | 4/1991 | Critchlow et al. |
| 5,115,248 A | 5/1992 | Roederer et al. |
| 5,268,694 A | 12/1993 | Jan et al. |

(Continued)

FOREIGN PATENT DOCUMENTS

| | | |
|---|---|---|
| CA | 2348137 | 11/2001 |
| CA | 2477536 | 9/2003 |

(Continued)

OTHER PUBLICATIONS

Bahai, Saltzberg, "System Architecture," Multi-Carrier Digital Communications, Kluwer Academic, New York, NY, XP-002199501, 1999, pp. 17-21.

(Continued)

*Primary Examiner* — Shahriar Behnamian
(74) *Attorney, Agent, or Firm* — Peng Zhu

(57) ABSTRACT

Systems and methodologies are described that facilitate frequency hopping in a single carrier FDMA wireless environment by dynamically altering user offsets with time to obtain interference diversity. A channel tree can be utilized with nodes that are assigned values. User devices can be assigned to such nodes, a path between an assigned node and a root node in the channel tree can be evaluated, and a table lookup can be performed to determine an identity of a subcarrier set to assign to the user device assigned to a given node, as well as a number of subcarriers to be assigned to the user device. Additionally, node values can be dynamically varied during a communication event to alter path values and thus alter subcarrier set assignments.

82 Claims, 13 Drawing Sheets

(56) References Cited

U.S. PATENT DOCUMENTS

| | | |
|---|---|---|
| 5,282,222 A | 1/1994 | Fattouche et al. |
| 5,363,408 A | 11/1994 | Paik et al. |
| 5,371,761 A | 12/1994 | Daffara et al. |
| 5,384,810 A | 1/1995 | Amrany |
| 5,406,551 A | 4/1995 | Saito et al. |
| 5,410,538 A | 4/1995 | Roche et al. |
| 5,455,839 A | 10/1995 | Eyuboglu |
| 5,465,253 A | 11/1995 | Rahnema |
| 5,491,727 A | 2/1996 | Petit |
| 5,513,379 A | 4/1996 | Benveniste et al. |
| 5,539,748 A | 7/1996 | Raith et al. |
| 5,548,582 A | 8/1996 | Brajal et al. |
| 5,553,069 A | 9/1996 | Ueno et al. |
| 5,583,869 A | 12/1996 | Grube et al. |
| 5,594,738 A | 1/1997 | Crisler et al. |
| 5,604,744 A | 2/1997 | Andersson et al. |
| 5,612,978 A | 3/1997 | Blanchard et al. |
| 5,625,876 A | 4/1997 | Gilhousen et al. |
| 5,684,491 A | 11/1997 | Newman et al. |
| 5,726,978 A | 3/1998 | Frodigh et al. |
| 5,732,113 A | 3/1998 | Schmidl et al. |
| 5,745,487 A | 4/1998 | Hamaki |
| 5,768,276 A | 6/1998 | Diachina et al. |
| 5,790,537 A | 8/1998 | Yoon et al. |
| 5,812,938 A | 9/1998 | Gilhousen et al. |
| 5,815,488 A | 9/1998 | Williams et al. |
| 5,822,368 A | 10/1998 | Wang |
| 5,828,650 A | 10/1998 | Malkamaki et al. |
| 5,838,268 A | 11/1998 | Frenkel |
| 5,867,478 A | 2/1999 | Baum et al. |
| 5,870,393 A | 2/1999 | Yano et al. |
| 5,887,023 A | 3/1999 | Mabuchi |
| 5,907,585 A | 5/1999 | Suzuki et al. |
| 5,920,571 A | 7/1999 | Houck et al. |
| 5,926,470 A | 7/1999 | Tiedemann, Jr. et al. |
| 5,933,421 A | 8/1999 | Alamouti et al. |
| 5,949,814 A | 9/1999 | Odenwalder et al. |
| 5,953,325 A | 9/1999 | Willars et al. |
| 5,955,992 A | 9/1999 | Shattil |
| 5,956,642 A | 9/1999 | Larsson et al. |
| 5,995,992 A | 11/1999 | Eckard et al. |
| 5,999,826 A | 12/1999 | Whinnett |
| 6,002,942 A | 12/1999 | Park et al. |
| 6,016,123 A | 1/2000 | Barton et al. |
| 6,038,150 A | 3/2000 | Yee et al. |
| 6,038,263 A | 3/2000 | Kotzin et al. |
| 6,038,450 A | 3/2000 | Brink et al. |
| 6,052,364 A | 4/2000 | Chalmers et al. |
| 6,061,337 A | 5/2000 | Light et al. |
| 6,067,315 A | 5/2000 | Sandin |
| 6,075,350 A | 6/2000 | Peng et al. |
| 6,075,797 A | 6/2000 | Thomas |
| 6,076,114 A | 6/2000 | Wesley et al. |
| 6,088,345 A | 7/2000 | Sakoda et al. |
| 6,088,592 A | 7/2000 | Doner et al. |
| 6,108,323 A | 8/2000 | Gray et al. |
| 6,108,550 A | 8/2000 | Wiorek et al. |
| 6,112,094 A | 8/2000 | Dent |
| 6,128,776 A | 10/2000 | Kang et al. |
| 6,138,037 A | 10/2000 | Jaamies |
| 6,141,317 A | 10/2000 | Marchok et al. |
| 6,154,484 A | 11/2000 | Lee et al. |
| 6,169,910 B1 | 1/2001 | Tamil et al. |
| 6,172,993 B1 | 1/2001 | Kim et al. |
| 6,175,550 B1 | 1/2001 | van Nee |
| 6,175,650 B1 | 1/2001 | Sindhu et al. |
| 6,176,550 B1 | 1/2001 | Lamart et al. |
| 6,198,775 B1 | 3/2001 | Khayrallah et al. |
| 6,215,983 B1 | 4/2001 | Dogan et al. |
| 6,226,280 B1 | 5/2001 | Roark et al. |
| 6,232,918 B1 | 5/2001 | Wax et al. |
| 6,240,129 B1 | 5/2001 | Reusens et al. |
| 6,249,683 B1 | 6/2001 | Lundby et al. |
| 6,256,478 B1 | 7/2001 | Allen et al. |
| 6,271,946 B1 | 8/2001 | Chang et al. |
| 6,272,122 B1 | 8/2001 | Wee et al. |
| 6,310,704 B1 | 10/2001 | Dogan et al. |
| 6,317,435 B1 | 11/2001 | Tiedemann, Jr. et al. |
| 6,335,922 B1 | 1/2002 | Tiedemann, Jr. et al. |
| 6,337,659 B1 | 1/2002 | Kim et al. |
| 6,337,983 B1 | 1/2002 | Bonta et al. |
| 6,353,637 B1 | 3/2002 | Mansour et al. |
| 6,363,060 B1 | 3/2002 | Sarkar |
| 6,374,115 B1 | 4/2002 | Barnes et al. |
| 6,377,539 B1 | 4/2002 | Kang et al. |
| 6,377,809 B1 | 4/2002 | Rezaiifar et al. |
| 6,388,998 B1 | 5/2002 | Kasturia |
| 6,393,008 B1 | 5/2002 | Cheng et al. |
| 6,393,012 B1 | 5/2002 | Pankaj |
| 6,401,062 B1 | 6/2002 | Murashima |
| 6,438,369 B1 | 8/2002 | Huang et al. |
| 6,449,246 B1 | 9/2002 | Barton et al. |
| 6,466,800 B1 | 10/2002 | Sydon et al. |
| 6,473,467 B1 | 10/2002 | Wallace et al. |
| 6,477,317 B1 | 11/2002 | Itokawa |
| 6,478,422 B1 | 11/2002 | Hansen |
| 6,483,820 B1 | 11/2002 | Davidson et al. |
| 6,487,243 B1 | 11/2002 | Hwang et al. |
| 6,496,790 B1 | 12/2002 | Kathavate et al. |
| 6,501,810 B1 | 12/2002 | Karim et al. |
| 6,507,601 B2 | 1/2003 | Parsa et al. |
| 6,519,462 B1 | 2/2003 | Lu et al. |
| 6,529,525 B1 | 3/2003 | Pecen et al. |
| 6,535,666 B1 | 3/2003 | Dogan et al. |
| 6,539,008 B1 | 3/2003 | Ahn et al. |
| 6,539,213 B1 | 3/2003 | Richards et al. |
| 6,542,485 B1 | 4/2003 | Mujtaba et al. |
| 6,542,743 B1 | 4/2003 | Soliman |
| 6,563,806 B1 | 5/2003 | Yano et al. |
| 6,563,881 B1 | 5/2003 | Sakoda et al. |
| 6,577,739 B1 | 6/2003 | Hurting et al. |
| 6,584,140 B1 | 6/2003 | Lee |
| 6,590,881 B1 | 7/2003 | Wallace et al. |
| 6,597,746 B1 | 7/2003 | Amrany et al. |
| 6,601,206 B1 | 7/2003 | Marvasti |
| 6,614,857 B1 | 9/2003 | Buehrer et al. |
| 6,625,172 B2 | 9/2003 | Odenwalder et al. |
| 6,636,568 B2 | 10/2003 | Kadous |
| 6,654,339 B1 | 11/2003 | Bohnke et al. |
| 6,654,431 B1 | 11/2003 | Barton et al. |
| 6,657,949 B1 | 12/2003 | Jones, IV et al. |
| 6,658,258 B1 | 12/2003 | Chen et al. |
| 6,674,787 B1 | 1/2004 | Dick et al. |
| 6,674,810 B1 | 1/2004 | Cheng |
| 6,675,012 B2 | 1/2004 | Gray et al. |
| 6,678,318 B1 | 1/2004 | Lai |
| 6,690,951 B1 | 2/2004 | Cuffaro et al. |
| 6,693,952 B1 | 2/2004 | Chuah et al. |
| 6,701,165 B1 | 3/2004 | Ho et al. |
| 6,704,571 B1 | 3/2004 | Moon |
| 6,711,400 B1 | 3/2004 | Aura |
| 6,717,908 B2 | 4/2004 | Vijayan et al. |
| 6,721,568 B1 | 4/2004 | Gustavsson et al. |
| 6,724,719 B1 | 4/2004 | Tong et al. |
| 6,731,602 B1 | 5/2004 | Watanabe et al. |
| 6,735,244 B1 | 5/2004 | Hasegawa et al. |
| 6,744,743 B2 | 6/2004 | Walton et al. |
| 6,748,220 B1 | 6/2004 | Chow et al. |
| 6,751,444 B1 | 6/2004 | Meiyappan |
| 6,751,456 B2 | 6/2004 | Bilgic et al. |
| 6,754,511 B1 | 6/2004 | Halford et al. |
| 6,763,009 B1 | 7/2004 | Bedekar et al. |
| 6,765,969 B1 | 7/2004 | Vook et al. |
| 6,776,165 B2 | 8/2004 | Jin et al. |
| 6,776,765 B2 | 8/2004 | Soukup et al. |
| 6,778,513 B2 | 8/2004 | Kasapi et al. |
| 6,785,341 B2 | 8/2004 | Walton et al. |
| 6,798,736 B1 | 9/2004 | Black et al. |
| 6,799,043 B2 | 9/2004 | Tiedemann, Jr. et al. |
| 6,802,035 B2 | 10/2004 | Catreux et al. |
| 6,804,307 B1 | 10/2004 | Popovic |
| 6,813,284 B2 | 11/2004 | Vayanos et al. |
| 6,821,535 B2 | 11/2004 | Nurmi et al. |
| 6,828,293 B1 | 12/2004 | Hazenkamp et al. |

(56) References Cited

U.S. PATENT DOCUMENTS

| | | | |
|---|---|---|---|
| 6,829,293 | B2 | 12/2004 | Jones et al. |
| 6,831,943 | B1 | 12/2004 | Dabak et al. |
| 6,842,487 | B1 | 1/2005 | Larsson |
| 6,850,481 | B2 | 2/2005 | Wu et al. |
| 6,850,509 | B2 | 2/2005 | Lee et al. |
| 6,862,271 | B2 | 3/2005 | Medvedev et al. |
| 6,870,808 | B1 | 3/2005 | Liu et al. |
| 6,870,826 | B1 | 3/2005 | Ishizu |
| 6,904,097 | B2 | 6/2005 | Agami et al. |
| 6,904,283 | B2 | 6/2005 | Li et al. |
| 6,904,550 | B2 | 6/2005 | Sibecas et al. |
| 6,907,020 | B2 | 6/2005 | Periyalwar et al. |
| 6,907,269 | B2 | 6/2005 | Yamaguchi et al. |
| 6,909,707 | B2 | 6/2005 | Rotstein et al. |
| 6,909,797 | B2 | 6/2005 | Romsdahl et al. |
| 6,917,602 | B2 | 7/2005 | Toskala et al. |
| 6,917,821 | B2 | 7/2005 | Kadous et al. |
| 6,927,728 | B2 | 8/2005 | Vook et al. |
| 6,928,047 | B1 | 8/2005 | Xia |
| 6,934,266 | B2 | 8/2005 | Dulin et al. |
| 6,934,275 | B1 | 8/2005 | Love et al. |
| 6,934,340 | B1 | 8/2005 | Dollard et al. |
| 6,940,842 | B2 | 9/2005 | Proctor, Jr. |
| 6,940,845 | B2 | 9/2005 | Benveniste et al. |
| 6,954,448 | B2 | 10/2005 | Farley et al. |
| 6,954,481 | B1 | 10/2005 | Laroia et al. |
| 6,954,622 | B2 | 10/2005 | Nelson et al. |
| 6,961,364 | B1 | 11/2005 | Laroia et al. |
| 6,963,543 | B2 | 11/2005 | Diep et al. |
| 6,970,682 | B2 | 11/2005 | Crilly, Jr. et al. |
| 6,975,868 | B2 | 12/2005 | Joshi et al. |
| 6,980,540 | B1 | 12/2005 | Laroia et al. |
| 6,985,434 | B2 | 1/2006 | Wu et al. |
| 6,985,453 | B2 | 1/2006 | Lundby et al. |
| 6,985,466 | B1 | 1/2006 | Yun et al. |
| 6,985,498 | B2 | 1/2006 | Laroia et al. |
| 6,987,746 | B1 | 1/2006 | Song |
| 6,993,342 | B2 | 1/2006 | Kuchibhotla et al. |
| 7,002,900 | B2 | 2/2006 | Walton et al. |
| 7,006,529 | B2 | 2/2006 | Alastalo et al. |
| 7,006,557 | B2 | 2/2006 | Subrahmanya et al. |
| 7,006,848 | B2 | 2/2006 | Ling et al. |
| 7,009,500 | B2 | 3/2006 | Rao et al. |
| 7,010,048 | B1 | 3/2006 | Shattil |
| 7,013,143 | B2 | 3/2006 | Love et al. |
| 7,016,318 | B2 | 3/2006 | Pankaj et al. |
| 7,016,319 | B2 | 3/2006 | Baum et al. |
| 7,016,425 | B1 | 3/2006 | Kraiem |
| 7,020,110 | B2 | 3/2006 | Walton et al. |
| 7,023,880 | B2 | 4/2006 | El-Maleh et al. |
| 7,039,356 | B2 | 5/2006 | Nguyen et al. |
| 7,039,370 | B2 | 5/2006 | Laroia et al. |
| 7,042,856 | B2 | 5/2006 | Walton et al. |
| 7,042,857 | B2 | 5/2006 | Krishnan et al. |
| 7,047,006 | B2 | 5/2006 | Classon et al. |
| 7,050,402 | B2 | 5/2006 | Schmidl et al. |
| 7,050,405 | B2 | 5/2006 | Attar et al. |
| 7,054,301 | B1 | 5/2006 | Sousa et al. |
| 7,061,898 | B2 | 6/2006 | Hashem et al. |
| 7,069,009 | B2 | 6/2006 | Li et al. |
| 7,072,315 | B1 | 7/2006 | Liu et al. |
| 7,079,867 | B2 | 7/2006 | Chun et al. |
| 7,085,574 | B2 | 8/2006 | Gaal et al. |
| 7,092,670 | B2 | 8/2006 | Tanaka et al. |
| 7,095,708 | B1 | 8/2006 | Alamouti et al. |
| 7,095,709 | B2 | 8/2006 | Walton et al. |
| 7,099,299 | B2 | 8/2006 | Liang et al. |
| 7,099,630 | B2 | 8/2006 | Brunner et al. |
| 7,103,384 | B2 | 9/2006 | Chun et al. |
| 7,106,319 | B2 | 9/2006 | Ishiyama |
| 7,113,808 | B2 | 9/2006 | Hwang et al. |
| 7,120,134 | B2 | 10/2006 | Tiedemann, Jr. et al. |
| 7,120,395 | B2 | 10/2006 | Tong et al. |
| 7,126,928 | B2 | 10/2006 | Tiedemann, Jr. et al. |
| 7,131,086 | B2 | 10/2006 | Yamasaki et al. |
| 7,133,460 | B2 | 11/2006 | Bae et al. |
| 7,139,328 | B2 | 11/2006 | Thomas et al. |
| 7,142,864 | B2 | 11/2006 | Laroia et al. |
| 7,145,940 | B2 | 12/2006 | Gore et al. |
| 7,145,959 | B2 | 12/2006 | Harel et al. |
| 7,149,199 | B2 | 12/2006 | Sung et al. |
| 7,149,238 | B2 | 12/2006 | Agee et al. |
| 7,151,761 | B1 | 12/2006 | Palenius et al. |
| 7,151,936 | B2 | 12/2006 | Wager et al. |
| 7,154,936 | B2 | 12/2006 | Bjerke et al. |
| 7,155,236 | B2 | 12/2006 | Chen et al. |
| 7,157,351 | B2 | 1/2007 | Cheng et al. |
| 7,161,971 | B2 | 1/2007 | Tiedemann, Jr. et al. |
| 7,164,649 | B2 | 1/2007 | Walton et al. |
| 7,164,696 | B2 | 1/2007 | Sano et al. |
| 7,167,916 | B2 | 1/2007 | Willen et al. |
| 7,170,937 | B2 | 1/2007 | Zhou |
| 7,177,297 | B2 | 2/2007 | Agrawal et al. |
| 7,177,351 | B2 | 2/2007 | Kadous |
| 7,180,627 | B2 | 2/2007 | Moylan et al. |
| 7,181,170 | B2 | 2/2007 | Love et al. |
| 7,184,426 | B2 | 2/2007 | Padovani et al. |
| 7,184,713 | B2 | 2/2007 | Kadous et al. |
| 7,188,300 | B2 | 3/2007 | Eriksson et al. |
| 7,197,282 | B2 | 3/2007 | Dent et al. |
| 7,200,177 | B2 | 4/2007 | Miyoshi |
| 7,209,712 | B2 | 4/2007 | Holtzman et al. |
| 7,215,979 | B2 | 5/2007 | Nakagawa et al. |
| 7,230,942 | B2 | 6/2007 | Laroia et al. |
| 7,233,634 | B1 | 6/2007 | Hassell Sweatman et al. |
| 7,236,747 | B1 | 6/2007 | Meacham et al. |
| 7,242,722 | B2 | 7/2007 | Krauss et al. |
| 7,243,150 | B2 | 7/2007 | Sher et al. |
| 7,248,559 | B2 | 7/2007 | Ma et al. |
| 7,248,841 | B2 | 7/2007 | Agee et al. |
| 7,254,158 | B2 | 8/2007 | Agrawal et al. |
| 7,257,167 | B2 | 8/2007 | Lau |
| 7,257,406 | B2 | 8/2007 | Ji et al. |
| 7,257,423 | B2 | 8/2007 | Iochi |
| 7,260,153 | B2 | 8/2007 | Nissani et al. |
| 7,280,467 | B2 | 10/2007 | Smee et al. |
| 7,289,570 | B2 | 10/2007 | Schmidl et al. |
| 7,289,585 | B2 | 10/2007 | Sandhu et al. |
| 7,290,195 | B2 | 10/2007 | Guo et al. |
| 7,292,651 | B2 | 11/2007 | Li |
| 7,292,863 | B2 | 11/2007 | Chen et al. |
| 7,295,509 | B2 | 11/2007 | Laroia et al. |
| 7,313,086 | B2 | 12/2007 | Aizawa |
| 7,313,126 | B2 | 12/2007 | Yun et al. |
| 7,313,174 | B2 | 12/2007 | Alard et al. |
| 7,313,407 | B2 | 12/2007 | Shapira |
| 7,327,812 | B2 | 2/2008 | Auer |
| 7,330,701 | B2 | 2/2008 | Mukkavilli et al. |
| 7,336,727 | B2 | 2/2008 | Mukkavilli et al. |
| 7,349,371 | B2 | 3/2008 | Schein et al. |
| 7,349,667 | B2 | 3/2008 | Magee et al. |
| 7,356,000 | B2 | 4/2008 | Oprescu-Surcobe et al. |
| 7,356,005 | B2 | 4/2008 | Derryberry et al. |
| 7,356,073 | B2 | 4/2008 | Heikkila |
| 7,359,327 | B2 | 4/2008 | Oshiba |
| 7,363,055 | B2 | 4/2008 | Castrogiovanni et al. |
| 7,366,223 | B1 | 4/2008 | Chen et al. |
| 7,366,253 | B2 | 4/2008 | Kim et al. |
| 7,366,520 | B2 | 4/2008 | Haustein et al. |
| 7,369,531 | B2 | 5/2008 | Cho et al. |
| 7,372,911 | B1 | 5/2008 | Lindskog et al. |
| 7,372,912 | B2 | 5/2008 | Seo et al. |
| 7,379,489 | B2 | 5/2008 | Zuniga et al. |
| 7,382,764 | B2 | 6/2008 | Uehara et al. |
| 7,392,014 | B2 | 6/2008 | Baker et al. |
| 7,394,865 | B2 | 7/2008 | Borran et al. |
| 7,403,745 | B2 | 7/2008 | Dominique et al. |
| 7,403,748 | B1 | 7/2008 | Keskitalo et al. |
| 7,406,119 | B2 | 7/2008 | Yamano et al. |
| 7,406,336 | B2 | 7/2008 | Astely et al. |
| 7,411,898 | B2 | 8/2008 | Erlich et al. |
| 7,412,212 | B2 | 8/2008 | Hottinen et al. |
| 7,418,043 | B2 | 8/2008 | Shattil |
| 7,418,246 | B2 | 8/2008 | Kim et al. |

(56) References Cited

U.S. PATENT DOCUMENTS

| | | |
|---|---|---|
| 7,423,991 B2 | 9/2008 | Cho et al. |
| 7,426,426 B2 | 9/2008 | Van Baren et al. |
| 7,428,426 B2 | 9/2008 | Kiran et al. |
| 7,433,661 B2 | 10/2008 | Kogiantis et al. |
| 7,437,164 B2 | 10/2008 | Agrawal et al. |
| 7,443,835 B2 | 10/2008 | Lakshmi Narayanan et al. |
| 7,447,270 B1 | 11/2008 | Hottinen et al. |
| 7,450,532 B2 | 11/2008 | Chae et al. |
| 7,450,548 B2 | 11/2008 | Haustein et al. |
| 7,460,466 B2 | 12/2008 | Lee et al. |
| 7,463,698 B2 | 12/2008 | Fujii et al. |
| 7,468,943 B2 | 12/2008 | Gu et al. |
| 7,469,011 B2 | 12/2008 | Lin et al. |
| 7,471,963 B2 | 12/2008 | Kim et al. |
| 7,483,408 B2 | 1/2009 | Bevan et al. |
| 7,483,719 B2 | 1/2009 | Kim et al. |
| 7,486,408 B2 | 2/2009 | Van Der Schaar et al. |
| 7,486,735 B2 | 2/2009 | Dubuc et al. |
| 7,492,788 B2 | 2/2009 | Zhang et al. |
| 7,499,393 B2 | 3/2009 | Ozluturk et al. |
| 7,508,748 B2 | 3/2009 | Kadous |
| 7,508,842 B2 | 3/2009 | Baum et al. |
| 7,512,096 B2 | 3/2009 | Kuzminskiy et al. |
| 7,545,867 B1 | 6/2009 | Lou et al. |
| 7,548,506 B2 | 6/2009 | Ma et al. |
| 7,551,546 B2 | 6/2009 | Ma et al. |
| 7,551,564 B2 | 6/2009 | Mattina |
| 7,558,293 B2 | 7/2009 | Choi et al. |
| 7,573,900 B2 | 8/2009 | Kim et al. |
| 7,599,327 B2 | 10/2009 | Zhuang |
| 7,616,955 B2 | 11/2009 | Kim et al. |
| 7,627,051 B2 | 12/2009 | Shen et al. |
| 7,664,061 B2 | 2/2010 | Hottinen |
| 7,676,007 B1 | 3/2010 | Choi et al. |
| 7,684,507 B2 | 3/2010 | Levy |
| 7,720,000 B2 | 5/2010 | Yoshida et al. |
| 7,724,777 B2 | 5/2010 | Sutivong et al. |
| 7,873,002 B2 | 1/2011 | Cai |
| 7,899,497 B2 | 3/2011 | Kish et al. |
| 7,916,624 B2 | 3/2011 | Laroia et al. |
| 7,924,699 B2 | 4/2011 | Laroia et al. |
| 7,990,843 B2 | 8/2011 | Laroia et al. |
| 7,990,844 B2 | 8/2011 | Laroia et al. |
| 8,014,271 B2 | 9/2011 | Laroia et al. |
| 8,095,141 B2 | 1/2012 | Teague |
| 8,098,568 B2 | 1/2012 | Laroia et al. |
| 8,098,569 B2 | 1/2012 | Laroia et al. |
| 8,199,634 B2 | 6/2012 | Laroia et al. |
| 8,208,420 B2 | 6/2012 | Liu et al. |
| 8,218,425 B2 | 7/2012 | Laroia et al. |
| 8,223,627 B2 | 7/2012 | Laroia et al. |
| 8,331,463 B2 | 12/2012 | Jayaraman et al. |
| 8,446,892 B2 | 5/2013 | Ji et al. |
| 8,462,859 B2 | 6/2013 | Sampath et al. |
| 8,488,507 B2 | 7/2013 | Luft et al. |
| 8,811,306 B2 | 8/2014 | Callard et al. |
| 2001/0021650 A1 | 9/2001 | Bilgic et al. |
| 2001/0024427 A1 | 9/2001 | Suzuki |
| 2001/0030948 A1 | 10/2001 | Tiedemann, Jr. |
| 2001/0047424 A1 | 11/2001 | Alastalo et al. |
| 2001/0053140 A1 | 12/2001 | Choi et al. |
| 2001/0055294 A1 | 12/2001 | Motoyoshi et al. |
| 2001/0055297 A1 | 12/2001 | Benveniste et al. |
| 2002/0000948 A1 | 1/2002 | Chun et al. |
| 2002/0015405 A1 | 2/2002 | Sepponen et al. |
| 2002/0018157 A1 | 2/2002 | Zhang et al. |
| 2002/0039912 A1 | 4/2002 | Yamaguchi et al. |
| 2002/0044524 A1 | 4/2002 | Laroia et al. |
| 2002/0058525 A1 | 5/2002 | Kasapi et al. |
| 2002/0061742 A1 | 5/2002 | Lapaille et al. |
| 2002/0077152 A1 | 6/2002 | Johnson et al. |
| 2002/0085521 A1 | 7/2002 | Tripathi et al. |
| 2002/0090004 A1 | 7/2002 | Rinchiuso |
| 2002/0090024 A1 | 7/2002 | Tan et al. |
| 2002/0101839 A1 | 8/2002 | Farley et al. |
| 2002/0122381 A1 | 9/2002 | Wu et al. |
| 2002/0122403 A1 | 9/2002 | Hashem et al. |
| 2002/0128035 A1 | 9/2002 | Jokinen et al. |
| 2002/0147953 A1 | 10/2002 | Catreux et al. |
| 2002/0159422 A1 | 10/2002 | Li et al. |
| 2002/0160769 A1 | 10/2002 | Gray et al. |
| 2002/0160781 A1 | 10/2002 | Bark et al. |
| 2002/0168946 A1 | 11/2002 | Aizawa et al. |
| 2002/0172293 A1 | 11/2002 | Kuchi et al. |
| 2002/0176398 A1 | 11/2002 | Nidda |
| 2002/0181571 A1 | 12/2002 | Yamano et al. |
| 2002/0191569 A1 | 12/2002 | Sung et al. |
| 2002/0193146 A1 | 12/2002 | Wallace et al. |
| 2003/0002464 A1 | 1/2003 | Rezaiifar et al. |
| 2003/0020651 A1 | 1/2003 | Crilly, Jr. et al. |
| 2003/0027579 A1 | 2/2003 | Sydon |
| 2003/0036359 A1 | 2/2003 | Dent et al. |
| 2003/0040283 A1 | 2/2003 | Kawai et al. |
| 2003/0043732 A1 | 3/2003 | Walton et al. |
| 2003/0043764 A1 | 3/2003 | Kim et al. |
| 2003/0063579 A1 | 4/2003 | Lee |
| 2003/0068983 A1 | 4/2003 | Kim et al. |
| 2003/0072254 A1 | 4/2003 | Ma et al. |
| 2003/0072255 A1 | 4/2003 | Ma et al. |
| 2003/0072280 A1 | 4/2003 | McFarland et al. |
| 2003/0072395 A1 | 4/2003 | Jia et al. |
| 2003/0073409 A1 | 4/2003 | Nobukiyo et al. |
| 2003/0073464 A1 | 4/2003 | Giannakis et al. |
| 2003/0076890 A1 | 4/2003 | Hochwald et al. |
| 2003/0086371 A1 | 5/2003 | Walton et al. |
| 2003/0086393 A1 | 5/2003 | Vasudevan et al. |
| 2003/0096579 A1 | 5/2003 | Ito et al. |
| 2003/0103520 A1 | 6/2003 | Chen et al. |
| 2003/0109226 A1 | 6/2003 | Brunner et al. |
| 2003/0109266 A1 | 6/2003 | Rafiah et al. |
| 2003/0112745 A1 | 6/2003 | Zhuang et al. |
| 2003/0123414 A1 | 7/2003 | Tong et al. |
| 2003/0125040 A1 | 7/2003 | Walton et al. |
| 2003/0128658 A1 | 7/2003 | Walton et al. |
| 2003/0133426 A1 | 7/2003 | Schein et al. |
| 2003/0142648 A1 | 7/2003 | Semper |
| 2003/0142729 A1 | 7/2003 | Subrahmanya et al. |
| 2003/0147371 A1 | 8/2003 | Choi et al. |
| 2003/0157900 A1 | 8/2003 | Gaal et al. |
| 2003/0161281 A1 | 8/2003 | Dulin et al. |
| 2003/0161282 A1 | 8/2003 | Medvedev et al. |
| 2003/0165189 A1 | 9/2003 | Kadous et al. |
| 2003/0181170 A1 | 9/2003 | Sim |
| 2003/0185310 A1 | 10/2003 | Ketchum et al. |
| 2003/0190897 A1 | 10/2003 | Lei et al. |
| 2003/0193915 A1 | 10/2003 | Lee et al. |
| 2003/0202491 A1 | 10/2003 | Tiedemann, Jr. et al. |
| 2003/0202560 A1 | 10/2003 | Tiedemann, Jr. et al. |
| 2003/0216156 A1 | 11/2003 | Chun et al. |
| 2003/0228850 A1 | 12/2003 | Hwang |
| 2003/0235255 A1 | 12/2003 | Ketchum et al. |
| 2004/0001429 A1 | 1/2004 | Ma et al. |
| 2004/0001460 A1 | 1/2004 | Bevan et al. |
| 2004/0002364 A1 | 1/2004 | Trikkonen et al. |
| 2004/0009783 A1 | 1/2004 | Miyoshi et al. |
| 2004/0010623 A1 | 1/2004 | Sher et al. |
| 2004/0015692 A1 | 1/2004 | Green et al. |
| 2004/0017785 A1 | 1/2004 | Zelst et al. |
| 2004/0032443 A1 | 2/2004 | Moylan et al. |
| 2004/0042558 A1 | 3/2004 | Hwang et al. |
| 2004/0048609 A1 | 3/2004 | Kosaka et al. |
| 2004/0048630 A1 | 3/2004 | Shapira et al. |
| 2004/0054999 A1 | 3/2004 | Willen et al. |
| 2004/0057394 A1 | 3/2004 | Holtzman et al. |
| 2004/0058687 A1 | 3/2004 | Kim et al. |
| 2004/0066754 A1 | 4/2004 | Hottinen et al. |
| 2004/0066761 A1 | 4/2004 | Giannakis et al. |
| 2004/0066772 A1 | 4/2004 | Moon et al. |
| 2004/0067756 A1* | 4/2004 | Wager et al. ............ 455/450 |
| 2004/0072565 A1 | 4/2004 | Nobukiyo et al. |
| 2004/0076185 A1 | 4/2004 | Kim et al. |
| 2004/0077345 A1 | 4/2004 | Turner et al. |
| 2004/0077379 A1 | 4/2004 | Smith et al. |
| 2004/0081073 A1 | 4/2004 | Walton et al. |

(56) References Cited

U.S. PATENT DOCUMENTS

| | | |
|---|---|---|
| 2004/0081195 A1 | 4/2004 | El-Maleh et al. |
| 2004/0087325 A1 | 5/2004 | Cheng et al. |
| 2004/0095907 A1 | 5/2004 | Agee et al. |
| 2004/0097215 A1 | 5/2004 | Abe et al. |
| 2004/0097240 A1 | 5/2004 | Chen et al. |
| 2004/0098505 A1 | 5/2004 | Clemmensen et al. |
| 2004/0105489 A1 | 6/2004 | Kim et al. |
| 2004/0114618 A1 | 6/2004 | Tong et al. |
| 2004/0120411 A1 | 6/2004 | Walton et al. |
| 2004/0125792 A1 | 7/2004 | Bradbury et al. |
| 2004/0128605 A1 | 7/2004 | Sibecas et al. |
| 2004/0131007 A1 | 7/2004 | Smee et al. |
| 2004/0131008 A1 | 7/2004 | Zuniga et al. |
| 2004/0131038 A1 | 7/2004 | Kim et al. |
| 2004/0131110 A1 | 7/2004 | Alard et al. |
| 2004/0136344 A1 | 7/2004 | Kim et al. |
| 2004/0136349 A1 | 7/2004 | Walton et al. |
| 2004/0156328 A1 | 8/2004 | Walton et al. |
| 2004/0160914 A1 | 8/2004 | Sarkar et al. |
| 2004/0160933 A1 | 8/2004 | Odenwalder et al. |
| 2004/0162083 A1 | 8/2004 | Chen et al. |
| 2004/0165564 A1 | 8/2004 | Kim et al. |
| 2004/0166867 A1 | 8/2004 | Hawe et al. |
| 2004/0166887 A1 | 8/2004 | Laroia et al. |
| 2004/0170152 A1 | 9/2004 | Nagao et al. |
| 2004/0170157 A1 | 9/2004 | Kim et al. |
| 2004/0171384 A1 | 9/2004 | Holma et al. |
| 2004/0171385 A1 | 9/2004 | Haustein et al. |
| 2004/0178954 A1 | 9/2004 | Vook et al. |
| 2004/0179480 A1 | 9/2004 | Attar et al. |
| 2004/0179494 A1 | 9/2004 | Attar et al. |
| 2004/0179506 A1 | 9/2004 | Padovani et al. |
| 2004/0179627 A1 | 9/2004 | Ketchum et al. |
| 2004/0181569 A1 | 9/2004 | Attar et al. |
| 2004/0185792 A1 | 9/2004 | Alexiou et al. |
| 2004/0190640 A1 | 9/2004 | Dubuc et al. |
| 2004/0202257 A1 | 10/2004 | Mehta et al. |
| 2004/0208138 A1 | 10/2004 | Hayashi et al. |
| 2004/0218520 A1 | 11/2004 | Aizawa et al. |
| 2004/0219819 A1 | 11/2004 | Di Mascio et al. |
| 2004/0219919 A1 | 11/2004 | Whinnett et al. |
| 2004/0224711 A1 | 11/2004 | Panchal et al. |
| 2004/0228267 A1 | 11/2004 | Agrawal et al. |
| 2004/0228313 A1 | 11/2004 | Cheng et al. |
| 2004/0229615 A1 | 11/2004 | Agrawal et al. |
| 2004/0240419 A1 | 12/2004 | Abrishamkar et al. |
| 2004/0240572 A1 | 12/2004 | Brutel et al. |
| 2004/0248604 A1 | 12/2004 | Vaidyanathan et al. |
| 2004/0252529 A1 | 12/2004 | Huber et al. |
| 2004/0252629 A1 | 12/2004 | Hasegawa et al. |
| 2004/0252655 A1 | 12/2004 | Lim et al. |
| 2004/0252662 A1 | 12/2004 | Cho |
| 2004/0257979 A1 | 12/2004 | Ro et al. |
| 2004/0264507 A1 | 12/2004 | Cho et al. |
| 2004/0264585 A1 | 12/2004 | Borran et al. |
| 2004/0264593 A1 | 12/2004 | Shim et al. |
| 2005/0002412 A1 | 1/2005 | Sagfors et al. |
| 2005/0002440 A1 | 1/2005 | Alamouti et al. |
| 2005/0002467 A1 | 1/2005 | Seo et al. |
| 2005/0002468 A1 | 1/2005 | Walton et al. |
| 2005/0003782 A1 | 1/2005 | Wintzell |
| 2005/0008091 A1 | 1/2005 | Boutros et al. |
| 2005/0009486 A1 | 1/2005 | Al-Dhahir et al. |
| 2005/0013263 A1 | 1/2005 | Kim et al. |
| 2005/0025093 A1 | 2/2005 | Yun et al. |
| 2005/0030886 A1 | 2/2005 | Wu et al. |
| 2005/0030964 A1 | 2/2005 | Tiedemann et al. |
| 2005/0034079 A1 | 2/2005 | Gunasekar et al. |
| 2005/0041611 A1 | 2/2005 | Sandhu et al. |
| 2005/0041618 A1 | 2/2005 | Wei et al. |
| 2005/0041750 A1 | 2/2005 | Lau et al. |
| 2005/0041775 A1 | 2/2005 | Batzinger et al. |
| 2005/0044206 A1 | 2/2005 | Johansson et al. |
| 2005/0047517 A1 | 3/2005 | Georgios et al. |
| 2005/0052991 A1 | 3/2005 | Kadous et al. |
| 2005/0053081 A1 | 3/2005 | Andersson et al. |
| 2005/0053151 A1 | 3/2005 | Lin et al. |
| 2005/0063298 A1 | 3/2005 | Ling et al. |
| 2005/0068921 A1 | 3/2005 | Liu |
| 2005/0073976 A1 | 4/2005 | Fujii |
| 2005/0084000 A1 | 4/2005 | Krauss et al. |
| 2005/0085195 A1 | 4/2005 | Tong et al. |
| 2005/0085236 A1 | 4/2005 | Gerlach et al. |
| 2005/0111397 A1 | 5/2005 | Attar et al. |
| 2005/0113100 A1 | 5/2005 | Oprescu-Surcobe et al. |
| 2005/0122898 A1 | 6/2005 | Jang et al. |
| 2005/0128683 A1 | 6/2005 | Watanabe et al. |
| 2005/0128983 A1 | 6/2005 | Kim et al. |
| 2005/0135324 A1 | 6/2005 | Kim et al. |
| 2005/0135498 A1 | 6/2005 | Yee |
| 2005/0141624 A1 | 6/2005 | Lakshmipathi et al. |
| 2005/0147024 A1 | 7/2005 | Jung et al. |
| 2005/0147025 A1 | 7/2005 | Auer et al. |
| 2005/0152484 A1 | 7/2005 | Sandhu et al. |
| 2005/0157807 A1 | 7/2005 | Shim et al. |
| 2005/0159162 A1 | 7/2005 | Park |
| 2005/0164709 A1 | 7/2005 | Balasubramanian et al. |
| 2005/0165949 A1 | 7/2005 | Teague |
| 2005/0174981 A1 | 8/2005 | Heath et al. |
| 2005/0175070 A1 | 8/2005 | Grob et al. |
| 2005/0180311 A1 | 8/2005 | Wang et al. |
| 2005/0180313 A1 | 8/2005 | Kim et al. |
| 2005/0181799 A1 | 8/2005 | Laroia et al. |
| 2005/0192011 A1 | 9/2005 | Hong et al. |
| 2005/0195852 A1 | 9/2005 | Vayanos et al. |
| 2005/0195886 A1 | 9/2005 | Lampinen et al. |
| 2005/0201296 A1 | 9/2005 | Vannithamby et al. |
| 2005/0207367 A1 | 9/2005 | Onggosanusi et al. |
| 2005/0215196 A1 | 9/2005 | Krishnan et al. |
| 2005/0215251 A1 | 9/2005 | Krishnan et al. |
| 2005/0226204 A1 | 10/2005 | Uehara et al. |
| 2005/0239465 A1 | 10/2005 | Lee et al. |
| 2005/0243791 A1 | 11/2005 | Park et al. |
| 2005/0246548 A1 | 11/2005 | Laitinen |
| 2005/0249266 A1 | 11/2005 | Brown et al. |
| 2005/0254416 A1 | 11/2005 | Laroia et al. |
| 2005/0254467 A1 | 11/2005 | Li et al. |
| 2005/0254477 A1 | 11/2005 | Lee et al. |
| 2005/0254556 A1 | 11/2005 | Fujii et al. |
| 2005/0259005 A1 | 11/2005 | Chiang et al. |
| 2005/0259723 A1 | 11/2005 | Blanchard et al. |
| 2005/0259757 A1 | 11/2005 | Wu et al. |
| 2005/0265220 A1 | 12/2005 | Erlich et al. |
| 2005/0265293 A1 | 12/2005 | Ro et al. |
| 2005/0265470 A1 | 12/2005 | Kishigami et al. |
| 2005/0271012 A1 | 12/2005 | Agrawal et al. |
| 2005/0276347 A1 | 12/2005 | Mujtaba et al. |
| 2005/0276348 A1 | 12/2005 | Vandenameele |
| 2005/0277423 A1 | 12/2005 | Sandhu et al. |
| 2005/0281029 A1 | 12/2005 | Inamoto et al. |
| 2005/0281290 A1 | 12/2005 | Khandekar et al. |
| 2005/0282500 A1 | 12/2005 | Wang et al. |
| 2005/0286408 A1 | 12/2005 | Jin et al. |
| 2005/0289256 A1 | 12/2005 | Cudak et al. |
| 2006/0002451 A1* | 1/2006 | Fukuta et al. .................. 375/132 |
| 2006/0013285 A1 | 1/2006 | Kobayashi et al. |
| 2006/0018336 A1 | 1/2006 | Sutivong et al. |
| 2006/0018347 A1 | 1/2006 | Agrawal et al. |
| 2006/0018397 A1 | 1/2006 | Sampath et al. |
| 2006/0026344 A1 | 2/2006 | Sun Hsu et al. |
| 2006/0029289 A1 | 2/2006 | Yamaguchi et al. |
| 2006/0034164 A1 | 2/2006 | Ozluturk et al. |
| 2006/0034173 A1 | 2/2006 | Teague et al. |
| 2006/0039332 A1 | 2/2006 | Kotzin |
| 2006/0039344 A1 | 2/2006 | Khan |
| 2006/0039500 A1 | 2/2006 | Yun et al. |
| 2006/0040655 A1 | 2/2006 | Kim et al. |
| 2006/0045003 A1 | 3/2006 | Choi et al. |
| 2006/0046643 A1 | 3/2006 | Izumikawa et al. |
| 2006/0050770 A1 | 3/2006 | Wallace et al. |
| 2006/0056340 A1 | 3/2006 | Hottinen et al. |
| 2006/0057958 A1 | 3/2006 | Ngo et al. |
| 2006/0067421 A1 | 3/2006 | Walton et al. |
| 2006/0078075 A1* | 4/2006 | Stamoulis et al. ............ 375/346 |

(56) References Cited

U.S. PATENT DOCUMENTS

| | | |
|---|---|---|
| 2006/0083159 A1 | 4/2006 | Laroia et al. |
| 2006/0083183 A1 | 4/2006 | Teague et al. |
| 2006/0089104 A1 | 4/2006 | Kaikkonen et al. |
| 2006/0092054 A1 | 5/2006 | Li et al. |
| 2006/0093065 A1 | 5/2006 | Thomas et al. |
| 2006/0104333 A1 | 5/2006 | Rainbolt et al. |
| 2006/0104381 A1 | 5/2006 | Menon et al. |
| 2006/0109814 A1 | 5/2006 | Kuzminskiy et al. |
| 2006/0111054 A1 | 5/2006 | Pan et al. |
| 2006/0114858 A1 | 6/2006 | Walton et al. |
| 2006/0120469 A1 | 6/2006 | Maltsev et al. |
| 2006/0120471 A1 | 6/2006 | Learned et al. |
| 2006/0126491 A1 | 6/2006 | Ro et al. |
| 2006/0133269 A1 | 6/2006 | Prakash et al. |
| 2006/0133455 A1 | 6/2006 | Agrawal et al. |
| 2006/0133521 A1 | 6/2006 | Sampath et al. |
| 2006/0140289 A1 | 6/2006 | Mandyam et al. |
| 2006/0146764 A1 | 7/2006 | Takemoto et al. |
| 2006/0153239 A1 | 7/2006 | Julian et al. |
| 2006/0155534 A1 | 7/2006 | Lin et al. |
| 2006/0156199 A1 | 7/2006 | Palanki et al. |
| 2006/0172704 A1 | 8/2006 | Nishio et al. |
| 2006/0189321 A1 | 8/2006 | Oh et al. |
| 2006/0193294 A1 | 8/2006 | Jorswieck et al. |
| 2006/0203708 A1 | 9/2006 | Sampath et al. |
| 2006/0203794 A1 | 9/2006 | Sampath et al. |
| 2006/0203891 A1 | 9/2006 | Sampath et al. |
| 2006/0203932 A1* | 9/2006 | Palanki et al. ............... 375/295 |
| 2006/0209670 A1 | 9/2006 | Gorokhov et al. |
| 2006/0209732 A1 | 9/2006 | Gorokhov et al. |
| 2006/0209754 A1 | 9/2006 | Ji et al. |
| 2006/0209764 A1 | 9/2006 | Kim et al. |
| 2006/0209973 A1 | 9/2006 | Gorokhov et al. |
| 2006/0215777 A1* | 9/2006 | Krishnamoorthi ............ 375/260 |
| 2006/0218459 A1 | 9/2006 | Hedberg |
| 2006/0223449 A1 | 10/2006 | Sampath et al. |
| 2006/0233131 A1 | 10/2006 | Gore et al. |
| 2006/0233222 A1 | 10/2006 | Reial et al. |
| 2006/0262754 A1 | 11/2006 | Andersson et al. |
| 2006/0270427 A1 | 11/2006 | Shida et al. |
| 2006/0274836 A1 | 12/2006 | Sampath et al. |
| 2006/0280114 A1 | 12/2006 | Osseiran et al. |
| 2006/0285485 A1 | 12/2006 | Agrawal et al. |
| 2006/0285515 A1 | 12/2006 | Julian et al. |
| 2006/0286974 A1 | 12/2006 | Gore et al. |
| 2006/0286982 A1 | 12/2006 | Prakash et al. |
| 2006/0286995 A1 | 12/2006 | Onggosanusi et al. |
| 2006/0291371 A1 | 12/2006 | Sutivong et al. |
| 2006/0292989 A1 | 12/2006 | Gerlach et al. |
| 2007/0004430 A1 | 1/2007 | Hyun et al. |
| 2007/0005749 A1 | 1/2007 | Sampath |
| 2007/0009011 A1 | 1/2007 | Coulsonn et al. |
| 2007/0019596 A1 | 1/2007 | Barriac et al. |
| 2007/0025345 A1 | 2/2007 | Bachl et al. |
| 2007/0041311 A1 | 2/2007 | Baum et al. |
| 2007/0041404 A1 | 2/2007 | Palanki |
| 2007/0041457 A1 | 2/2007 | Kadous et al. |
| 2007/0047485 A1 | 3/2007 | Gorokhov et al. |
| 2007/0047495 A1 | 3/2007 | Ji et al. |
| 2007/0049218 A1 | 3/2007 | Gorokhov et al. |
| 2007/0053282 A1 | 3/2007 | Tong et al. |
| 2007/0053383 A1 | 3/2007 | Choi et al. |
| 2007/0060178 A1 | 3/2007 | Gorokhov et al. |
| 2007/0064669 A1* | 3/2007 | Classon et al. ............... 370/347 |
| 2007/0070952 A1 | 3/2007 | Yoon et al. |
| 2007/0071147 A1 | 3/2007 | Sampath et al. |
| 2007/0081507 A1 | 4/2007 | Koo et al. |
| 2007/0097853 A1 | 5/2007 | Khandekar et al. |
| 2007/0097889 A1 | 5/2007 | Wang et al. |
| 2007/0097897 A1 | 5/2007 | Teague et al. |
| 2007/0097908 A1 | 5/2007 | Khandekar et al. |
| 2007/0097909 A1 | 5/2007 | Khandekar et al. |
| 2007/0097910 A1 | 5/2007 | Ji et al. |
| 2007/0097922 A1 | 5/2007 | Parekh et al. |
| 2007/0097927 A1 | 5/2007 | Gorokhov et al. |
| 2007/0097942 A1 | 5/2007 | Gorokhov et al. |
| 2007/0097981 A1 | 5/2007 | Papasakellariou et al. |
| 2007/0098050 A1 | 5/2007 | Khandekar et al. |
| 2007/0098120 A1 | 5/2007 | Wang et al. |
| 2007/0099666 A1 | 5/2007 | Astely et al. |
| 2007/0110172 A1 | 5/2007 | Faulkner et al. |
| 2007/0115795 A1 | 5/2007 | Gore et al. |
| 2007/0149194 A1 | 6/2007 | Das et al. |
| 2007/0149228 A1 | 6/2007 | Das |
| 2007/0159969 A1 | 7/2007 | Das et al. |
| 2007/0160115 A1 | 7/2007 | Palanki et al. |
| 2007/0165738 A1 | 7/2007 | Barriac et al. |
| 2007/0177631 A1 | 8/2007 | Popovic et al. |
| 2007/0177681 A1 | 8/2007 | Choi et al. |
| 2007/0183303 A1 | 8/2007 | Pi et al. |
| 2007/0183386 A1 | 8/2007 | Muharemovicc et al. |
| 2007/0207812 A1 | 9/2007 | Borran et al. |
| 2007/0211616 A1 | 9/2007 | Khandekar et al. |
| 2007/0211667 A1 | 9/2007 | Agrawal et al. |
| 2007/0230324 A1 | 10/2007 | Li et al. |
| 2007/0242653 A1 | 10/2007 | Yang et al. |
| 2007/0263743 A1 | 11/2007 | Lee et al. |
| 2007/0280336 A1 | 12/2007 | Zhangg et al. |
| 2007/0281702 A1 | 12/2007 | Lim et al. |
| 2008/0039129 A1 | 2/2008 | Li et al. |
| 2008/0063099 A1 | 3/2008 | Laroia et al. |
| 2008/0075094 A1 | 3/2008 | Ahn et al. |
| 2008/0095223 A1 | 4/2008 | Tong et al. |
| 2008/0095262 A1 | 4/2008 | Ho et al. |
| 2008/0108355 A1 | 5/2008 | Oleszcsuk |
| 2008/0151829 A1 | 6/2008 | Khandekar et al. |
| 2008/0181139 A1* | 7/2008 | Rangarajan et al. .......... 370/256 |
| 2008/0181168 A1 | 7/2008 | Han et al. |
| 2008/0214222 A1 | 9/2008 | Atarashi et al. |
| 2008/0253279 A1 | 10/2008 | Ma et al. |
| 2008/0267157 A1 | 10/2008 | Lee et al. |
| 2008/0285500 A1 | 11/2008 | Zhang et al. |
| 2008/0299983 A1 | 12/2008 | Kwak et al. |
| 2009/0003466 A1 | 1/2009 | Taherzadehboroujeni et al. |
| 2009/0010351 A1 | 1/2009 | Laroia et al. |
| 2009/0017753 A1 | 1/2009 | Kim et al. |
| 2009/0022098 A1 | 1/2009 | Novak et al. |
| 2009/0041150 A1 | 2/2009 | Tsai et al. |
| 2009/0110103 A1 | 4/2009 | Maltsev et al. |
| 2009/0116420 A1 | 5/2009 | Jeong et al. |
| 2009/0129501 A1 | 5/2009 | Mehta et al. |
| 2009/0180459 A1 | 7/2009 | Orlikk et al. |
| 2009/0197646 A1 | 8/2009 | Tamura et al. |
| 2009/0201826 A1 | 8/2009 | Gorokhov et al. |
| 2009/0201872 A1 | 8/2009 | Gorokhov et al. |
| 2009/0213750 A1 | 8/2009 | Gorokhov et al. |
| 2009/0213950 A1 | 8/2009 | Gorokhov et al. |
| 2009/0225695 A1 | 9/2009 | Kang et al. |
| 2009/0252078 A1 | 10/2009 | Lim et al. |
| 2009/0262641 A1 | 10/2009 | Laroia et al. |
| 2009/0262699 A1 | 10/2009 | Wengerterr et al. |
| 2009/0285163 A1 | 11/2009 | Zhang et al. |
| 2009/0287977 A1 | 11/2009 | Chang et al. |
| 2010/0002570 A9 | 1/2010 | Walton et al. |
| 2010/0002582 A1 | 1/2010 | Luft et al. |
| 2010/0135242 A1 | 6/2010 | Nam et al. |
| 2010/0173644 A1 | 7/2010 | Koyanagi |
| 2010/0220800 A1 | 9/2010 | Erell et al. |
| 2010/0232384 A1 | 9/2010 | Farajidana et al. |
| 2010/0238902 A1 | 9/2010 | Ji et al. |
| 2010/0254263 A1 | 10/2010 | Chen et al. |
| 2011/0064070 A1 | 3/2011 | Gore et al. |
| 2011/0110310 A1 | 5/2011 | Cai |
| 2011/0189946 A1 | 8/2011 | Fukuzawa et al. |
| 2011/0235733 A1 | 9/2011 | Laroia et al. |
| 2011/0235745 A1 | 9/2011 | Laroia et al. |
| 2011/0235746 A1 | 9/2011 | Laroia et al. |
| 2011/0235747 A1 | 9/2011 | Laroia et al. |
| 2011/0269394 A1 | 11/2011 | Mildh et al. |
| 2011/0306291 A1 | 12/2011 | Ma et al. |
| 2011/0310814 A1 | 12/2011 | Callard et al. |
| 2012/0002623 A1 | 1/2012 | Khandekar et al. |
| 2012/0044814 A1 | 2/2012 | Natarajan et al. |
| 2012/0063441 A1 | 3/2012 | Palanki |

(56) References Cited

U.S. PATENT DOCUMENTS

| | | |
|---|---|---|
| 2012/0120925 A1 | 5/2012 | Kadous et al. |
| 2012/0140798 A1 | 6/2012 | Kadous et al. |
| 2012/0140838 A1 | 6/2012 | Kadous et al. |
| 2012/0236781 A1 | 9/2012 | Liu et al. |
| 2012/0250603 A1 | 10/2012 | Huang et al. |
| 2012/0307668 A1 | 12/2012 | Wiemann et al. |
| 2013/0016678 A1 | 1/2013 | Laroia et al. |
| 2013/0045674 A1 | 2/2013 | Koyanagi |
| 2013/0070664 A1 | 3/2013 | Nagata et al. |
| 2013/0150047 A1 | 6/2013 | Zhang et al. |
| 2013/0201902 A1 | 8/2013 | Nagata et al. |
| 2013/0208681 A1 | 8/2013 | Gore et al. |
| 2013/0273836 A1 | 10/2013 | Lim et al. |
| 2013/0287138 A1 | 10/2013 | Ma et al. |
| 2013/0315200 A1 | 11/2013 | Gorokhov et al. |
| 2014/0036763 A1 | 2/2014 | Borran et al. |
| 2014/0247898 A1 | 9/2014 | Laroia et al. |

FOREIGN PATENT DOCUMENTS

| | | |
|---|---|---|
| CA | 2540688 | 5/2005 |
| CA | 2577369 | 3/2006 |
| CL | 19931400 | 12/1994 |
| CL | 1997846 | 1/1998 |
| CL | 27102004 | 8/2005 |
| CL | 22892004 | 9/2005 |
| CL | 30862004 | 10/2005 |
| CL | 29932005 | 5/2006 |
| CL | 15212006 | 3/2007 |
| CL | 14922006 | 4/2007 |
| CL | 14892006 | 5/2007 |
| CL | 14902006 | 5/2007 |
| CL | 46151 | 12/2009 |
| CN | 1252919 | 5/2000 |
| CN | 1267437 | 9/2000 |
| CN | 1284795 | 2/2001 |
| CN | 1296682 | 5/2001 |
| CN | 1344451 | 4/2002 |
| CN | 1346221 | 4/2002 |
| CN | 1383631 | 12/2002 |
| CN | 1386344 | 12/2002 |
| CN | 1402916 A | 3/2003 |
| CN | 1424835 | 6/2003 |
| CN | 1132474 C | 12/2003 |
| CN | 1467938 A | 1/2004 |
| CN | 1487755 A | 4/2004 |
| CN | 1520220 | 8/2004 |
| CN | 1525678 | 9/2004 |
| CN | 1642051 A | 7/2005 |
| CN | 1642335 A | 7/2005 |
| CN | 1647436 A | 7/2005 |
| DE | 19800653 A1 | 7/1999 |
| DE | 19800953 C1 | 7/1999 |
| DE | 19957288 C1 | 5/2001 |
| DE | 10240138 | 8/2003 |
| DE | 10254384 A1 | 6/2004 |
| EP | 0488976 A2 | 6/1992 |
| EP | 0568291 A2 | 11/1993 |
| EP | 0740431 A1 | 10/1996 |
| EP | 0786889 | 7/1997 |
| EP | 0805576 A2 | 11/1997 |
| EP | 0807989 | 11/1997 |
| EP | 0844796 A2 | 5/1998 |
| EP | 0981222 | 2/2000 |
| EP | 1001570 A2 | 5/2000 |
| EP | 1047209 A1 | 10/2000 |
| EP | 1061687 A1 | 12/2000 |
| EP | 1001516 | 4/2001 |
| EP | 1091516 | 4/2001 |
| EP | 1093241 | 4/2001 |
| EP | 1148673 | 10/2001 |
| EP | 1180907 A2 | 2/2002 |
| EP | 1187506 | 3/2002 |
| EP | 1204217 A1 | 5/2002 |
| EP | 1255369 A1 | 11/2002 |
| EP | 1267513 A2 | 12/2002 |
| EP | 1074099 B1 | 2/2003 |
| EP | 1286490 A2 | 2/2003 |
| EP | 03058871 | 7/2003 |
| EP | 1335504 | 8/2003 |
| EP | 1351538 A1 | 10/2003 |
| EP | 1376920 A1 | 1/2004 |
| EP | 1392073 A1 | 2/2004 |
| EP | 1434365 A2 | 6/2004 |
| EP | 1441469 A2 | 7/2004 |
| EP | 1445873 | 8/2004 |
| EP | 1465449 A1 | 10/2004 |
| EP | 1478204 A2 | 11/2004 |
| EP | 1507421 A1 | 2/2005 |
| EP | 1513356 | 3/2005 |
| EP | 1531575 A2 | 5/2005 |
| EP | 1533950 A1 | 5/2005 |
| EP | 1538863 A1 | 6/2005 |
| EP | 1542488 | 6/2005 |
| EP | 1601149 | 11/2005 |
| EP | 1643669 | 4/2006 |
| EP | 1898542 A1 | 3/2008 |
| EP | 1941693 | 7/2011 |
| FR | 2584884 A1 | 1/1987 |
| GB | 2279540 | 1/1995 |
| GB | 2279540 A | 1/1995 |
| GB | 2348776 A | 10/2000 |
| GB | 2412541 | 9/2005 |
| GB | 2412541 A | 9/2005 |
| IL | 167573 | 2/2011 |
| IL | 201872 | 5/2012 |
| JP | H04111544 A | 4/1992 |
| JP | 04301931 A | 10/1992 |
| JP | H0746248 A | 2/1995 |
| JP | 7336323 A | 12/1995 |
| JP | 8116329 A | 5/1996 |
| JP | 08288927 | 11/1996 |
| JP | 9008725 | 1/1997 |
| JP | H09501548 A | 2/1997 |
| JP | 9131342 | 5/1997 |
| JP | 9182148 A | 7/1997 |
| JP | 09214404 | 8/1997 |
| JP | 9284200 A | 10/1997 |
| JP | 10117162 | 5/1998 |
| JP | H10210000 A | 8/1998 |
| JP | 10322304 | 12/1998 |
| JP | H11168453 A | 6/1999 |
| JP | 11191756 A | 7/1999 |
| JP | 11196109 | 7/1999 |
| JP | 11508417 T | 7/1999 |
| JP | 11239155 A | 8/1999 |
| JP | 11298954 A | 10/1999 |
| JP | 11331927 A | 11/1999 |
| JP | 2000022618 A | 1/2000 |
| JP | 2000102065 A | 4/2000 |
| JP | 2000184425 A | 6/2000 |
| JP | 2000511750 A | 9/2000 |
| JP | 2000-332724 | 11/2000 |
| JP | 2001016644 A2 | 1/2001 |
| JP | 2001045573 A | 2/2001 |
| JP | 2001057545 A | 2/2001 |
| JP | 2001156732 A | 6/2001 |
| JP | 2001238269 | 8/2001 |
| JP | 2001245355 A | 9/2001 |
| JP | 2001249802 A | 9/2001 |
| JP | 2001285927 A | 10/2001 |
| JP | 2001521698 A | 11/2001 |
| JP | 2001526012 T | 12/2001 |
| JP | 2002026790 A | 1/2002 |
| JP | 2002111556 A | 4/2002 |
| JP | 2002515203 T | 5/2002 |
| JP | 2002290148 A | 10/2002 |
| JP | 2002534925 T | 10/2002 |
| JP | 2002534941 | 10/2002 |
| JP | 2002538696 A | 11/2002 |
| JP | 200318054 | 1/2003 |
| JP | 2003032218 | 1/2003 |
| JP | 2003500909 | 1/2003 |

(56) References Cited

FOREIGN PATENT DOCUMENTS

| | | |
|---|---|---|
| JP | 200369472 | 3/2003 |
| JP | 2003101515 | 4/2003 |
| JP | 2003169367 A | 6/2003 |
| JP | 2003174426 | 6/2003 |
| JP | 2003199173 A | 7/2003 |
| JP | 2003520523 | 7/2003 |
| JP | 2003235072 A | 8/2003 |
| JP | 2003249907 A | 9/2003 |
| JP | 2003292667 A | 10/2003 |
| JP | 2003318857 A | 11/2003 |
| JP | 2003347985 A | 12/2003 |
| JP | 2003348047 | 12/2003 |
| JP | 2003536308 A | 12/2003 |
| JP | 2004007643 A | 1/2004 |
| JP | 2004023716 | 1/2004 |
| JP | 2004048716 | 2/2004 |
| JP | 200472457 | 3/2004 |
| JP | 2004072157 A | 3/2004 |
| JP | 2004096142 A | 3/2004 |
| JP | 2004507151 A | 3/2004 |
| JP | 2004507950 A | 3/2004 |
| JP | 2004153676 | 5/2004 |
| JP | 2004158901 A | 6/2004 |
| JP | 2004162388 A | 6/2004 |
| JP | 2004194262 A | 7/2004 |
| JP | 2004201296 A | 7/2004 |
| JP | 2004215022 A | 7/2004 |
| JP | 2004221972 | 8/2004 |
| JP | 2004266818 A | 9/2004 |
| JP | 2004529524 T | 9/2004 |
| JP | 2004297276 | 10/2004 |
| JP | 2004297370 A | 10/2004 |
| JP | 2004297756 | 10/2004 |
| JP | 2004534456 | 11/2004 |
| JP | 2004535106 A | 11/2004 |
| JP | 2005006337 | 1/2005 |
| JP | 2005020530 A | 1/2005 |
| JP | 2005502218 T | 1/2005 |
| JP | 2005506757 | 3/2005 |
| JP | 2005110130 A | 4/2005 |
| JP | 2005130491 | 5/2005 |
| JP | 2005167502 A | 6/2005 |
| JP | 2005197772 | 7/2005 |
| JP | 2005203961 | 7/2005 |
| JP | 2005521327 T | 7/2005 |
| JP | 2005521358 | 7/2005 |
| JP | 2005236678 A | 9/2005 |
| JP | 2006505172 | 2/2006 |
| JP | 2006506860 A | 2/2006 |
| JP | 2006211537 A | 8/2006 |
| JP | 2006524930 A | 11/2006 |
| JP | 2007503790 | 2/2007 |
| JP | 2007519281 | 7/2007 |
| JP | 2007520309 A | 7/2007 |
| JP | 2007525043 T | 8/2007 |
| JP | 2007527127 | 9/2007 |
| JP | 2008505587 A | 2/2008 |
| JP | 2008535398 | 8/2008 |
| JP | 4188372 B2 | 11/2008 |
| JP | 2008546314 | 12/2008 |
| JP | 04694628 B2 | 6/2011 |
| KR | 0150275 B1 | 11/1998 |
| KR | 20000060428 | 10/2000 |
| KR | 100291476 B1 | 3/2001 |
| KR | 20010056333 | 4/2001 |
| KR | 20010087715 A | 9/2001 |
| KR | 20030007965 | 1/2003 |
| KR | 20030035969 A | 5/2003 |
| KR | 20040063057 | 7/2004 |
| KR | 200471652 | 8/2004 |
| KR | 20040103441 | 12/2004 |
| KR | 20040103441 A | 12/2004 |
| KR | 20050063826 A | 6/2005 |
| KR | 100606099 | 7/2006 |
| RU | 95121152 | 12/1997 |
| RU | 2141168 | 11/1999 |
| RU | 2141706 | 11/1999 |
| RU | 2159007 C2 | 11/2000 |
| RU | 2162275 C2 | 1/2001 |
| RU | 2183387 C2 | 6/2002 |
| RU | 2192094 C1 | 10/2002 |
| RU | 2197778 C2 | 1/2003 |
| RU | 2201033 C2 | 3/2003 |
| RU | 2207723 | 6/2003 |
| RU | 2207723 C1 | 6/2003 |
| RU | 2208913 | 7/2003 |
| RU | 2210866 C2 | 8/2003 |
| RU | 2216101 C2 | 11/2003 |
| RU | 2216103 C2 | 11/2003 |
| RU | 2216105 | 11/2003 |
| RU | 2225080 C2 | 2/2004 |
| RU | 2235429 | 8/2004 |
| RU | 2235432 | 8/2004 |
| RU | 2237379 | 9/2004 |
| RU | 2238611 C1 | 10/2004 |
| RU | 2242091 C2 | 12/2004 |
| RU | 2250564 | 4/2005 |
| RU | 2257008 | 7/2005 |
| RU | 2267224 | 12/2005 |
| RU | 2005129079 A | 2/2006 |
| RU | 2285338 | 10/2006 |
| RU | 2285351 C2 | 10/2006 |
| RU | 2292655 | 1/2007 |
| RU | 2005106258 | 10/2008 |
| RU | 2349043 C2 | 3/2009 |
| SU | 1320883 | 6/1987 |
| TW | 508960 | 11/2002 |
| TW | 508960 B | 11/2002 |
| TW | 510132 | 11/2002 |
| TW | 200302642 | 8/2003 |
| TW | 200401572 | 1/2004 |
| TW | I232040 | 5/2005 |
| TW | 248266 | 1/2006 |
| TW | 200718128 | 5/2007 |
| WO | WO9408432 A1 | 4/1994 |
| WO | WO-9521494 A1 | 8/1995 |
| WO | WO9613920 A1 | 5/1996 |
| WO | WO9701256 | 1/1997 |
| WO | WO9737456 A2 | 10/1997 |
| WO | WO-9746033 A2 | 12/1997 |
| WO | 9800946 | 1/1998 |
| WO | WO-9814026 A1 | 4/1998 |
| WO | WO9837706 A2 | 8/1998 |
| WO | WO9848581 A1 | 10/1998 |
| WO | WO9853561 A2 | 11/1998 |
| WO | WO9854919 A2 | 12/1998 |
| WO | 9941871 | 8/1999 |
| WO | 99041871 | 8/1999 |
| WO | WO-9944313 A1 | 9/1999 |
| WO | WO-9944383 A1 | 9/1999 |
| WO | 9952250 | 10/1999 |
| WO | 99052250 | 10/1999 |
| WO | WO9953713 A2 | 10/1999 |
| WO | 9960729 | 11/1999 |
| WO | 99060729 | 11/1999 |
| WO | WO-9959265 A1 | 11/1999 |
| WO | 0004728 | 1/2000 |
| WO | WO0002397 | 1/2000 |
| WO | WO0033503 | 6/2000 |
| WO | 0051389 A1 | 8/2000 |
| WO | WO0070897 | 11/2000 |
| WO | WO01001596 | 1/2001 |
| WO | WO0117125 A1 | 3/2001 |
| WO | WO0126269 | 4/2001 |
| WO | WO-0139523 A2 | 5/2001 |
| WO | WO0145300 | 6/2001 |
| WO | WO-0148969 A2 | 7/2001 |
| WO | WO-0158054 A1 | 8/2001 |
| WO | WO-0160106 A1 | 8/2001 |
| WO | 0165637 A2 | 9/2001 |
| WO | WO0169814 A1 | 9/2001 |
| WO | WO0182543 A2 | 11/2001 |
| WO | WO-0182544 A2 | 11/2001 |
| WO | WO-0189112 A1 | 11/2001 |

(56) References Cited

FOREIGN PATENT DOCUMENTS

| | | |
|---|---|---|
| WO | 0195427 A2 | 12/2001 |
| WO | WO0193505 | 12/2001 |
| WO | 0204936 | 1/2002 |
| WO | WO0207375 A1 | 1/2002 |
| WO | 0215432 A1 | 2/2002 |
| WO | WO0215616 A2 | 2/2002 |
| WO | WO-0219746 A1 | 3/2002 |
| WO | 0231991 | 4/2002 |
| WO | 0233848 | 4/2002 |
| WO | 0245293 A2 | 6/2002 |
| WO | WO0245456 A1 | 6/2002 |
| WO | WO0249305 | 6/2002 |
| WO | WO-0249306 A2 | 6/2002 |
| WO | WO0249385 A2 | 6/2002 |
| WO | WO02060138 A2 | 8/2002 |
| WO | WO02065675 | 8/2002 |
| WO | WO02082689 A2 | 10/2002 |
| WO | WO-02082743 A2 | 10/2002 |
| WO | WO02089434 A1 | 11/2002 |
| WO | WO02093782 A1 | 11/2002 |
| WO | WO02093819 A1 | 11/2002 |
| WO | WO02100027 A1 | 12/2002 |
| WO | WO-03001696 A2 | 1/2003 |
| WO | WO03001696 A2 | 1/2003 |
| WO | WO03001761 A1 | 1/2003 |
| WO | WO-03001981 A2 | 1/2003 |
| WO | WO-03003617 A2 | 1/2003 |
| WO | WO03019819 | 3/2003 |
| WO | WO03030414 A1 | 4/2003 |
| WO | WO03034644 A1 | 4/2003 |
| WO | WO03043262 A1 | 5/2003 |
| WO | WO03043369 | 5/2003 |
| WO | 03049409 A2 | 6/2003 |
| WO | 03058871 | 7/2003 |
| WO | 03069816 A2 | 8/2003 |
| WO | WO03067783 | 8/2003 |
| WO | WO03069832 | 8/2003 |
| WO | WO03073646 | 9/2003 |
| WO | WO03075479 A1 | 9/2003 |
| WO | WO03085876 | 10/2003 |
| WO | WO03088538 A1 | 10/2003 |
| WO | WO03094384 | 11/2003 |
| WO | WO03103331 | 12/2003 |
| WO | WO 2004002047 A1 | 12/2003 |
| WO | 2004008681 | 1/2004 |
| WO | WO2004004370 | 1/2004 |
| WO | WO2004008671 | 1/2004 |
| WO | WO2004015912 | 2/2004 |
| WO | WO2004016007 | 2/2004 |
| WO | WO2004021605 A1 | 3/2004 |
| WO | WO2004023834 A1 | 3/2004 |
| WO | 2004028037 A1 | 4/2004 |
| WO | 2004030238 | 4/2004 |
| WO | 2004032443 | 4/2004 |
| WO | 2004038972 | 5/2004 |
| WO | 2004038984 A2 | 5/2004 |
| WO | WO2004038954 | 5/2004 |
| WO | WO-2004038988 A2 | 5/2004 |
| WO | WO-2004040690 A2 | 5/2004 |
| WO | WO-2004040827 A2 | 5/2004 |
| WO | 2004051872 | 6/2004 |
| WO | WO2004047354 A1 | 6/2004 |
| WO | WO2004049618 A1 | 6/2004 |
| WO | 2004056022 A2 | 7/2004 |
| WO | WO2004062255 | 7/2004 |
| WO | WO2004064294 | 7/2004 |
| WO | WO2004064295 | 7/2004 |
| WO | 2004073276 | 8/2004 |
| WO | WO2004066520 | 8/2004 |
| WO | WO2004068721 A2 | 8/2004 |
| WO | WO2004075023 | 9/2004 |
| WO | WO2004075442 | 9/2004 |
| WO | WO2004075448 | 9/2004 |
| WO | WO2004075468 | 9/2004 |
| WO | WO2004075596 | 9/2004 |
| WO | WO2004077850 A2 | 9/2004 |
| WO | WO2004084509 | 9/2004 |
| WO | WO-2004086706 A1 | 10/2004 |
| WO | WO-2004086711 A1 | 10/2004 |
| WO | WO2004095730 A1 | 11/2004 |
| WO | WO-2004095851 A2 | 11/2004 |
| WO | WO2004095854 | 11/2004 |
| WO | WO-2004098072 A2 | 11/2004 |
| WO | WO2004098222 | 11/2004 |
| WO | WO2004102815 | 11/2004 |
| WO | WO2004102816 A2 | 11/2004 |
| WO | 2004114564 A1 | 12/2004 |
| WO | 2004114615 A1 | 12/2004 |
| WO | WO2004105272 A1 | 12/2004 |
| WO | WO2004114549 | 12/2004 |
| WO | 2005002253 | 1/2005 |
| WO | 2005011163 A1 | 2/2005 |
| WO | 2005015797 | 2/2005 |
| WO | 2005018270 | 2/2005 |
| WO | WO-2005015795 A1 | 2/2005 |
| WO | WO2005015810 | 2/2005 |
| WO | WO-2005015941 A2 | 2/2005 |
| WO | WO2005020488 A1 | 3/2005 |
| WO | WO2005020490 | 3/2005 |
| WO | WO2005022811 A2 | 3/2005 |
| WO | WO2005025110 A2 | 3/2005 |
| WO | 2005032004 A1 | 4/2005 |
| WO | 2005043780 A1 | 5/2005 |
| WO | WO2005043855 | 5/2005 |
| WO | WO2005046080 A1 | 5/2005 |
| WO | 2005055465 A1 | 6/2005 |
| WO | WO2005055484 A1 | 6/2005 |
| WO | WO-2005055527 A1 | 6/2005 |
| WO | WO2005060192 A1 | 6/2005 |
| WO | WO-2005065062 A2 | 7/2005 |
| WO | WO-2005069538 A1 | 7/2005 |
| WO | WO2005074184 | 8/2005 |
| WO | 2005086440 A1 | 9/2005 |
| WO | WO-2005096538 A1 | 10/2005 |
| WO | WO2005122628 | 12/2005 |
| WO | 2006007292 A2 | 1/2006 |
| WO | WO2006019710 | 2/2006 |
| WO | WO-2006026344 A1 | 3/2006 |
| WO | WO2006044487 | 4/2006 |
| WO | 2006062356 A1 | 6/2006 |
| WO | 2006069301 | 6/2006 |
| WO | WO2006069300 | 6/2006 |
| WO | WO2006069397 | 6/2006 |
| WO | WO2006077696 | 7/2006 |
| WO | 2004073276 | 8/2006 |
| WO | 2006099545 | 9/2006 |
| WO | 2006099577 | 9/2006 |
| WO | WO-2006096784 A1 | 9/2006 |
| WO | WO-2006099349 A1 | 9/2006 |
| WO | 2006127544 | 11/2006 |
| WO | WO-2006134032 A1 | 12/2006 |
| WO | WO-2006138196 A1 | 12/2006 |
| WO | WO-2006138573 A2 | 12/2006 |
| WO | WO2006138581 A2 | 12/2006 |
| WO | 2007022430 A2 | 2/2007 |
| WO | 2007024935 | 3/2007 |
| WO | WO-2007024934 A2 | 3/2007 |
| WO | WO2007025160 | 3/2007 |
| WO | WO-2007051159 A2 | 5/2007 |

OTHER PUBLICATIONS

Bingham, "Other Types of MCM," ADSL, VDSL, and Multicarrier Modulation, John Wiley & Sons, New York, XP-002199502. 2000, pp. 111-113.

Chennakeshu, et al. "A Comparision of Diversity Schemes for a Mixed-Mode Slow Frequency-Hopped Cellular System," IEEE, 1993, pp. 1749-1753.

Chennakeshu, et al. "Capacity Analysis of a TDMA-Based Slow-Frequency—Hopped Cellular Systems," IEEE Transaction on Vehicular Technology, vol. 45., No. 3 Aug. 1996, pp. 531-542.

Chiani, et al. "Outage Evaluation for Slow Frequency-Hopping Mobile Radio Systems" IEEE Transactions on Communications, vol. 47, No. 12, pp. 1865-1874, Dec. 1999.

(56) References Cited

OTHER PUBLICATIONS

Choi, et al., "Design of the Optimum Pilot Pattern for Channel Estimation in OFDM Systems," Global Telecommunications Conference, IEEE Communications Society, pp. 3661-3665. Globecom, Dallas, Texas (2004).
Czylwik, "Comparison Between Adaptive OFDM and Single Carrier Modulation with Frequency Domain Equalization," IEEE 47th Vehicular Technology Conference, vol. 2, May 4-7, 1997, pp. 865-869.
Das, et al. "On the Reverse Link Interference Structure for Next Generation Cellular Systems," European Microwave Conference, Oct. 11, 2004, pp. 3068-3072.
Hill, et al., "Cyclic Shifting and Time Inversion of Partial Transmit Sequences to Reduce the Peak-to-Average Power Ratio in OFDM," IEEE International Symposium on Personal, Indoor and Mobile Radio Communications, vol. 2, Sep. 18, 2000, Piscataway, NJ, p.
Je, et al. "A Novel Multiple Access Scheme for Uplink Cellular Systems," IEEE Vehicular Technology Conference, Sep. 26, 2004 pp. 984-988.
Kaleh. "Channel Equalization for Block Transmission Systems," IEEE Journal on Selected Areas in Communications, vol. 13, No. 1, Jan. 1995, pp. 110-121.
Kappes, J.M., and Sayegh, S.I., "Programmable Demultiplexer/Demodulator Processor," COMSAT Laboratories, IEEE, 1990, pp. 230-234.
Keller, et al., "Adaptive Multicarrier Modulation: A Convenient Framework for Time-Frequency Processing in Wireless Communications," Proceedings of the IEEE; vol. 88, No. 6, May 2000, pp. 611-640.
Kim, et al. "Performance of TDMA System With SFH and 2-Bit Differentially Detected GMSK Over Rayleigh Fading Channel," IEEE Vehicular Technology Conference, Apr. 28, 1996, pp. 789-793.
Kishiyama Y et al: "Investigation of Optimum Pilot Channel Structure tor VSF-OFCDM Broadband Wireless Access in Forward Link", IEEE Vehicular Technology Conference, New York, NY, US, vol. 4, pp. 139-144, Apr. 22, 2003.
Kostic, et al. "Fundamentals of Dynamic Frequency Hopping in Cellular Systems," IEEE Journal on Selected Areas in Communications, vol. 19, No. 11, Nov. 2001 pp. 2254-2266.
Kostic, et al. "Dynamic Frequency Hopping in Wireless Cellular Systems-Simulations of Full-Replacement and Reduced-Overhead Methods," IEEE Vehicular Technology Conference, May 16, 1999, pp. 914-918.
Lacroix, et al., "A Study of OFDM Parameters for High Data Rate Radio LAN's," 2000 IEEE 51st Vehicular Technology Conference Proceedings, vol. 2, May 15-18, 2000, pp. 1075-1079.
Leon, et al., "Cyclic Delay Diversity for Single Carrier-Cyclic Prefix Systems," Conference Record of the Thirty-Ninth Asilomar Conference on Signals, Systems and Computers, Oct. 28, 2005, Piscataway, NJ, pp. 519-523.
Lott, "Comparison of Frequency arid Time Domain Differential Modulation in an OFDM System for Wireless ATM," 1999 IEEE 49th Vehicular Technology Conference, vol. 2, Jul. 1999, pp. 877-883.
SKLAR: "Formatting and Baseband Transmission", Chapter 2, pp. 54, 104-106.
Tellambura, "Use of m-sequences for OFDM Peak-to-Average Power Ratio Reduction." Electronics Letters, vol. 33, No. 15, Jul. 17, 1997, pp. 1300-1301.
Torrieri, "Cellular Frequency-Hopping CDMA Systems," IEEE Vehicular Technology Conference, May 16, 1999, pp. 919-925.
Xiaodong, et el., "M-Sequences for OFDM Peak-to-Average Power Ratio Reduction and Error Correction," Electronics Letters, vol. 33, Issue 7, Mar. 27, 1997, pp. 554-555.
Zekri, et al., "DMT Signals with Low Peak-to-Average Power Ratio," Proceedings, IEEE International Symposium on Computers and Communications, Jul. 6-8, 1999, pp. 362-368.
3rd Generation Partnership Project; Technical Specification Group Radio Access Network; Physical Layer Aspects for Evolved UTRA (Release 7), 3GPP TR 25.814 v0.3.1 (Nov. 2005).

Written Opinion PCT/US06/014879 International Search Authority European Patent Office Oct. 19, 2007.
International Preliminary Report on Patentability—PCT/US06/014879, The International Bureau of WIPO—Geneva, Switzerland, Oct. 23, 2007.
Dinis, et al., "A Multiple Access Scheme for the Uplink of Broadband Wireless Systems," IEEE Global Telecommunications Conference, 2004, GLOBECOM '04, vol. 6, Nov. 29-Dec. 3, 2004, pp. 3808-3812.
Schnell, et al., "A Promising New Wideband Multiple-Access Scheme for Future Mobile Communications Systems,"European Transactions on Telecommunications, Wiley & Sons, Chichester, GB, vol. 10, No. 4, Jul. 1999, pp. 417-427.
International Search Report—PCT/US06/014879, International Search Authority—European Patent Office, Jan. 15, 2007.
European Search Report—EP07025189, Search Authority—Munich Patent Office, Mar. 6, 2008.
J.S. Chow et al., : "A cost-effective maximum likelihood receiver for multicarrier systems," Proc. iEEE Int. Conf. On. Comm., p. 948-952, Jun. 1992.
Hermann Rohling et al., : "Performance Comparison of Different Multiple Access Schemes for the Downlink of an OFDM Communication System" Vehicular Technology COnference, 1997, 47th IEEE, vol. 3, May 4-7, 1997, pp. 1365-1369.
Karsten Bruninghaus et al., : "Multi-Carrier Spread Spectrum and It's relationship to Single-Carrier Transmission", Vehicular technology Conference, 1998, VTC 98, 48th IEEE, vol. 3, May 18-21, 1998, p. 2329-2332.
Sorger U. et al., : "Interleave FDMA-a new spread-spectrum multiple-access scheme", IEEE Int. Conference on Atlanta, GA, USA Jun. 7-11, 1998, XP010284733.
Wang, et al., "Improving performance of multi-user OFDM systems using bit-wise interleaver" Electronics Letters, IEE Stevenage, GB, vol. 37, No. 19, Sep. 13, 2001, pp. 1173-1174, XP006017222.
Yun, et al., "Performance of an LDPC-Coded Frequency-Hopping OFDMA System Based on Resource Allocation in the Uplink" Vehicular Technology Conference, 2004. VTC 2004-Spring. 2004 IEEE 59th Milan, Italy, May 17-19, 2004, Piscataway, NJ, USA, vol. 4, May 17, 2004, pp. 1925-1928, XP010766497.
Wang, et al., "Improving performance of multi-user OFDM systems using bit-wise interleaver" Electronics Letters: IEE Stevenage, GB, vol. 37, No. 19, Sep. 13, 2001, pp. 1173-1174, XP006017222.
Yun, et al., "Performance of an LDPC-Coded Frequency-Hopping OFDMA System Based on Resource Allocation in the Uplink" Vehicular Technology Conference, 2004. VTC 2004-Spring, 2004 IEEE 59th Milan, Italy, May 17-19, 2004, Piscataway, NJ, USA, vol. 4, May 17, 2004, pp. 1925-1928, XP010766497.
Das, Arnab, et al. "Adaptive, asynchronous incremental redundancy (A-IR) with fixed transmission time intervals TTI for HSDPA." IEEE, pp. 10-83-1087.
Digital cellular telecommunications system (Phase 2+); Mobile radio interface layer 3 specification (GSM 04.08 version 7.7.1 Release 1998); ETSI EN 300 940 V7.7.1 (Oct. 2000), pp. 1,2,91-93.
Favre et al: "Self-Adaptive Transmission Procedure" IBM Technical Disclosure Bulletin, IBM Corporation, Sep. 1976, vol. 19, No. 4, pp. 1283-1284, New York, New York.
Fuchs, et al., "A Novel Tree-Based Scheduling Algorithm for the Downlink of Multi-User MIMO Systems with ZF Beamforming," IEEE International Conference on Acoustics, Speech, and Signal Processing, 2005, Proceedings, Philadelphia, PA, pp. 1121-1124.
Groe, et al., "CDMA Mobile Radio Design," Sep. 26, 2001, Artech House, Norwood, MA 02062, pp. 257-259.
International Search Report and Written Opinion—PCT/US06/014879, International Search Authority—European Patent Office, Jan. 15, 2007.
John B. Groe, Lawrence E. Larson, "CDMA Mobile Radio Design" Sep. 26, 2001, Artech House, Norwood, MA02062 580530, XP002397967, pp. 157-159.
Laroia, R. et al: "An integrated approach based on cross-layer optimization—Designing a mobile broadband wireless access network" IEEE Signal Processing Magazine, IEEE Service Center, Piscataway, NJ, US, vol. 21, No. 5, Sep. 2004, pp. 20-28, XP011118149.

(56) References Cited

OTHER PUBLICATIONS

Lau, et al., "On the Design of MIMO Block-Fading Channels with Feedback-Link Capacity Constraint," IEEE Transactions on Communications, IEEE Service Center, Piscataway, NJ, US, v. 52, No. 1, Jan. 2004, pp. 62-70, XP001189908.
Lettieri et al: "Adaptive frame length control for improving wireless link throughput, range, and energy efficiency", INFOCOM 98, 17th Annual Joint Conference of the IEEE Computer and Communications Societies, Mar. 29-Apr. 2, 1998, pp. 564-571, vol. 2, IEEE San Francisco, CA, New York, New York.
Molisch, et al., MIMO systems with antenna selection, IEEE Microwave Magazine, URL: http://ieeexplore.ieee.org/iel5/6668/28677/01284943.pdf, Retrieved on Dec. 8, 2006, pp. 46-56 (2004).
NTT DoCoMo, et al.: "Orthogonal Common Pilot Channel and Scrambling Code in Evolved UTRA Downlink," 3GPP TSG RAN WG1 #42 on LTE, pp. 1-8 (Aug.-Sep. 2005).
TIA/EIA/IS-2000 "Standards for CDMA2000 Spread Spectrum Systems" Version 1.0 Jul. 1999.
TIA/EIA/IS-95 "Mobile Station-Base Station Compatibility Standard for Dual-Mode Wideband Spread Spectrum Cellular System" Jul. 1993.
TIA-1121.001 "Physical Layer for Ultra Mobile Broadband (UMB) Air Interface Specification," 3GPP2 C.S0084-001-0, Version 2.0 (Aug. 2007).
Tia-1121.002 "Medium Access Control Layer for Ultra Mobile Broadband (UMB) Air Interface Specification," 3GPP2 C.S0084-002-0, Version 2.0 (Aug. 2007).
Tomcik, J.: "MBFDD and MBTDD Wideband Mode: Technology Overview," IEEE 802.20 Working Group Mobile Broadband Wireless Access, Jan. 2006, pp. 1-109, XP002429968.
Tomcik, J.: "QFDD Technology Overview Presentation," IEEE 802.20 Working Group on Mobile Broadband Wireless Access, Slides/pp. 1-73, Nov. 15, 2005 and Oct. 28, 2005.
Toufik I et al., "Channel allocation algorithms for multi-carrier systems", Vehicular Technology Conference, 2004. VTC2004-Fall. 2004 IEEE 60TH Los Angeles, CA, USA Sep. 26-29, 2004, pp. 1129-1133, XP010786798, ISBN: J07-7803-8521-7.
S. Nishimura et al., "Downlink Null-Formation Using Receiving Antenna Selection in MIMO/SDMA", Technical Search Report of Electric Information Communication Academic Conference, Feb. 28, 2002, vol. 101, No. 683, pp. 17-22, RCS 2001-286.
3GPP TS 33.220 V.1.1.0 XX,XX, "3rd Generation Partnership Projects; Technical Specification Group Services and System Aspects; Generic Authentication Architecture (GAA); Generic Bootstrapping Architecture (Release 6)" Feb. 9, 2004, pp. 1-17, figure 4, XP002996023.
Net Working Group, T. Dierks, C. Allen, Certicom; The TLS Protocol Version 1.0; Jan. 1999.
Jim Tomcik Qualcomm Incorporated: "QFDD Technology Overview Presentation", IEEE 802.20 Working Group on Mobile Broadband Wireless Access, [Online] Nov. 15, 2005, pp. 1-73, XP002467626.
Maniatis, I. et al., "Pilots for joint channel estimation in multi-user OFDM mobile radio systems," Spread Spectrum Techniques and Applications, 2002 IEEE Seventh International Symposium, Sep. 2, 2002, pp. 44-48, XP010615562.
Blum et al, "On Optimum MIMO with antenna selection," IEEE International Conference on Communications: Conference Proceedings, vol. 1, Apr. 28, 2002, pp. 386-390.
Catreux, S. et al.: "Simulation results for an interference-limited multiple input multiple output cellular system"., Global Telecommunications Conference, 2000. GLOBECOM '00. IEEE. Dec. 1, 2000. vol. 2, pp. 1094-1096 http://ieeexplore.ieee.org/iel5/7153/19260/00891306.pdf?tp=&isnumber=19260&arnumber=8913063&punumber=7153.
Chung, S. et al.: "Low complexity algorithm for rate and power quantization in extended V-Blast" VTC Fall 2001. IEEE 54th. Vehicular Technology Conference Proceedings. Atlantic City, NJ, Oct. 7-11, 2001, vol. 1 of 4, pp. 910-914, Conf. 54.
El Gamal, et al.: "Universal Space-Time Coding," IEEE Transactions on Information Theory, vol. 49, Issue 5, pp. 1097-1119, XP011074756, ISSN: 0018-9448, May 2003.
Hochwald et al., "Achieving near-capacity on a multiple-antenna channel," IEEE Transactions on Communications, IEEE Service Center, Piscataway, New Jersey, vol. 51, No. 3, pp. 389-399 (2003).
Kiessling et al, "Short-term and long-term diagonalization of correlated MIMO channels with adaptive modulation" IEEE International Symposium on Personal, Indoor and Mobile Radio Communications, vol. 2, Sep. 15, 2002, pp. 593-597.
Kousa, M. et al: "Adaptive Binary Coding for Diversity Communication Systems" IEEE International Conference on Personal Wireless Communications Proceedings, pp. 80-84, XP000992269, 1997.
Nokia, "Uplink Considerations for UTRA LTE", 3GPP TSG RAN WG1#40bis, Beijing, CN, R1-050251, 3GPP, Apr. 4, 2005, pp. 1-9.
NTT DoCoMo, "Downlink Multiple Access Scheme for Evolved UTRA", 3GPP R1-050249, 3GPP, Apr. 4, 2005, pp. 1-8.
Prasad, N. et al.: "Analysis of Decision Feedback Detection for MIMO Rayleigh Fading Channels and Optimum Allocation of Transmitter Powers and QAM Constellations," pp. 1-10, 39th Annual Conference on Comm. Control and Comput., Monticello, IL Oct. 2001.
Qualcomm Europe: "Description and link simulations for OFDMA based E-Utra uplink" 3GPP Draft; R1-051100, 3RD Generation Partnership Project (3GPP), Mobile Competence Centre; 650, Route Des Lucioles ; F-06921 Sophia-Antipolis Cedex ; France, vol. RAN WG1, no. San Diego, USA; 20051004, Oct. 4, 2005, pp. 1-10, XP050100715.
Widdup, B. et al., "A highly-parallel VLSI architecture for a list sphere detector," IEEE International Conference, Paris, France, vol. 5, pp. 2720-2725 (2004).
Wiesel, A. et al.: "Efficient implementation of sphere demodulation" Signal Processing Advances in Wireless Communications, 2003. SPAWC 200 3. 4TH IEEE Workshop on Rome. Italy Jun. 15-18, 2003, Piscataway, NJ, USA, IEEE, US, Jun. 15, 2003, pp. 36-40, XP010713463.
B. Sklar: "The process of thus correcting the channel-induced distortion is called equalization", Digital Communications, PTR Prentice Hall, Upper Saddle River, New Jersey, 1998, Formatting and Baseband Transmission, Chap. 2, Section 2.11.2, pp. 104-106.
Guo, K. Et al.: "Providing end-to-end QoS for multimedia applications in 3G wireless networks," Proceedings vol. 5242, SPIE ITCom 2003 Conf. Internet Multimedia Management Systems IV, Nov. 26, 2003, pp. 1-14, DOI: 10.1117/12.514061.
Sumii, Kenji, et al., "A Study on Computational Complexity Reduction of Iterative Decoding for Turbo-coded MIMO-SDM Using Sphere Decoding," Technical Report of IEICE. RCS, Nov. 9, 2010, vol. 104, No. 675, pp. 43-48.
Taiwan Search Report—TW095129021—TIPO—May 24, 2011.
Tomcik, T.: "QTDD Performance Report 2," IEEE C802.20-05/88, IEEE 802.20 Working Group on Mobile Broadband Wireless Access, <http://ieee802.org/20/>, pp. 1-56, XP002386798 (Nov. 15, 2005).
Voltz, P. J.,"Characterization of the optimum transmitter correlation matrix for MIMO with antenna subset selection", IEEE Transactions on Communications, vol. 51, No. 11, pp. 1779-1782, (Nov. 1, 2003).
Yongmei Dai,; Sumei Sun; Zhongding Lei; Yuan Li.: "A List Sphere Decoder based turbo receiver for groupwise space time trellis coded (GSTTC) systems," 2004 IEEE 59th Vehicular Technology Conference, vol. 2, pp. 804-808, May 17, 2004, doi: 10.1109/VETECS.2004.1388940.
Dammann, A. et al., "Beamforming in Combination with Space-Time Diversity for Broadband OFDM Systems", ICC 2002. 2002 IEEE International Conference on Communications. Apr. 28-May 2, 2002, pp. 165-171, XP010589479.
Ken Murakami et al., "Status Toward Standardization at IEEE 802.3ah and Challenge to System Architecture," Technical Report of the Institute of Electronics, Information and Communication Engineers, Jun. 13, 2003, vol. 103, No. 124, pp. 1-6, IN2003-24.
Viswanath P et al: "Opportunistic beamforming using dumb antennas" IEEE Transactions on Information Theory IEEE USA, vol. 48, No. 6, Jun. 2002, pp. 1277-1294, XP002314708 ISSN: 0018-9448 abstract right-hand column, paragraph 1.

(56) References Cited

OTHER PUBLICATIONS

Alcatel-Lucent, et al., "Dedicated Reference Signals for Precoding in E-UTRA Downlink" 3GPP Draft; R1-071718, 3rd Generation Partnership Project (3GPP), Mobile Competence Centre; 650, Route Des Lucioles; F-06921 Sophia-Antipolis Cedex; France, vol. RAN WG1, no. St. Julian; Apr. 3, 2007, XP050105640 [retrieved on Apr. 3, 2007].
Bengtsson, M. et at, "A Generalization of Weighted Subspace Fitting to Full-Rank Models", IEEE Transactions on Signal Processing, IEEE Service Center, New York, NY, US, vol. 49, No. 5, pp. 1002-1012, May 1, 2001.
European Search Report—EP10184156—Search Authority—Munich—Jun. 14, 2012.
Miorandi D., et al., "Analysis of master-slave protocols for real-time industrial communications over IEEE 802.11 WLANs" Industrial Informatics, 2004. Indin '04, 2nd IEEE International Conference on Berlin, Germany Jun. 24-26, 2004. Piscataway, NJ, USA IEEE, Jun. 24, 2004, pp. 143-148, XP010782619, ISBN 0789385136, Para 3, point B.
Physical Channels and Multiplexing in Evolved UTRA Downlink TSG-RAN Working Group 1 Meeting, XX, XX, vol. RI-050590, Jun. 20, 2005, pp. 1-24, XP003006923 the whole document.
Siemens, "Evolved UTRA uplink scheduling and frequency reuse" [online], 3GPP TSG-RAN WG1 # 41 R1-050476, Internet <URL:http://www.3gpp.org/ftp/tsg_ran/WG1_RL1/TSGR1_41/Docs/R1-050476.zip>, May 9, 2005.
Yatawatta, S. et al., "Energy Efficient Channel Estimation in MIMO Systems", 2005 IEEE International Conference on Acoustics, Speech, and Signal Processing, Mar. 18-23, 2005, Philadelphia, vol. 4, pp. 317-320, Mar. 18, 2005.
Anonymous: "3GPP TS 36.211 V8.0.0; Evolved Universal Terrestrial Radio Access (E-UTRA); Physical channels and modulation (Release 8)" 3rd Generation Partnership Project; Technical Specification Group Radio Access Network, [Online] 2007, XP002520076 Retrieved from the Internet: URL:http://www.Sgpp.org/ftp/Specs/html-i nfo/36211.htm> [retrieved on Sep. 27, 2007] Section 5.
Jim Tomcik, QFDD and QTDD: Technology Overview, IEEE 802.20 Working Group on Mobile Broadband Wireless Access, Oct. 28, 2005, pp. 48-50, URL, http://www.ieee802.org/20/contribs/c802.20-05-68.zip.
Nokia: "Compact signalling of multi-code allocation for HSDPA", version 2,3GPP R1-02-0018, Jan. 11, 2002.
Sethi M, et al., "Code Reuse DS-CDMA—A Space Time Approach", Proceedings of the 2002 IEEE International Conference on Acoustics, Speech, and Signal Processing (ICASSP), pp. 2297-2300, May 13-17, 2002.
Bhushan N., "UHDR Overview", C30-20060522-037, Denver, CO, May 22, 2006, pp. 1-115.
Samsung: "Uplink Transmission and Multiplexing for EUTRA", 3GPP Draft; R1-050605 UL Multiplexing, Jun. 16, 2005, XP050111420.
Tachikawa (Editor); "W-CDMA Mobile Communication Systems," John Wiley & Sons Ltd., Japan, Maruzen: pp. 82-213, Jun. 25, 2001.

LG Electronics: "PAPR comparison of uplink MA schemes", 3GPP TSG RAN WG1 Meeting #41, R1-050475, May 9-13, 2005, pp. 6.
Motorola, "Uplink Numerology and Frame Structure", 3GPP TAG RAN1 #41 Meeting R1-050397, May 13, 2005.
Samsung Electonics Co. Ltd.; "Uplink Multiple Access and Multiplexing for Evolved UTRA", R1-050439, May 3, 2005, pp. 1-22, XP55018616, Retrieved from the Internet: URL:http://www.3gpp.org/ftp/tsg_ran/WG1_R1/TSGR1 / DOCS / [retrieved on Feb. 7, 2012].
Mignone, et al., "CD3-OFDM: A New Channel Estimation Method to Improve the Spectrum Efficiency in Digital Terrestrial Television Systems," International Broadcasting Convention, Sep. 14-18, 1995 Conference Publication No. 413, IEE 1995, pp. 122-128.
Naofal Al-Dhahir: "A Bandwidth-Optimized Reduced-Complexity Equalized Multicarrier Transceiver", IEEE Transactions on Communications, vol. 45, No. 8, Aug. 1997.
Naofal Al-Dhahir: "Optimum Finite-Length Equalization for Multicarrier Transceivers", IEEE Trans. On Comm., pp. 56-64, Jan. 1996.
Nassar, Carl R., et al., "High-Performance MC-CDMA via Carrier Interferometry Codes", IEEE Transactions on Vehicular Technology. vol. 50, No. 6, Nov. 2001.
Nassar, Carl R., et al., Introduction of Carrier Interference to Spread Spectrum Multiple Access. Apr. 1999, IEEE, pp. 1-5.
Sari, et al., "Transmission Techniques for Digital Terrestrial TV Broadcasting," IEEE Communications Magazine, Feb. 1995, pp. 100-109.
Schnell, et al, "Application of IFDMA to Mobile Radio Transmission," IEEE 1998 International Conference on Universal Personal Communications, vol. 2, Oct. 5-9, 1998, pp. 1267-1272.
Shattil et al., "Array Control Systems for Multicarrier Protocols Using a Frequency-Shifted Feedback Cavity", IEEE, 1999.
Sklar: "The process of thus correcting the channel-induced distortion is called equalization", Digital Communications, PTR Prentice Hall, Upper Saddle River, New Jersey, 1998, Formatting and Baseband Transmission, Chap. 2, Section 2.11.2, pp. 104-105.
Tellado, "Multicarrier Modulation with Low Par," Kluwer Academic, Dordrecht, NL, XP-002199500, 2000, pp. 6-11 and 55-60.
Sklar, B., "The process of thus correcting the channel-induced distortion is called equalization", Digital Communications, PTR Prentice Hall, Upper Saddle River, New Jersey, 1998, Formatting and Baseband Transmission, Chap. 2, Section 2.11.2, pp. 54, 104-106.
Tomcik J., "QFDD and QTDD: Proposed Draft Air Interface Specification," IEEE C802.20-05/69, IEEE 802.20 Working Group on Mobile Broadband Wireless Access, Oct. 28, 2005, p. 1-6, 1-7, 1-16, 6-65, 7-11, 7-33, 7-37-7-55, 9-21, 9-22, 9-24-9-32.
Digital cellular telecommunications system (Phase 2+); General Packet Radio Service (GPRS); Mobile Station (MS)—Base Station System (BSS)interface; Radio Link Control/Medium Access Control (RLC/MAC) protocol (GSM 04.60 version 8.4.1 Release 1999), 3GPP Standard; ETSI EN 301 349, 3rd Generation Partnership Project (3GPP), Mobile Competence Centre; 650, Route Des Lucioles; F-06921 Sophia-Antipolis Cedex; France, No. V8.4.1, Oct. 1, 2000, pp. 1-243, XP050358534.

* cited by examiner

FREQUENCY HOPPING DESIGN FOR SINGLE CARRIER FDMA SYSTEMS

CROSS-REFERENCE TO RELATED APPLICATIONS

This application claims benefit under 35 U.S.C. §119(e) from U.S. Provisional Patent application Ser. No. 60/672,575 entitled Frequency Hopping In Interleaved Frequency Division Multiple Access Communication Systems, and filed Apr. 19, 2005, and Provisional Patent Application Ser. No. 60/691,755 filed Jun. 16, 2005 the entirety of which is hereby incorporated by reference.

Reference to Co-Pending Applications for Patent

The present Application for Patent is related to the following co-pending U.S. patent application Ser. No. 11/173,873, filed Jun. 30, 2005 assigned to the assignee hereof, and expressly incorporated by reference herein.

BACKGROUND

I. Field

The following description relates generally to wireless communications, and more particularly to mitigating interference between user devices in nearby communication sectors by employing frequency hopping in a single carrier FDMA network environment.

II. Background

Wireless communication systems have become a prevalent means by which a majority of people worldwide has come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

More particularly, frequency division based techniques typically separate the spectrum into distinct channels by splitting it into uniform chunks of bandwidth, for example, division of the frequency band allocated for wireless communication can be split into 30 channels, each of which can carry a voice conversation or, with digital service, carry digital data. Each channel can be assigned to only one user at a time. One known variant is an orthogonal frequency division technique that effectively partitions the overall system bandwidth into multiple orthogonal subbands. These subbands are also referred to as tones, carriers, subcarriers, bins, and frequency channels. Each subband is associated with a subcarrier that can be modulated with data. With time division based techniques, a band is split time-wise into sequential time slices or time slots. Each user of a channel is provided with a time slice for transmitting and receiving information in a round-robin manner. For example, at any given time t, a user is provided access to the channel for a short burst. Then, access switches to another user who is provided with a short burst of time for transmitting and receiving information. The cycle of "taking turns" continues, and eventually each user is provided with multiple transmission and reception bursts.

A typical wireless communication network (e.g., employing frequency, time, and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. Such communication between base station and mobile terminal or between mobile terminals can be degraded due to channel variations and/or interference power variations. For example, the aforementioned variations can affect base station scheduling, power control and/or rate prediction for one or more mobile terminals.

In the case of OFDMA-based systems, the particular waveforms and power required to transmit communication signals thereon typically exhibit an undesirably high peak-to-average ratio (PAR), which limits the coverage of OFDMA systems due to the inefficiencies of non-linear power amplifiers. Single carrier FDMA systems can mitigate problems associated with an undesirably high PAR, but are still subject to a variety of limitations that create a need in the art for a system and/or methodology of mitigating interference between mobile devices and/or sectors in such wireless network systems.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a method of generating transmission symbols can comprise generating at least one single-carrier FDMA symbol, assigning a set of subcarriers to transmit the at least one symbol, generating at least one other single carrier FDMA symbol, and varying subcarrier set assignments according to a predetermined pattern for transmission of the at least one other single-carrier FDMA symbol. Varying the subcarrier set assignments can comprise changing an assignment of at least one offset in a predetermined set of offsets. The predetermined pattern can be delineated by transmission of a number of frames, expiration of a time period, etc., and subcarrier set assignments can be varied at fixed intervals delineated by the transmission of a predetermined number of single-carrier FDMA symbols. Additionally, assigning subcarriers to a user device can comprise generating a channel tree including a plurality of nodes, assigning each child node a node value that represents a non-negative integer, and assigning a user device to a node in the channel tree to define the subcarrier set assigned to the user device.

According to another aspect, an apparatus that facilitates frequency hopping for single carrier FDMA communication can comprise a memory and a processor coupled with the memory, the processor configured to assign an offset to a user device and to vary the offset for the user device according to a predetermined pattern. Nodes in the channel tree can be assigned values, and the processor can read the channel tree along a path from the node assigned to the user device to the first child node of a root node in the channel tree and evaluate a value for the path. Additionally, the processor can be further configured to perform a table lookup to identify an offset corresponding to the value of the path from the node assigned to the user device to the root node and assigns to at least one of the user devices the identified offset. The user device can thus be assigned an offset corresponding to the value of the path to the node assigned to the user device from the root node. The processor can periodically permute node value assignments of one or more nodes in the channel tree to change the offset of the user device by changing the value of the path from the user-assigned node to the root node.

According to yet another aspect, an apparatus can comprise means for generating at least one single-carrier FDMA symbol, means for assigning a set of subcarriers to transmit the at least one symbol, means for generating at least one other single carrier FDMA symbol, and means for varying subcarrier set assignments, according to a predetermined pattern for transmission of the at least one other single-carrier FDMA symbol. The means for assigning can comprise means for allocating a node in a channel tree to the user device and means for assigning a value to each node in the channel tree and means for reading a path in the channel tree from an allocated user node to a root node to determine a value for nodes in the path that identifies the set of subcarriers to assign to the user device and a number of subcarriers to include in the set.

The means for varying subcarrier set assignments can periodically alter values assigned to one or more nodes in the channel tree to vary the value of the path between the allocated user node and the root node. The means for assigning can assign a new set of subcarriers associated with the varied value of the path from the allocated user node to the root node upon variation by the means for varying subcarrier set assignments.

Yet another aspect relates to a computer-readable medium having stored thereon computer-executable instructions for assigning an offset-related entity to a user device and periodically varying the offset for the user device based at least in part on the assigned entity. The computer-readable medium can further comprise instructions for assigning a value to each node of a channel tree, allocating a node to at least one user device to assign a subcarrier set to the at least one user device, and permuting node values according to a pattern to change the subcarrier set assigned to the at least one user device.

Still another aspect relates to a wireless communication device that comprises a memory comprising information corresponding to a plurality of offset assignments for transmission of single-carrier FDMA symbols and a processor, coupled with the memory, the processor configured to vary the offset assignments according to a predetermined pattern based upon the information. The information can correspond to values for nodes of a channel tree, and the nodes can correspond to root nodes and child nodes. Additionally, the channel tree can be a non-binary channel tree wherein each node has one or more child nodes. Moreover, node values can correspond to values generated by reading the channel tree along a path from the node assigned to the user device to the first child node of a root node in the channel tree and evaluating a value for the path. Information related to node values, offsets, assignments, and the like can be stored in a look-up table in the wireless communication device.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
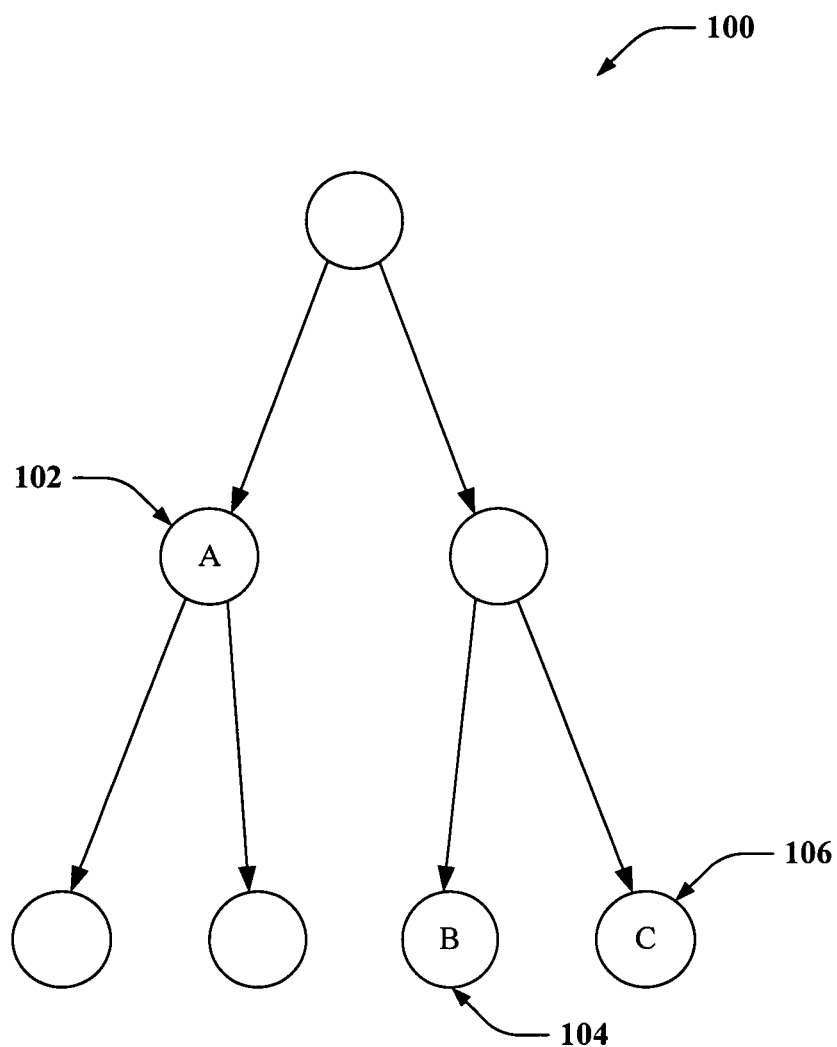
FIG. 1 illustrates a binary channel tree that can be employed in conjunction with a single carrier FDMA network to facilitate varying user device offsets in accordance with various aspects.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a subscriber station. A subscriber station can also be called a system, a subscriber unit, mobile station, mobile, remote station, access point, base station, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, flash memory devices (e.g., card, stick, key drive . . . ), and integrated circuits such as read only memories, programmable read only memories, and electrically erasable programmable read only memories.

In order to facilitate frequency hopping, a single carrier FDMA modulation technique can be employed in a wireless network. For example, interleaved frequency division multiplexing (IFDM) can be employed to retain the benefits associated with orthogonal frequency division multiplexing (OFDM) protocols. In addition, in some cases, single carrier FDMA modulation techniques may have a lower peak-to-average (PAR) ratio problem compared with OFDM. Similarly, according to a related aspect, localized frequency division multiplexing (LFDM) can be employed, which can also exhibit a lower PAR while retaining other benefits associated with OFDM protocols. LFDMA is also known as "narrowband" FDMA, Classical FDMA, or just FDMA, and is a single carrier FDMA protocol.

OFDMA modulation symbols are in the frequency domain, and therefore the time domain signal obtained by performing a fast Fourier technique on the modulation symbol sequence can have an undesirably high PAR. By comparison, IFDMA modulation symbols are in the time domain, and therefore IFDMA modulation techniques do not exhibit the high PARs typically associated with OFDMA techniques. Thus, IFDMA (and similarly LFDMA) modulation protocols reduce undesirably high PAR and problems associated therewith.

In an IFDMA system, a total of $N_{FFT}$ subcarriers can be utilized, which are divided among a plurality of users. Each user can be allocated N carriers (where N can vary from user to user), as well as a user-specific subcarrier offset, U. Thus, a user with offset U occupies carriers $\{U, U+N_{FFT}/N, U+2N_{FFT}/N \ldots U+(N-1)N_{FFT}/N\}$. For example, in an IFDMA system a total of $N_{FFT}$ subcarriers can be divided among several users. Each user can be allocated N carriers (where N can vary from user device to user device), as well as a user device-specific subcarrier offset, U, where $0 \leq U < N_{FFT}/N$. When a user device transmits N modulation symbols $[d_0 \, d_1 \, d_2 \ldots d_{N-1}]$, the user device constructs an IFDMA symbol by performing the following acts:

(1) Repeating the N symbols to obtain a total of $N_{FFT}$ symbols
$[d_0 \, d_1 \, d_2 \ldots d_{N-1} d_0 \, d_1 \, d_2 \ldots d_{N-1} \, d_0 \, d_1 \, d_2 \ldots d_{N-1} \ldots d_0 \, d_1 \, d_2 \ldots d_{N-1}]$ (2) Multiplying the $k^{th}$ symbol in the sequence by $e^{-jk\Phi U}$ where $\Phi = 2\pi/N_{FFT}$
$[d_0 \, d_1 e^{-j\Phi U} d_2 e^{-2j\Phi U} \ldots d_{N-1} e^{-(N-1)j\Phi U} \ldots d_{N-2} e^{-(N_{FFT}-2)j\Phi U} d_{N-1} e^{-(N_{FFT}-1)j\Phi U}]$ (3) Optionally copying the last $N_{CP}$ symbols of the above symbol to the beginning (cyclic prefix)
$[\ldots d_{N-2} e^{-(N_{FFT}-2)j\Phi U} d_{N-1} e^{-(N_{FFT}-1)j\Phi U}][d_0 \, d_1 e^{-j\Phi U} \ldots d_{N-1} e^{-(N-1)j\Phi U} \ldots d_{N-1} e^{-(N_{FFT}-1)j\Phi U}]$ A resulting IFDMA symbol can then be converted to an analog symbol modulated using a carrier and transmitted in a manner similar to that in which an OFDMA symbol is transmitted. The foregoing is illustrative of IFDMA symbol generation on both a reverse link and a forward link. Additionally, since the IFDMA signal is periodic in the time domain (with the exception of the phase, $e^{-jk\Phi U}$), the signal can occupy a "comb" in frequency (e.g., only a set of N equally spaced subcarriers have a non-zero power, . . . ). More specifically, a user with offset U occupies the set of subcarriers $\{U, U+N_{FFT}/N, U+2N_{FFT}/N \ldots U+(N-1)N_{FFT}/N\}$, wherein the total set of subcarriers is indexed from 0 to $N_{FFT}-1$, such that user device orthogonality can be maintained because user devices with different offsets occupy different subcarrier sets.

Similarly, in an LFDMA system, a user can be allocated a number N of contiguous subcarriers (e.g., subcarriers that are consecutive in the frequency domain, . . . ). For example, a total of $N_{FFT}$ subcarriers can exist, which can be divided among several users. Each user can be allocated a user-specific subcarrier offset, U, such that a user with offset U occupies carriers $[U, U+1, \ldots, U+N-1]$. a user can be allocated a number N of contiguous subcarriers (e.g., subcarriers that are consecutive in the frequency domain, . . . ). Each user can be allocated N contiguous carriers (where N can vary from user device to user device), as well as a user-specific subcarrier offset, U, where $0 \leq U < N_{FFT}-N$, and where the total set of subcarriers is indexed from 0 to $N_{FFT}-1$. A user that transmits a set of N modulation symbols $[d_0 \, d_1 \, d_2 \ldots d_{N-1}]$ can generate a transmission signal by performing the following acts:

(1) Taking an N-point fast Fourier transform (FFT) of $[d_0 \, d_1 \, d_2 \ldots d_{N-1}]$ to obtain $[D_0 \, D_1 \, D_2 \ldots D_{N-1}]$
(2) Placing $[D_0 \, D_1 \, D_2 \ldots D_{N-1}]$ in the allocated sub-carriers $[U, U+1, \ldots U+N-1]$.
(3) Taking an $N_{FFT}$-point inverse fast Fourier transform to obtain $N_{FFT}$ time domain samples.
(4) Optionally copying the last $N_{CP}$ time domain samples to the beginning of the symbol as a cyclic prefix to obtain the LFDMA time domain symbol.

Referring now to the drawings, FIG. 1 illustrates a binary channel tree 100 that can be employed in conjunction with a single carrier FDMA network to facilitate varying user device offsets in accordance with various aspects. The tree 100 comprises a plurality of nodes, each of which can be associated with a user device. For example, a first node 102 is associated with user A, and nodes 104 and 106 are assigned to users B and C, respectively. Various embodiments described herein facilitate changing user offsets, e.g. hopping sets of offset subcarriers. User offset variations can be performed using symbol rate hopping techniques (e.g., varied upon transmission of each symbol), block hopping techniques (e.g., varied upon transmission of a plurality of symbols), and the like. Additionally, a lookup table comprising information related to offsets, subcarrier sets, etc., can be employed to facilitate assigning and varying assignment of offsets to users. Offset assignment variation can be performed according to a predefined pattern, such as upon transmission of a single symbol, a predetermined number of symbols, a variable number of symbols, a fixed or variable time period, a fixed or variable number of frames, etc.

When employing an IFDMA protocol or an LFDMA protocol, in a system with $N_{FFT}=2^n$ assignable subcarriers, a particular user may be allotted $N=2^m$ subcarriers (where m is less than or equal to n). Additionally, different users can have different values of m. The binary tree 100 can facilitate assigning user offsets despite the variance of m between users. For instance, each user can be assigned a node in the tree 100 as described above. A tree-reading algorithm can be employed to compute an offset for a given user. Embodiments of such algorithms and approaches are discussed with regard to FIG. 2.

Additionally, in conjunction with various aspects set forth herein, offset assignment can be a function of a permutation protocol by which a predetermined set of offsets is permuted through nodes in a channel tree, and thus permuted through a set of user devices, allocated to nodes in the channel tree. For instance, nodes in channel tree 100 can be assigned a first set of offsets, and such offset assignments can be varied according to a predetermined pattern (e.g., every frame, every 2 frames, every symbol or group thereof, every one or more nanoseconds, etc.). Additionally, permutation protocols, predetermined offset sets, schedules, and the like can be unique to individual sectors and/or regions in a wireless network.

Figure 2:
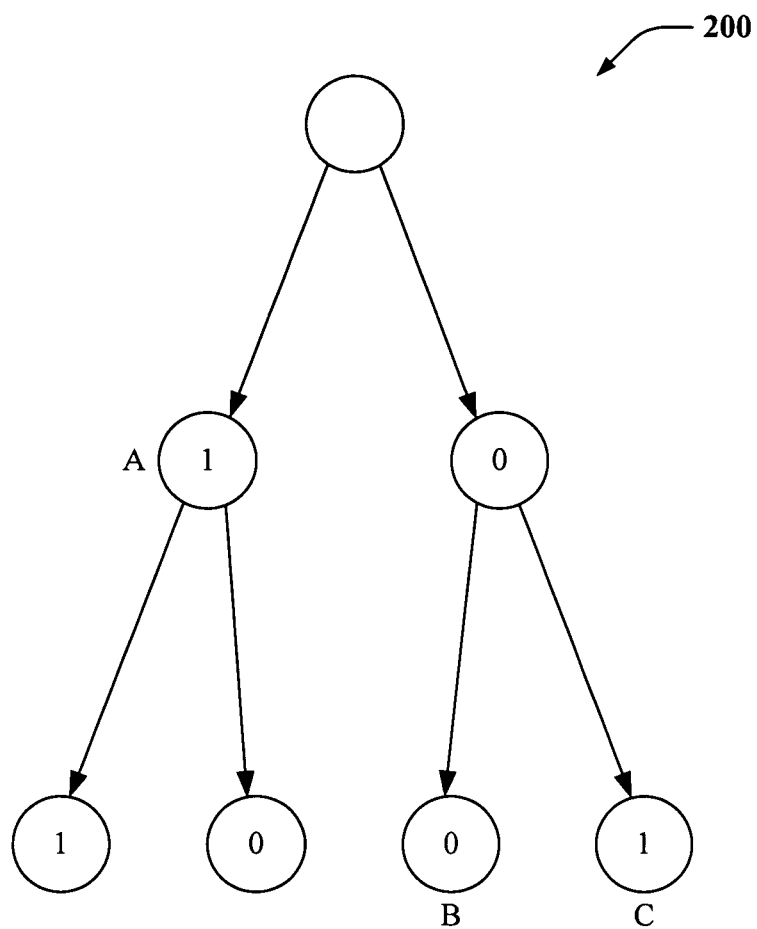
FIG. 2 is an illustration of a binary channel tree that facilitates determining an offset for a user in a single carrier FDMA wireless communication environment in accordance with various aspects.

FIG. 2 is an illustration of a binary channel tree 200 that facilitates determining an offset for a user in a single carrier FDMA wireless communication environment in accordance with various aspects. Tree 200 comprises a plurality of nodes, each of which has either a "0" value or "1" value. Nodes can be assigned to users of the wireless network, and offsets for each user can be evaluated by reading tree 200 in either an upward or downward direction.

For example, when employing an IFDMA protocol in conjunction with the wireless network, a "0" and a "1" are assigned to each child of a parent node. The assignment can vary from time to time and from sector to sector, in order to facilitate frequency hopping and interference diversity. The offset, U, of each user of the IFDMA-based network is the sequence read upward from the user-assigned node, wherein the user-assigned node represents the most significant bit in the offset U, and the root node's child node represents the least significant bit in the offset U. Thus, user A has offset 1, because it is assigned the first child node of the root node. User B has offset 0, as the most significant bit in user B's offset is a "0" and is read upward through the "0" child node of the root node, for an overall value of "00." User C has offset 2, as user C is assigned a "1" node that is read upward through the "0" child node of the root node for a total value of 10 binary, or 2 decimal. Information related to offsets associated with user-assigned nodes can be retrieved from a lookup table comprising such information upon assignment of a particular offset to a user.

Additionally, user device node allocation can be related to a number of subcarriers required by the particular user device. For instance, user A is allocated to a first child node in tree 200 such that there are two bits in user A's lineage (e.g., user A's allocated child node and the root node). In a scenario in which $N_{FFT}$ is 512 (e.g. a 9-bit-deep tree), user A can have a subcarrier requirement of at least $N_{FFT}/2$. Users B and C have a lineage three bits long, including the root node, and so are positioned on a third binary bit that represents a decimal value of 4. Thus, users B and C's offsets can comprise a number of subcarriers equal to $N_{FFT}/4$, and so on. It will be appreciated that the number of bits, nodes, users, total subcarriers, and the like described herein are illustrative in nature and should not be interpreted in a limiting sense and may also vary by the system design parameters. Rather, the various embodiments, aspects, systems, methods, techniques, etc., set forth herein can employ any suitable number of the above in order to achieve interference diversity and frequency hopping.

According to a related example, when employing an LFDMA protocol, the binary tree 200 can be read from top to bottom to determine a user's offset. Node assignments of "0" and "1" can vary with time and between sectors in a wireless network. Thus, an offset for a user is an n-bit quantity that can be padded with 0s for the least significant bits if necessary. When reading tree 200 in a downward direction, user A has offset 2 (e.g., 10 binary), user B has offset 0 (e.g., 00 binary), and user C has offset 1 (e.g., 01 binary). Information related to such offsets can be gleaned from a lookup table and can correspond to, in this example, $N_{FFT}/2$, 0, and $N_{FFT}/4$, respectively. Numbers of subcarriers associated with respective offsets can then be assigned to users.

It will be appreciated by one skilled in the art that although various embodiments described herein relate to IFDMA and LFDMA protocols, such embodiments can be employed in conjunction with any suitable OFDMA system. Additionally, the binary value assignments of some nodes and their ancestors can be performed on a sector-independent basis, such that a user allocated to such a node can retain the same offset regardless of which sector the user is in. In this manner, frequency reuse can be supported, for example when sectors do not use such nodes, while sectors that do employ such nodes can allocate weaker users thereto.

Figure 3:
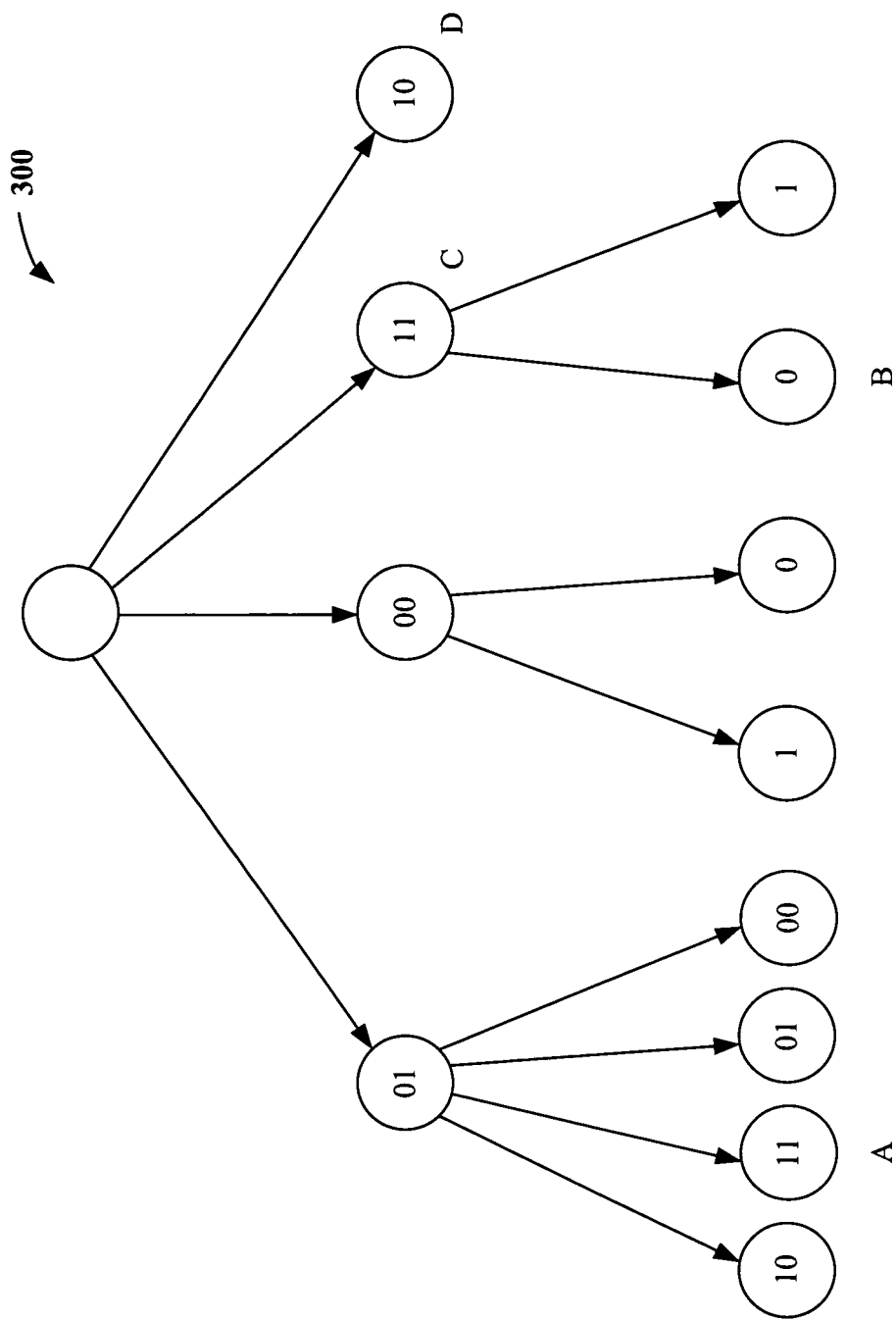
FIG. 3 is an illustration of a non-binary channel tree wherein user devices are allocated nodes in the tree and each node is assigned a value in accordance with various aspects.

FIG. 3 is an illustration of a non-binary channel tree 300 wherein user devices are allocated nodes in the tree and each node is assigned a value in accordance with various aspects. Non-binary channel tree 300 is similar to the binary assignment tree described with regard to FIG. 2. However, node assignments within channel tree 300 are not limited to binary values of 1 or 0, but rather can comprise any non-negative integer. For example, for a node having four children, the child nodes can be assigned values 0-3, (e.g., binary values 00, 01, 10, and 11, integer values of 0, 1, 2, and 3, etc.), while a parent node with only a pair of child nodes can have its children assigned values of 0 and 1, as set forth with regard to the binary channel tree of FIG. 2.

In non-binary channel tree 300, a number of subcarriers corresponding to a particular node can depend not only on the distance of the node to the root node, but also on the number of sibling nodes of each ancestor of the particular node. For instance, node A can have $N_{FFT}/16$ carriers because node A's parent is one of four siblings, and therefore receives $N_{FFT}/4$ subcarriers, which are then further divided into fourths among the four children of node A's parent (e.g., node A and its three siblings), which results in an assignment to node A of ¼ of $N_{FFT}/4$, or $N_{FFT}/16$ subcarriers. Node B can be assigned $N_{FFT}/8$ subcarriers because it has one sibling and its parent is one of four siblings. Thus, node B can be assigned ½ of its parent's $N_{FFT}/4$ subcarrier assignment, or $N_{FFT}/8$ subcarriers. Nodes C and D, being nodes in a set of four siblings directly pendant from the root node of non-binary channel tree 300, can each receive a subcarrier assignment equal to $N_{FFT}/4$. Information related to nodal relationships, offsets and/or subcarrier sets, and the like, can be stored in a lookup table that can be traversed in order to determine a user's assigned offset. It will be appreciated that the non-binary channel tree can be employed to facilitate assigning either or both of IFDMA and LFDMA subcarrier sets.

When performing offset computation in conjunction with an IFDMA communication environment, offsets can be computed by reading channel tree 300 from bottom to top. For instance, node A has an offset of 1101 when read through its parent toward the root node, and can be assigned offset 13 comprising $N_{FFT}/16$ subcarriers. Node D can receive offset 2 (e.g., 10 binary). It will be noted that nodes B and C are depicted as having offset values of 3 (e.g., 011, and 11, respectively). In such a scenario, both nodes can be assigned offset 3, and will not be assigned such offset simultaneously, but rather alternately in order to mitigate conflict.

In an LFDMA communication environment, offsets can be computed by reading the non-binary channel tree 300 from top to bottom (e.g., from a root node down through to a particular child node). A 0-padding technique can be employed to pad the offset values read from the root node to the child node based at least in part on a value of $N_{FFT}$. For example, if $N_{FFT}=512$, then a total of 9 bits are required to represent $N_{FFT}$ as a binary number. 0-padding can be employed to pad each offset read with zeros until the offset is a 9-bit value. For example, A has an offset of 0111 when read from the root node to node A, which can be padded with 5 zeros to make A's offset a 9-bit number, 0111-00000=224. Thus node A can be assigned offset 224, which, according to the example, will comprise 512/16, or 32, carriers. Similarly, node B has offset 011-000000=192, node C has offset 11-0000000=384, and node D has offset 10-0000000=256. Described more generally, node A has an offset equal to $9N_{FFT}/16$, node B is assigned offset to $3N_{FFT}/8$, node C is assigned offset to $3N_{FFT}/4$, and node D is assigned offset to $N_{FFT}/2$.

It will be appreciated that non-binary channel tree 300 can employ a set of predetermined offsets that can be permuted among user devices and/or nodes as described above with regard to FIG. 1. Additionally, changing the offsets can be performed according to a predetermined pattern, (e.g., every frame, every symbol, upon expiration of a time period, etc.) and such schedules can be sector-specific.

With respect to FIGS. 1-3, the assignments and hopping sequences of the nodes may be transmitted from a base station to a user device in initialization over time. This may be updated as appropriate. For example, assignments can be determined by reading the look-up tables at the user device for transmission to the base station, uplink, and for reception at the user device, downlink, based upon instructions transmitted from the base station. The instructions may, according to an aspect, comprise an identifier of a sequence, which may be repeated depending on the length of sequence that is stored at the user device. In other aspects, the node values may be updated regularly, based upon control channel messages from the base station.

In some embodiments, the channel assignments and single carrier transmissions may only apply to the uplink while the downlink transmissions use one or more OFDM schemes. In these cases, one or more OFDM type access schemes may be utilized on the downlink that are independent from the schemes utilized on the uplink.

Figure 4:
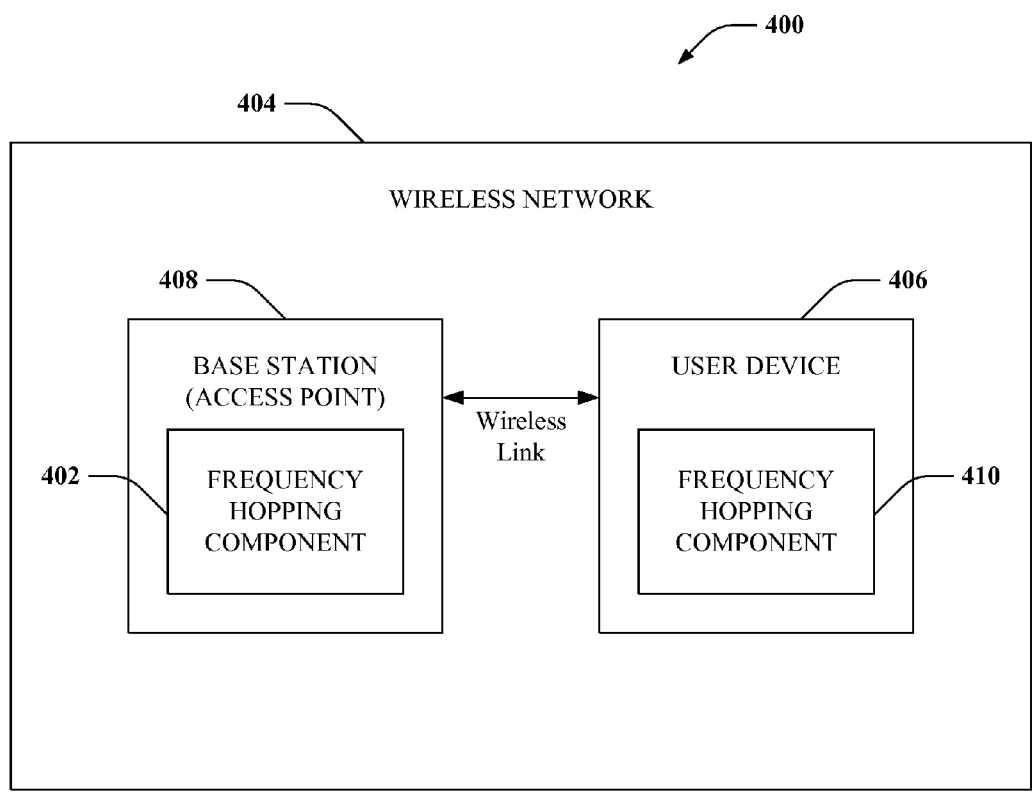
FIG. 4 illustrates a system that facilitates frequency hopping in a single carrier FDMA wireless communication environment in accordance with one or more aspects.

FIG. 4 illustrates a system 400 that facilitates frequency hopping in a single carrier FDMA wireless communication environment in accordance with one or more aspects. A frequency hopping component 402 is operatively associated with a base station 408 (e.g., an access point). Wireless network 404 can comprise one or more base stations 408 in one or more sectors and/or regions comprising a plurality of sectors, etc., as will be appreciated by one skilled in the art. User devices 406 can comprise, without being limited to, cellular phones, smartphones, PDAs, laptop computers, personal computers, and/or any other suitable device with which a user can communicate over wireless network 404. A separate frequency hopping component 410 resides at the user device 406 and can vary the offsets according to instructions from frequency hopping component 402.

Frequency hopping component 402 can vary node value assignments for one or more user devices 406 allocated to nodes in a channel tree, such as the trees described with regard to FIGS. 1, 2, and 3. Node values (e.g., non-binary, binary, etc.) can be assigned to nodes in the channel tree and the tree can be traversed to determine an overall offset assignment. In the case of a binary channel tree, child nodes of each parent node in the channel tree can be assigned a 1 and a 0, such that each parent node has a 1-child and a 0-child. User devices 406 can be allocated to such nodes, and, depending on the particular single carrier FDMA protocol employed, frequency hopping component 402 can read the binary tree to evaluate user offset assignments and can evaluate a lookup table comprising information related to respective offsets (e.g., offset identity, subcarrier number, . . . ). Additionally, frequency hopping component 402 can change node value assignments (e.g., 1s and 0s and/or other binary node values, non-binary node values, etc.) for different sectors and at different times in order to facilitate frequency hopping and alteration of user offset assignments. It is to be appreciated that frequency hopping component 402 can be integral to one or more base stations 408 in wireless network 404 and/or to user device(s) 406.

While FIG. 4, depicts the frequency hopping component 402 as residing in the base station, it should be noted that frequency hopping component 402 may be implemented as a combination of functionality in both base station 408, a base station controller (not shown), or the like of wireless network 404, and in user device 406 (e.g., frequency hopping component 410). In such aspects, it may be possible to contain separate look-up tables in user device 406 and base station 408 which each correspond to offsets, which are known to both devices, e.g. by instructions from base station 408 that corresponds to user device 406, or some other means.

In various embodiments, where the frequency hopping component 402 resides in the base station 408, the user device 406 may have a look-up table that corresponds to a sequence for varying the offset U based upon instructions, commands, or the like transmitted from the base station 408 and generated by frequency hopping component 402.

Figure 5:
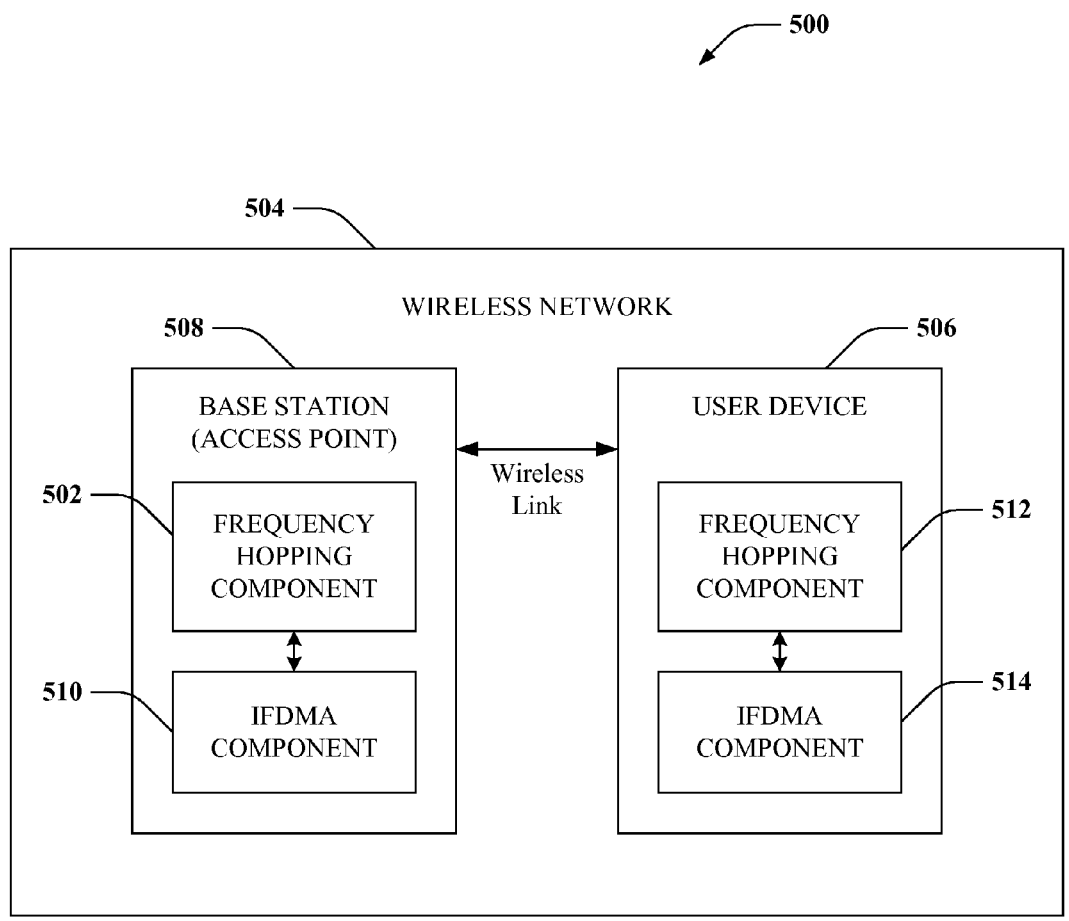
FIG. 5 is an illustration of a system that facilitates employing a frequency hopping technique in a single carrier FDMA environment, such as an IFDMA wireless communication environment in accordance with various aspects.

FIG. 5 is an illustration of a system 500 that facilitates employing a frequency hopping technique in a single carrier FDMA environment, such as an IFDMA wireless communication environment in accordance with one or more aspects. A frequency hopping component 502 is operatively associated with and integral to a base station 508. A separate frequency hopping component 512 resides at the user device 506 and will vary the offsets according to instructions from frequency hopping component 502.

Additionally, frequency hopping components 502 and 512 are respectively associated with an IFDMA components 510 and 514, which facilitates wireless communication using an IFDMA protocol. For example, in an IFDMA system a total of $N_{FFT}$ subcarriers can be divided among several user devices 506. Each user device 506 can be allocated N carriers (where N can vary from user device to user device), as well as a user device-specific subcarrier offset, U, where $0 \leq U < N_{FFT}/N$. When a user device 506 transmits N modulation symbols $[d_0\ d_1\ d_2\ \ldots\ d_{N-1}]$, user device 506 constructs an IFDMA symbol by performing the following acts:

(1) Repeating the N symbols to obtain a total of $N_{FFT}$ symbols
$[d_0\ d_1\ d_2\ \ldots\ d_{N-1} d_0\ d_1\ d_2\ \ldots\ d_{N-1}\ d_0\ d_1\ d_2\ \ldots\ d_{N-1} \ldots d_0\ d_1\ d_2\ \ldots\ d_{N-1}]$ (2) Multiplying the $k^{th}$ symbol in the sequence by $e^{-j\,k\,\Phi U}$ where $\Phi = 2\pi/N_{FFT}$
$[d_0\ d_1 e^{-j\Phi U}\ d_2 e^{-2j\Phi U}\ \ldots\ d_{N-1} e^{-(N-1)j\Phi U}\ \ldots\ d_{N-2} e^{-(N_{FFT}-2)j\Phi U} d_{N-1} e^{-(N_{FFT}-1)j\Phi U}]$ (3) Optionally copying the last $N_{CP}$ symbols of the above symbol to the beginning (cyclic prefix)
$[\ldots\ d_{N-2} e^{-(N_{FFT}-2)j\Phi U} d_{N-1} e^{-(N_{FFT}-1)j\Phi U}][d_0\ d_1 e^{-j\Phi U}\ \ldots\ d_{N-1} e^{-(N-1)j\Phi U}\ \ldots\ d_{N-1} e^{-(N_{FFT}-1)j\Phi U}]$ A resulting IFDMA symbol can then be converted to an analog symbol modulated using a carrier and transmitted. The foregoing is illustrative of IFDMA symbol generation on both a reverse link and a forward link. Additionally, since the IFDMA signal is periodic in the time domain (with the exception of the phase, $e^{-j\,k\,\Phi U}$), the signal can occupy a "comb" in frequency (e.g., only a set of N equally spaced subcarriers have a non-zero power, . . . ). More specifically, a user device 506 with offset U occupies the set of subcarriers $\{U, U+N_{FFT}/N, U+2N_{FFT}/N \ldots U+(N-1)N_{FFT}/N\}$, wherein the total set of subcarriers is indexed from 0 to $N_{FFT}-1$, such that user device orthogonality can be maintained because user devices with different offsets occupy different subcarrier sets. Frequency hopping component 502 can generate, or store look-up tables that correspond to, offsets, node value assignments, etc., and can assign user devices 506 to nodes as described with regard to FIGS. 1-3. Additionally, where an IFDMA protocol is utilized, frequency hopping component 502 can read the tree from the root node downward to identify a particular user device's offset U. It is to be appreciated that the manner of assigning user devices to particular nodes can encompass arbitrary assignments, node assignments in a channel tree using non-binary node values, binary node values, or any other suitable manner of associating offsets with nodes and/or user devices 506. Moreover, it will be understood that node value assignments can be varied arbitrarily, randomly, according to a predetermined pattern and/or upon an occurrence of an event (e.g. transmission of one or more symbols, one or more frames, expiration of a time period, . . . ) etc.

While FIG. 5 depicts the frequency hopping component 502 as residing in the base station, it should be noted that frequency hopping component 502 may be implemented as a combination of functionality in both base station 508, base station controller (not shown) and in user device 506 (e.g., frequency hopping component 512). In such aspects, it may be possible to contain separate look-up tables in user device 506 and base station 508 which each correspond to sequences for offset U for the user device, which are known to both devices, e.g. by instructions from base station 508 that corresponds to user device 506, or some other means.

In the embodiments, where the frequency hopping component 502 resides in the base station 508, the user device 506 may have a look-up table that corresponds to a sequence for varying the offset U based upon instructions, commands, or the like transmitted from the base station 508 and generated by frequency hopping component 502.

Figure 6:
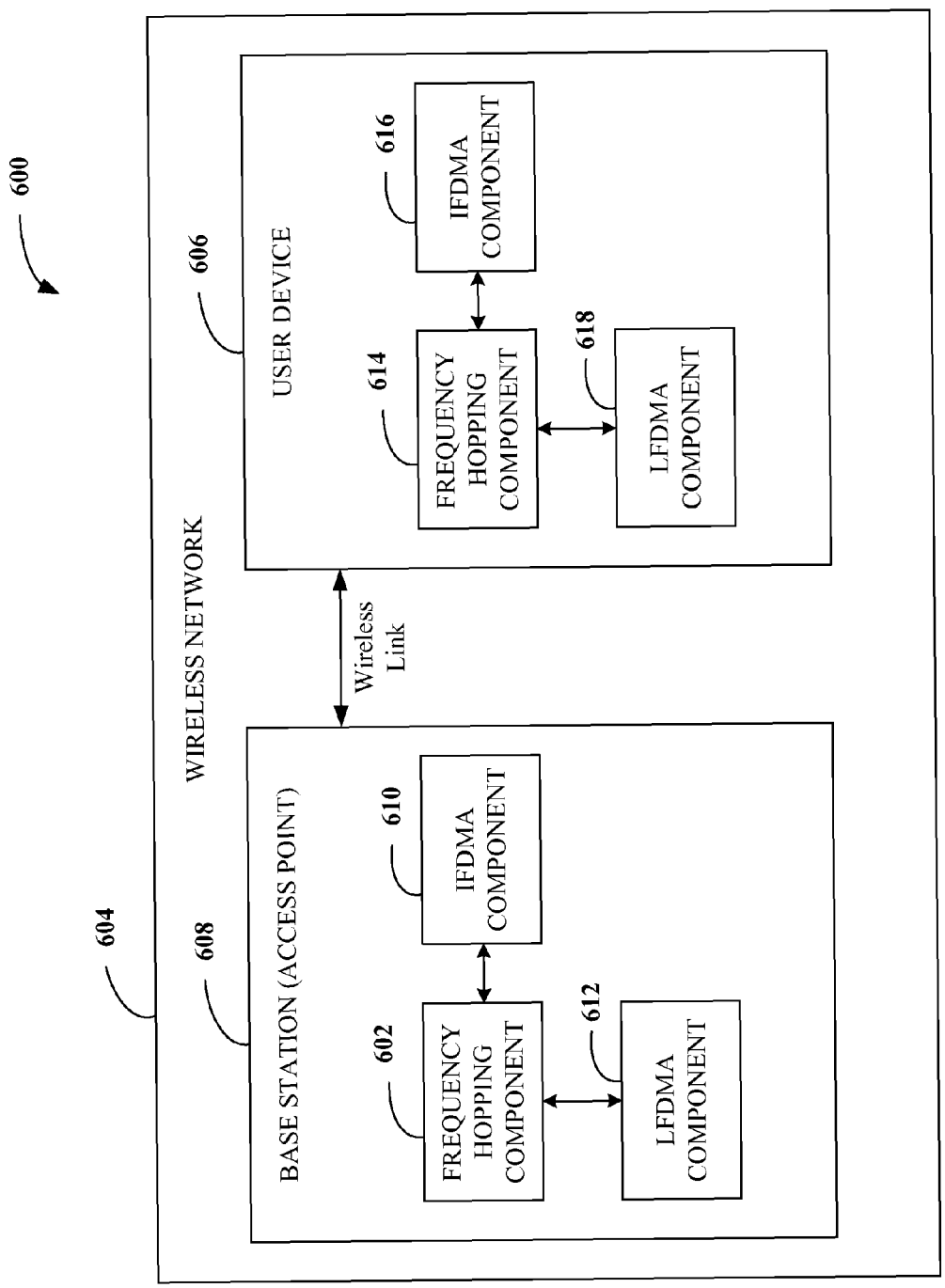
FIG. 6 is an illustration of a system that facilitates employing a frequency hopping technique in a single carrier FDMA environment, such as an LFDMA wireless communication environment in accordance with various aspects.

FIG. 6 is an illustration of a system 600 that facilitates employing a frequency hopping technique in a single carrier FDMA environment, such as an LFDMA wireless communication environment in accordance with one or more aspects. System 600 comprises a frequency hopping component 602 that is operatively associated with an access point 608. A separate frequency hopping component 614 resides at the user device 606 and will vary the offsets according to instructions from frequency hopping component 602.

Frequency hopping component 602 can be further operatively associated with an IFDMA component 610 that facilitates communication over wireless network 604 as described above with regard to FIG. 5. Additionally and/or alternatively, frequency hopping component 602 can be further operatively coupled to an LFDMA component 612, which can facilitate LFDMA communication between base station 608 and user device 606. Similarly, frequency hopping component 614 can be operatively coupled to an IFDMA component 616 and an LFDMA component 618 in user device 606. Frequency hopping component 602 can generate a channel tree for offset assignment to user device 606, such that each of a plurality of user devices 606 can be allocated to a node in the offset tree. Each node in the tree can have a value, and such node values can be changed by frequency hopping component 602 from time to time and/or from sector to sector to provide interference diversity and frequency hopping functionality. Upon a determination of a value associated with a particular node, frequency hopping component 602 can perform a table lookup to evaluate an associated offset for assignment to a user device 606.

With regard to LFDMA components 612 and 618, a user device 606 can be allocated a number N of contiguous subcarriers (e.g., subcarriers that are consecutive in the frequency domain, . . . ). For example, in an LFDMA system a total of $N_{FFT}$ subcarriers can be divided among several user devices 606. Each user device 606 can be allocated N contiguous carriers (where N can vary from user device to user device), as well as a user device-specific subcarrier offset, U, where $0 \leq U < N_{FFT}-N$, and where the total set of subcarriers is indexed from 0 to $N_{FFT}-1$. A user device that transmits a set of N modulation symbols $[d_0\ d_1\ d_2\ \ldots\ d_{N-1}]$ can generate a transmission signal by performing the following acts:

(1) Taking an N-point fast Fourier transform (FFT) of $[d_0\ d_1\ d_2\ \ldots\ d_{N-1}]$ to obtain $[D_0\ D_1\ D_2\ \ldots\ D_{N-1}]$
(2) Placing $[D_0\ D_1\ D_2\ \ldots\ D_{N-1}]$ in the allocated sub-carriers $[U, U+1, \ldots U+N-1]$.
(3) Taking an $N_{FFT}$-point inverse fast Fourier transform to obtain $N_{FFT}$ time domain samples.
(4) Optionally copying the last $N_{CP}$ time domain samples to the beginning of the symbol as a cyclic prefix to obtain the LFDMA time domain symbol.

In the above example of LFDMA signal generation, different user devices 606 can be allocated disjoint sets of subcarriers to ensure that user devices 606 are orthogonal to each other. Frequency hopping component 602 can then generate an assignment tree and evaluate assignments of user devices 606 to nodes therein as described with regard to FIGS. 1-3, and, where an LFDMA protocol is utilized, can read the tree from the root node downward to identify a particular user device's offset, U.

While FIG. 6 depicts frequency hopping component 602 as residing in the base station, it should be noted that frequency hopping component 602 may be implemented as a combination of functionality in both base station 608, base station controller (not shown), or the like of wireless network 604, and in user device 606 (e.g., frequency hopping component 614). In such aspects, it may be possible to contain separate look-up tables in user device 606 and base station 608, which each correspond to sequences for offset U for the user device 606, which are known to both devices, e.g. by instructions from base station 608 that corresponds to the user device 606, or some other means.

In the embodiments, where the frequency hopping component 602 resides in the base station 608, the user device 606 may have a look-up table that corresponds to a sequence for varying the offset U based upon instructions, commands, or the like transmitted from the base station 608 and generated by frequency hopping component 602.

Additionally, IFDMA components 610 and 616 and LFDMA components 612 and 618 can be employed in conjunction with one another to facilitate generation of subcarrier assignments that comprise equally spaced subcarriers that span less than the total available bandwidth, in accordance with various aspects set forth herein. Moreover, fast hopping techniques can be employed, potentially over a fraction of the available bandwidth when employing an IFDMA protocol. On a typical OFDMA uplink, a user device can be assigned a set of subcarriers, which is kept constant for a time to permit the user device to estimate the channel over that set of subcarriers. However, if the user device's assignment is large enough that the user device can estimate the channel over the entire bandwidth, then a symbol rate hopping protocol (e.g., varying a subcarrier set assignment for a user device upon transmission of each symbol) can be utilized because there is no detriment in hopping upon each symbol.

Figure 7:
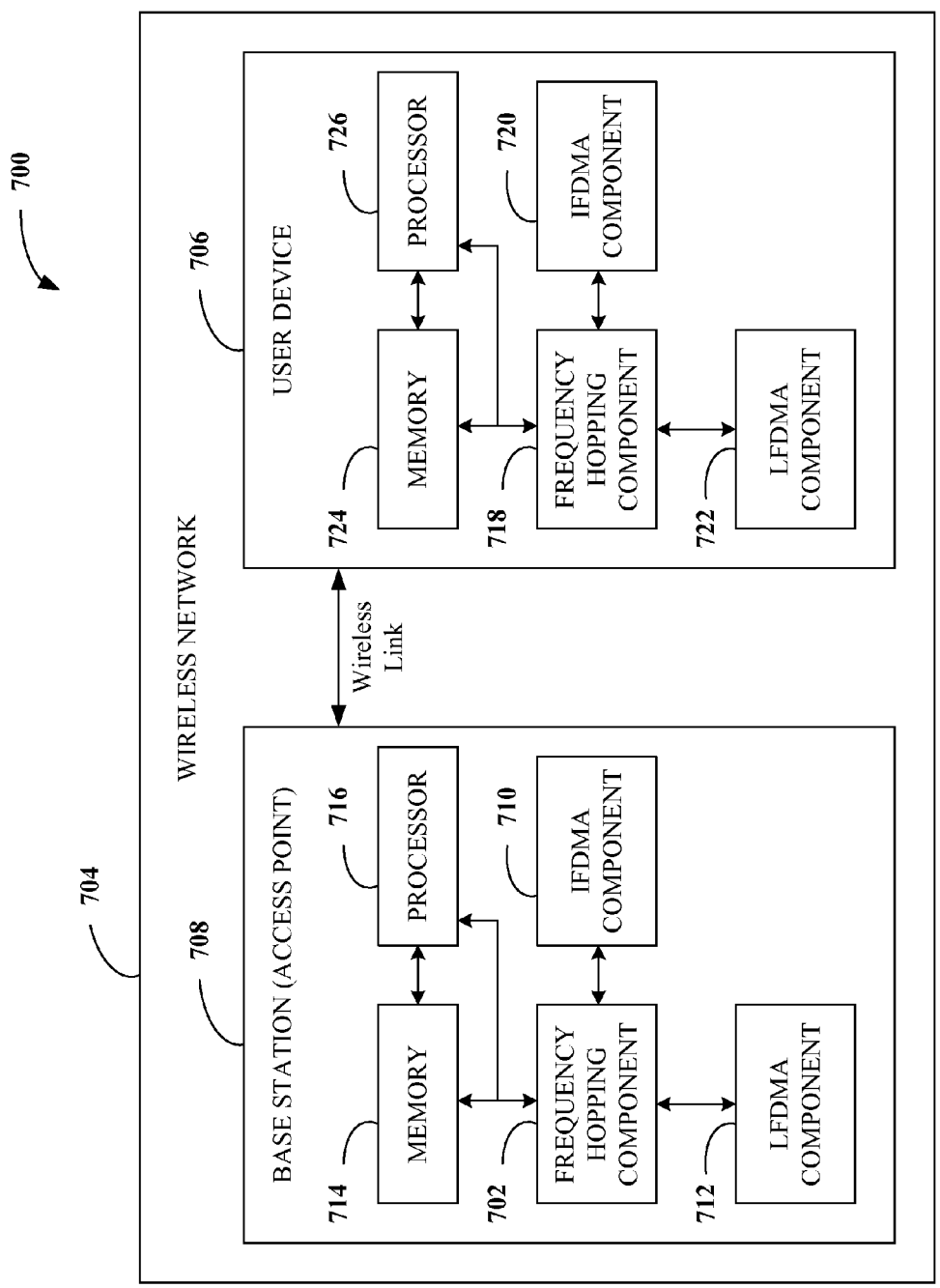
FIG. 7 is an illustration of a system that facilitates frequency hopping in a single carrier FDMA wireless communication environment in accordance with various aspects.

FIG. 7 is an illustration of a system 700 that facilitates frequency hopping in a single carrier FDMA wireless network environment. A frequency hopping component 702 may be operatively associated with a base station 708 in a wireless network 704. A separate frequency hopping component 718 resides at the user device 706 and can vary the offsets according to instructions from frequency hopping component 702.

Wireless network 704 can comprise one or more base stations 708 in one or more sectors and/or regions comprising a plurality of sectors, etc., as will be appreciated by one skilled in the art. User devices 706 can comprise, without being limited to, cellular phones, smartphones, PDAs, laptop computers, personal computers, and/or any other suitable device with which a user can communicate over wireless network 704. Frequency hopping component 702 in base station 708 can be associated with an IFDMA component 710 and/or an LFDMA component 712, or any other suitable single carrier FDMA system, to facilitate symbol generation as described above with regard to the preceding figures. Similarly, frequency hopping component 718 in user device 706 can be operatively coupled to each of an IFDMA component 720 and an LFDMA component 722.

Base station 708 and/or user device 706 can additionally and respectively comprise memories 714 and 724 that are operatively coupled to frequency hopping components 702 and 718, and that store information related to channel tree generation or pre-generated channel tree information that may be utilized, node value assignment (e.g., non-binary, binary, integer, etc.) of nodes in the channel tree, user device node allocation, tree-reading algorithms (e.g., top-down for LFDMA, bottom-up for IFDMA, . . . ), signal generation algorithms (e.g., for generating signals using IFDMA, LFDMA, single carrier FDMA, . . . ), time tables for node value assignment variation (e.g., frequency hopping, . . . ), lookup tables related to offset information and/or node value assignments, and any other suitable information related to providing interference diversity (e.g., frequency hopping) to mitigate interference of one or more user devices 706. Processors 716 and 726 can be operatively connected to frequency hopping components 702 and 718, respectively, and/or memories 714 and 724 to facilitate analysis of information related to frequency hopping, node assignment and/or allocation to one or more user devices 706, tree-reading algorithms, signal generation, and the like. It is to be appreciated that processor 716 can be a processor dedicated to analyzing and/or generating information received by frequency hopping component 702, a processor that controls one or more components of base station 708, and/or a processor that both analyzes and generates information received by frequency hopping component 702 and controls one or more components of base station 708. In a similar manner, processor 726 can be a processor dedicated to analyzing information received by frequency hopping component 718, a processor that controls one or more components of user device 706, and/or a processor that both analyzes information received by frequency hopping component 718 and controls one or more components user device 706.

Memories 714 and 724 can additionally store protocols associated with generating signals, symbols, channel trees, lookup tables, etc., such that user device 706 and/or base station 708 can employ stored protocols and/or algorithms to achieve interference diversity as described herein. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memories 714 and 724 of the subject systems and methods is intended to comprise, without being limited to, these and any other suitable types of memory.

While FIG. 7 depicts frequency hopping component 702 as residing in the base station 708, it should be noted that frequency hopping component 702 may be implemented as a combination of functionality in both base station 708, base station controller (not shown), or the like of wireless network 704, and in user device 706 (e.g., frequency hopping component 718). In such aspects, it may be possible to contain separate look-up tables in user device 706 and base station 708 which each correspond to sequences for offset U for the user device, which are known to both devices, e.g. by instructions from base station 708 that corresponds to the user device 706, or some other means.

In the embodiments, where the frequency hopping component 702 resides in the base station 708, the user device 706 may have a look-up table that corresponds to a sequence for varying the offset U based upon instructions, commands, or the like transmitted from the base station 708 and generated by frequency hopping component 702.

Figure 8:
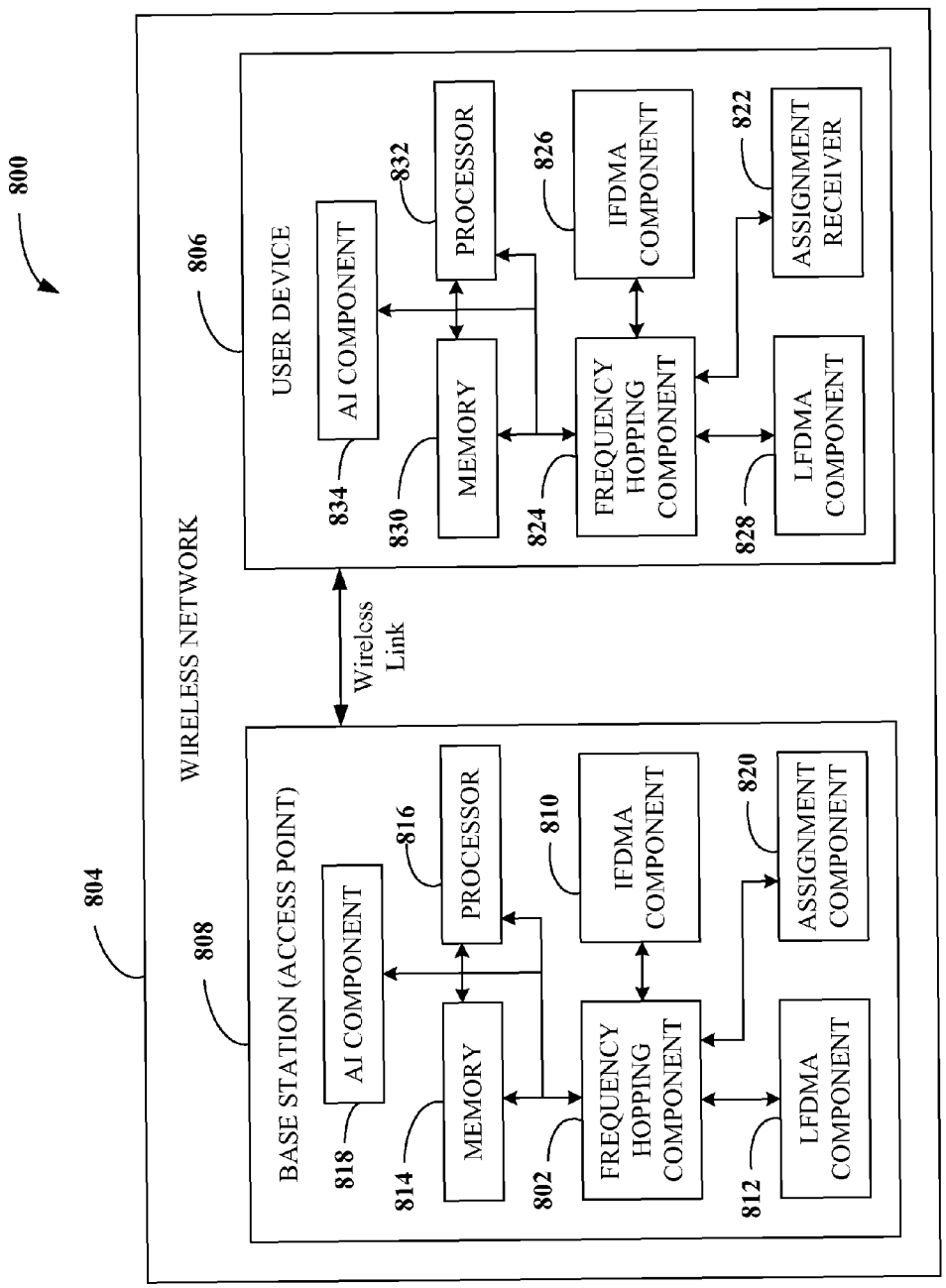
FIG. 8 is an illustration of a system that facilitates frequency hopping technique in an FDMA wireless communication environment in accordance with various aspects.

FIG. 8 is an illustration of a system 800 that facilitates frequency hopping technique in an FDMA wireless network environment in accordance with various aspects. A frequency hopping component 802 is operatively associated with a base station 808. A separate frequency hopping component 824 resides at the user device 806 and can vary the offsets according to instructions from frequency hopping component 802.

Wireless network 804 can comprise one or more base stations 808, repeaters, transceivers, etc. (not shown) in one or more sectors and/or regions comprising a plurality of sectors, etc., as will be appreciated by one skilled in the art. User devices 806 can comprise, without being limited to, cellular phones, smartphones, PDAs, laptop computers, personal computers, and/or any other suitable device with which a user can communicate over wireless network 804. Frequency hopping component 802 in base station 808 can be operatively associated with an IFDMA component 810 and/or an LFDMA component 812, or any other suitable single carrier FDMA system, to facilitate communication symbol generation as described above with regard to the preceding figures. Likewise, frequency hopping component 824 in user device 806 can be operatively associated with either or both of an IFDMA component 826 and an LFDMA component 828. Frequency hopping component 802 can be further associated with an assignment component 820 in base station 808 that assigns nodes to user devices 806, based at least in part on offset information stored in a lookup table, which can be retained in memory 814 and/or memory 830. Such assignments can be transmitted to an assignment receiver 822 in user device 806 and decoded by frequency hopping component 824 in user device 806. Assignment component 820 can assign nodes in the channel tree to user devices, and frequency hopping component 802 can vary offsets (e.g., by permuting/changing node value assignments) to maintain offset diversity and facilitate mitigating interference between user devices 806 and/or network sectors over which user devices 806 communicate. Additionally, frequency hopping component 802 can assign node values to nodes in a binary channel tree, such as described with regard to FIG. 2, and/or to nodes in a non-binary channel tree, such as described with regard to FIG. 3, in order to facilitate providing offsets to user devices 806. Moreover, frequency hopping component 802 can employ a non-binary channel tree in conjunction with the permutation protocol to optimize interference reduction.

Frequency hopping component 802 can assign subcarrier sets (e.g., offsets) to user devices 806 for transmission of one or more symbols during a communication event, as described above. For example, frequency hopping component 802 can generate and/or transmit an offset assignment at a first point in time, and such assignment can be varied (e.g., by changing node value assignments) according to a predetermined pattern (e.g., after transmission/receipt of each symbol, group of symbols, one or more frames, . . . ). To further this example, subcarrier set assignments to user devices 806 can be varied after a predetermined period, which can be delineated by transmission of a fixed number of symbols (e.g., IFDMA symbols, LFDMA symbols, or any other suitable single-carrier FDMA symbols).

Assignment receiver 822 in user device 806 receives a subcarrier set assignment (e.g., an offset assignment) to permit user device 806 to exert control over an assigned set of subcarriers for transmission of one or more symbols (e.g., IFDMA, LFDMA, . . . ) during a communication event. Assignment receiver 822 can receive and/or accept a node assignment and an offset for device 806 can be determined at a first point in time. A second offset can then be determined and/or computed upon alteration of node value assignments after a predetermined time period (e.g., after transmission/receipt of each symbol, group of symbols, . . . ). According to this example, offset assignments to user device 806 can be varied (e.g., by varying node values for nodes to which user devices are assigned, etc.) after a predetermined period that can be delineated by transmission of a number of symbols (e.g., IFDMA symbols, LFDMA symbols, or any other suitable single-carrier FDMA symbols). Furthermore, base station 808 can employ a memory 814, a processor 816, and an AI component 818 to facilitate assignment, assignment variation, acknowledgement, utilization, and the like in conjunction with the various frequency hopping protocols described herein. User device 806 can employ a memory 830, processor 832, and AI component 834 for like purposes.

AI components 818 and 834 can be respectively and operatively associated with frequency hopping components 802 and 824 in either or both of base station 808 and user device 806, and can make inferences regarding channel tree generation, node value assignments and alterations thereto, user device 806 node allocation, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, AI components 818 and/or 834 can infer an appropriate tree structure for representing user device offsets based at least in part on, for instance, channel quality, detected interference, number of available subcarriers, number of user devices 806 operating over wireless network 804, etc. According to this example, it can be determined that a particular sector or sectors in wireless network 804 are experiencing high transmission volume, and the like. AI component 818, in conjunction with processor 816 and/or memory 814, can determine that interference between user devices 806 and/or sectors is high. AI component 818 can infer that a frequency adjustment is appropriate to increase interference diversity and alleviate the interference problem, and can direct frequency hopping component 802 to alter child node value assignments in a channel tree, which will have the result of altering offset assignments to user devices 806 allocated to such altered child nodes. In such a case, AI component 818 can facilitate frequency hopping in the most cost-effective manner possible to mitigate inter-cell interference and improve interference diversity. It will be appreciated that the foregoing examples are illustrative in nature and are not intended to limit the scope of inferences that can be made by AI components 818 and 834 or the manner in which AI components 818 and 834 make such inferences.

While FIG. 8 depicts frequency hopping component 802 as residing in the base station 808, it should be noted that frequency hopping component 802 may be implemented as a combination of functionality in both base station 808, base station controller (not shown), or the like of wireless network 804, and in user device 806 (e.g., frequency hopping component 824). In such aspects, it may be possible to contain separate look-up tables in user device 806 and base station 808 which each correspond to sequences for offset U for the user device, which are known to both devices, e.g. by instructions from base station 808 that corresponds to the user device 806, or some other means.

In the embodiments, where the frequency hopping component 802 resides in the base station 808, the user device 806 may have a look-up table that corresponds to a sequence for varying the offset U based upon instructions, commands, or the like transmitted from the base station 808 and generated by frequency hopping component 802.

Figure 9:
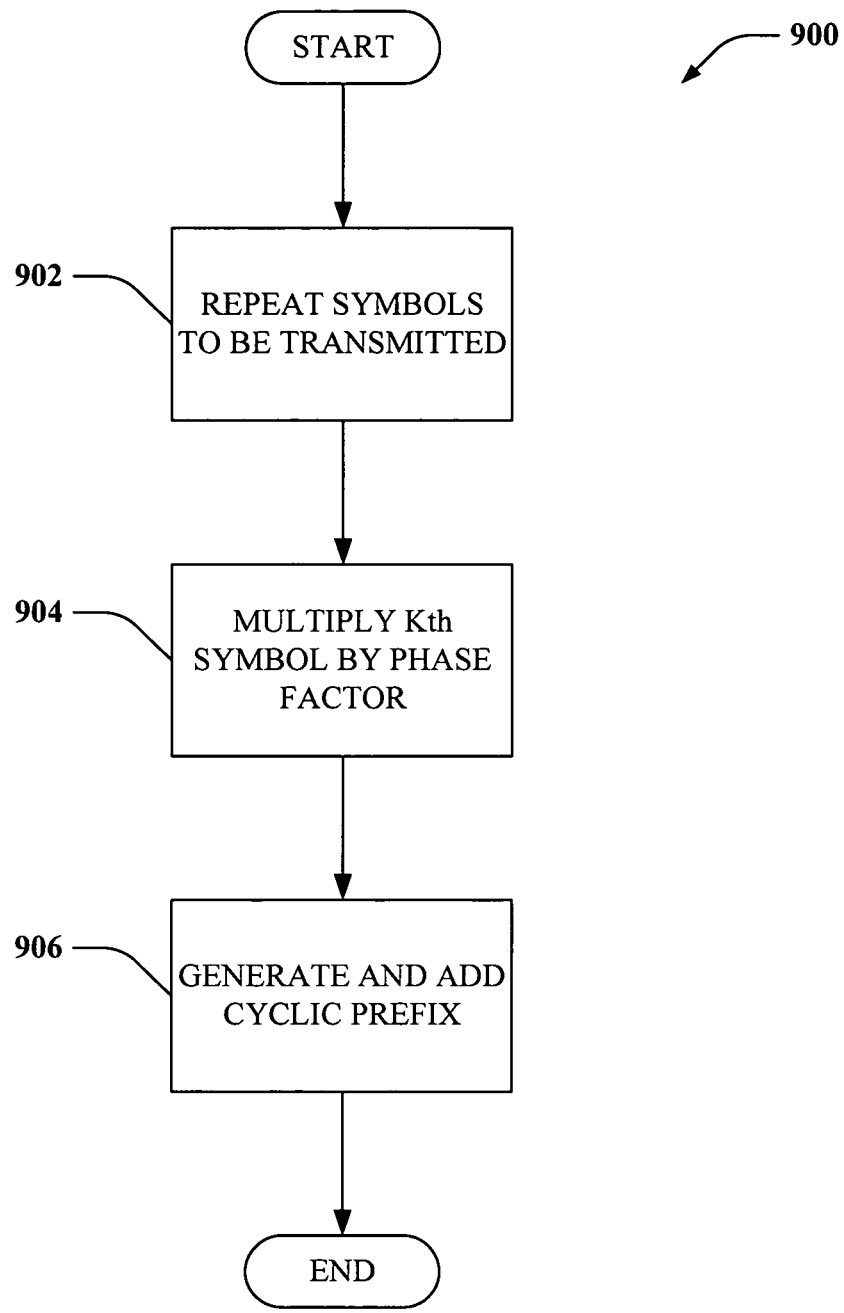
FIG. 9 is an illustration of a methodology for generating a signal using an IFDMA protocol, such as can be employed in conjunction with a frequency hopping protocol to improve interference diversity.

FIG. 9 is an illustration of a methodology 900 for generating a signal using an IFDMA protocol, such as can be employed in conjunction with a frequency hopping protocol to improve interference diversity. At 902, a user device can initiate generation of a signal comprising N modulation symbols, for example, $[d_0\ d_1\ d_2\ \ldots\ d_{N-1}]$, by repeating the N symbols to obtain a total of $N_{FFT}$ symbols such that:

$[d_0\ d_1\ d_2\ \ldots\ d_{N-1}\ d_0\ d_1\ d_2\ \ldots\ d_{N-1}\ d_0\ d_1\ d_2\ \ldots\ d_{N-1}\ \ldots\ d_0\ d_1\ d_2\ \ldots\ d_{N-1}]$ At 904, the user device can multiply the $k^{th}$ symbol in the sequence by $e^{-jk\Phi U}$, where $\Phi=2\pi/N_{FFT}$, such that:

$[d_0\ d_1 e^{-j\Phi U}\ d_2 e^{-2j\Phi U}\ \ldots\ d_{N-1} e^{-(N-1)j\Phi U}\ \ldots\ d_{N-2} e^{-(N_{FFT}-2)j\Phi U}\ d_{N-1} e^{-(N_{FFT}-1)j\Phi U}]$ At 906, cyclic prefix can optionally be added to the signal by copying the last $N_{CP}$ symbols of the signal generated at 904 to the beginning of the symbol expression, such that:

$[\ldots d_{N-2} e^{-(N_{FFT}-2)j\Phi U}\ d_{N-1} e^{-(N_{FFT}-1)j\Phi U}][d_0\ d_1 e^{-j\Phi U}\ \ldots\ d_{N-1}\ e^{-(N-1)j\Phi U}\ \ldots\ d_{N-1} e^{-(N_{FFT}-1)j\Phi U}]$ Method 900 can be employed in an IFDMA communication environment in conjunction with frequency hopping techniques set forth herein to mitigate interference between users and/or sectors in a wireless communication environment. It will be appreciated by one skilled in the art that although various methods and/or systems herein are described with regard to an IFDMA system, a suitable FDMA system arrangement having the described features and/or advantages of the IFDMA system can be employed.

Figure 10:
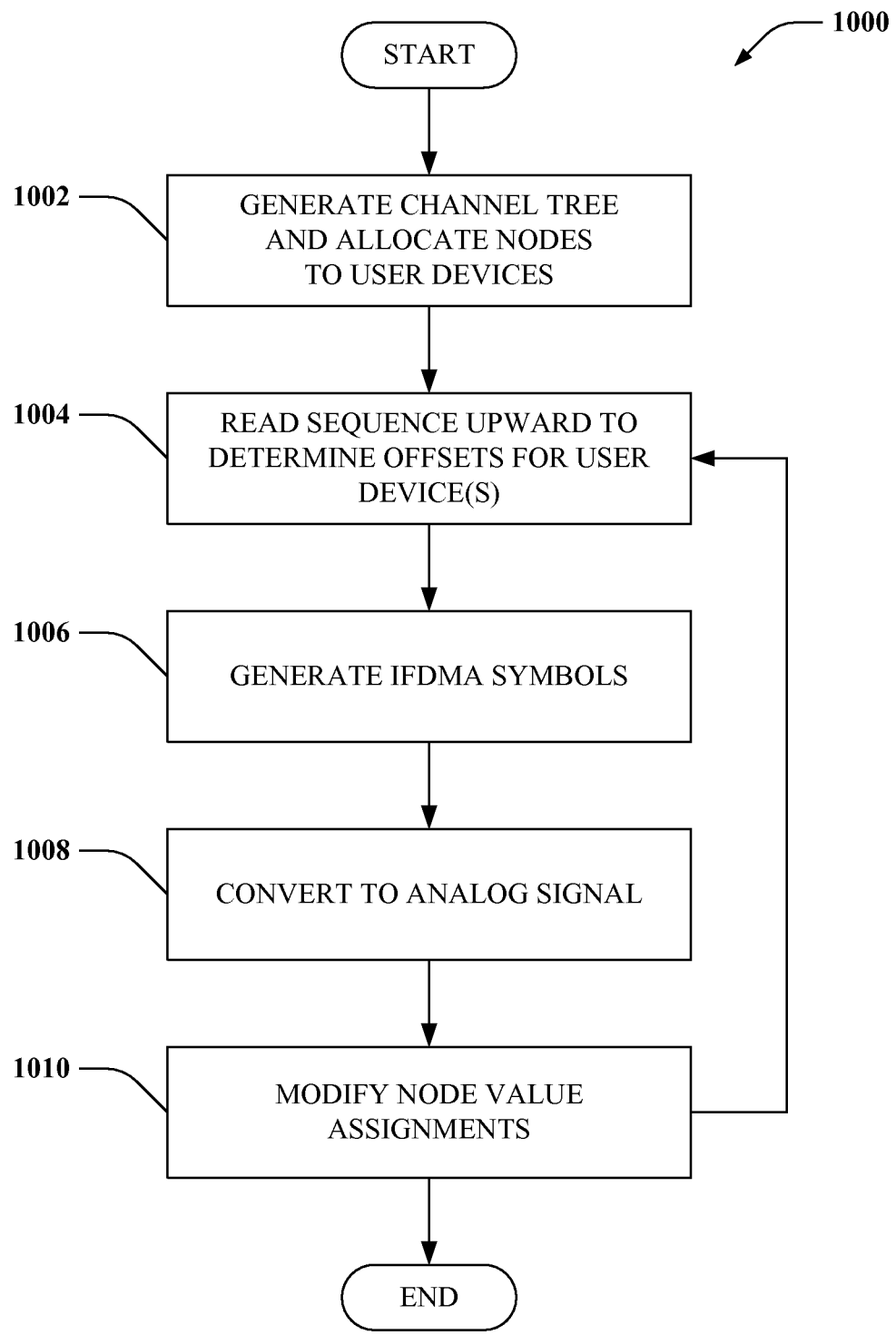
FIG. 10 is an illustration of a methodology for performing frequency hopping in conjunction with an IFDMA modulation protocol in accordance with one or more aspects.

FIG. 10 is an illustration of a methodology 1000 for performing frequency hopping in conjunction with an IFDMA modulation protocol in a wireless network communication environment. At 1002, a channel tree can be generated to facilitate frequency hopping of user offsets. The channel tree can have a root node, and each child node of the root node and/or other parent nodes in the tree can be assigned a node value (e.g., non-binary, binary, integer, etc.) In the case of a binary channel tree, described here for purposes of simplicity of illustration, each child node can have a binary value of 0 or 1, such that a parent node has a 0-child and a 1-child. Nodes can be allocated to user devices depending on subcarrier needs of the user devices, such that a user device requiring a relatively large number of subcarriers can be allocated a node closer to the root node than a user device requiring a relatively small number of subcarriers as detailed with regard to FIGS. 1-3. In certain aspects, the channel tree is pre-generated and the nodes, their relationship and values are stored in a memory in the form of a look-up table or the like.

At 1004, node sequences for user devices can be read upward from a user's allocated node to a first child node of the channel tree to determine a value for the user's offset, as detailed with regard to FIGS. 2 and 3. Information related to an offset identified at 1004 can be gleaned from a lookup table to facilitate assigning a specific subcarrier set to the user. For example, a user allocated a node having a value of 1 that depends from parent node with a value of 1, which in turn depends from a root node of the tree, can be assigned offset 3. Additionally, because the user-allocated node is three nodes from the top of the tree (inclusive of the allocated node and the root node, which is not read for purposes of offset U determination, but is counted for subcarrier number determination), it can be assigned a number of offset subcarriers equal to $N_{FFT}/4$. According to another example illustrating a binary channel tree, a user having an allocated node that is four nodes from the root node (including the root node) and has a lineage of all 1s (e.g., allocated node=1, parent=1, grandparent=1, root node) can be assigned offset 7 (e.g., binary 111), which can have a number of subcarriers equal to $N_{FFT}/8$, etc. According to yet another example, if the above lineage were 101 (e.g., allocated node=1, parent=0, grandparent=1, root node), the user can be assigned offset 5 having a number of subcarriers equal to $N_{FFT}/8$, etc.

At 1006, IFDMA symbols can be generated as detailed with regard to FIG. 9. Such symbols/signals can be converted to an analog signal at 1008 to facilitate transmission thereof. At 1010, node value assignments can be modified to facilitate frequency hopping to mitigate interference. For example, one or more child node value assignments in the channel tree can be altered in order to vary the offset actually associated with the node allocated to a user. For instance, in the above example, the user assigned offset 7 (e.g., 111 binary) comprising $N_{FFT}/8$ subcarriers can have its parent node pair altered at 1010 so that its node allocation lineage becomes 101 binary, which in turn can result in a reassignment of offset 5 to the user, and so on. According to the example, the user's node allocation can be static during node value assignment variation to ensure that the user retains a number of subcarriers equal to $N_{FFT}/8$. Additionally, user offset modification can be performed according to a predetermined schedule and/or according to a trigger event, such as upon transmission of every IFDMA symbol (symbol rate hopping), every few symbols (block hopping), etc.

It will be appreciated that although the foregoing examples describe a channel tree that utilizes binary node value assignments, non-binary values can be assigned to such nodes. Moreover, parent nodes can have any suitable number of child nodes associated therewith to facilitate allocating offsets to user devices and performing frequency hopping to mitigate interference.

Figure 11:
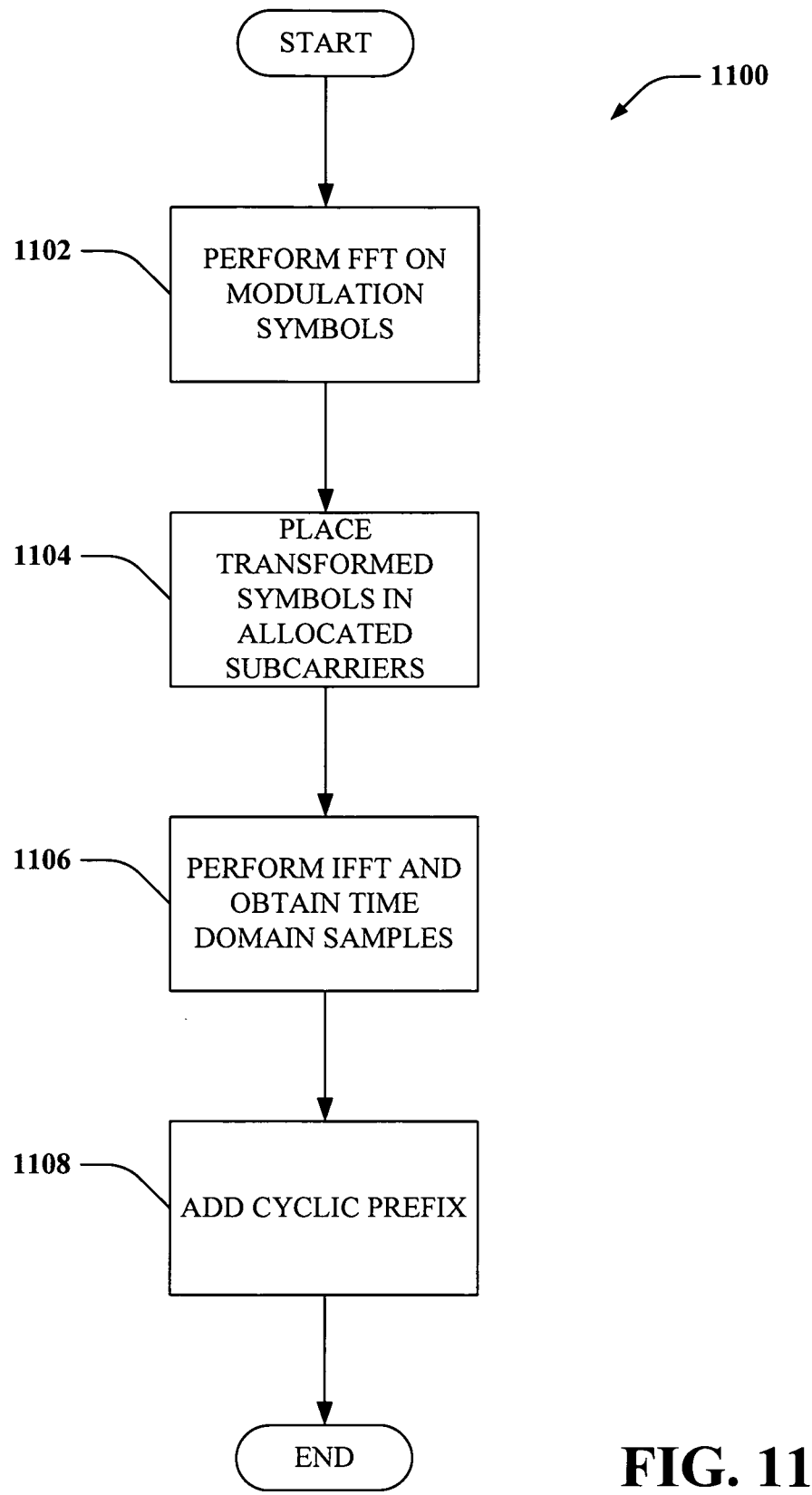
FIG. 11 illustrates a methodology for generating a signal using an LFDMA protocol, such as can be employed in conjunction with a frequency hopping protocol in accordance with one or more aspects.

FIG. 11 illustrates a methodology 1100 for generating a signal using an LFDMA protocol, such as can be employed in conjunction with a frequency hopping protocol to improve interference diversity. At 1102, a user device can initiate generation of a signal comprising N modulation symbols, for example, $[d_0\ d_1\ d_2\ \ldots\ d_{N-1}]$, by taking an N-point fast Fourier transform (FFT) of the N modulation symbols to obtain $[D_0\ D_1\ D_2\ \ldots\ D_{N-1}]$. The transformed symbols can then be placed in allocated subcarriers [U, U+1, ... U+N−1] at 1104. At 1106, an $N_{FFT}$-point inverse fast Fourier transform can be performed to obtain $N_{FFT}$ time domain samples. If desired, cyclic prefix can optionally be added to the symbol at 1108 by copying the last $N_{cp}$ time domain samples to the beginning of the symbol to obtain the LFDMA time domain symbol.

Method 1100 can be employed to generate an LFDMA communication signal in conjunction with a frequency hopping technique to mitigate inter-device and/or inter-sector interference. For example, frequency hopping can be performed upon each LFDMA symbol (e.g., utilizing a symbol rate hopping technique), upon every few LFDMA symbols (e.g., utilizing a block hopping technique, etc.

Figure 12:
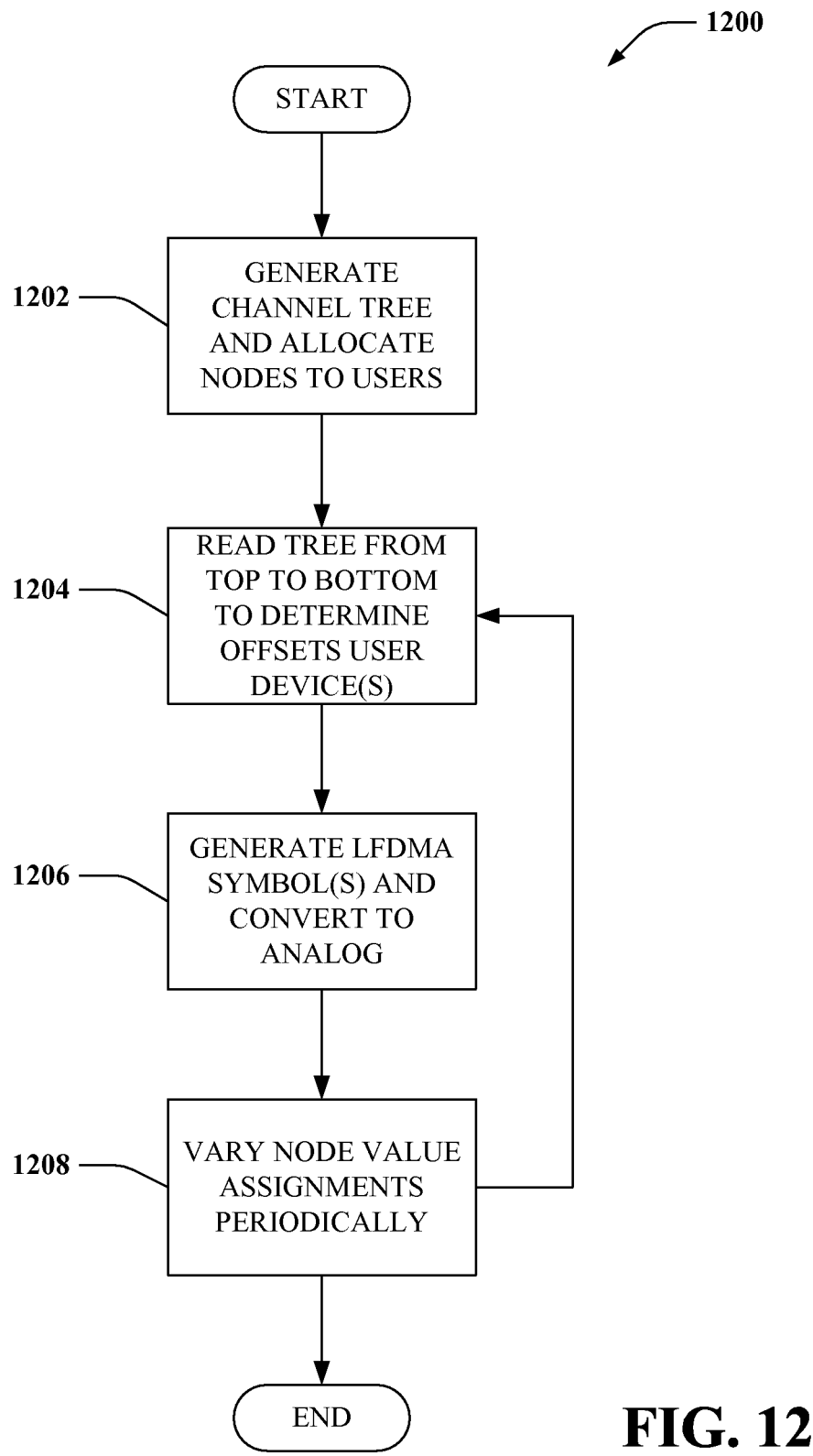
FIG. 12 illustrates a methodology for altering offset assignments for users in an LFDMA wireless communication environment in accordance with one or more aspects.

FIG. 12 illustrates a methodology 1200 for altering offset assignments for users in an LFDMA wireless communication environment. At 1202, channel tree can be generated to map user offset assignments, and nodes in the tree can be allocated to individual users in a wireless network. Node allocation can be performed in a manner similar to that described with regard to FIGS. 1, 2, and 3. In certain aspects, the channel tree is pre-generated and the nodes, their relationship and values are stored in a memory in the form of a look-up table or the like.

At 1204, the channel tree can be read from top to bottom to evaluate user offset assignments. Although the following example describes binary node value assignments for purposes of simplicity, it will be appreciated that non-binary values, and/or any other suitable values, can be assigned to nodes in the channel tree. For instance, a user allocated a node having a value of 1 that depends from parent node with a value of 0, which in turn depends from a root node of the tree, can be assigned offset 1. Additionally, because the user-allocated node is three nodes from the top of the tree (inclusive of the root node, which is not read for purposes of offset U determination, but is counted for subcarrier number determination), it can be assigned a number of offset subcarriers equal to $N_{FFT}/4$. According to another example, a user having an allocated node that is four nodes from the root node (including the root node) and has a lineage of 110 binary (e.g., allocated node=1, parent=1, grandparent=0, root node) can be assigned offset 6 (e.g., binary 110), which can have a number of subcarriers equal to $N_{FFT}/8$, etc. According to yet another example, if the above lineage were 101 (e.g., allocated node=1, parent=0, grandparent=1, root node), the user can be assigned offset 5 having a number of subcarriers equal to $N_{FFT}/8$, etc.

At 1206, an LFDMA signal can be generated as described with regard to FIG. 10 and converted to an analog signal for transmission. At 1208, node value assignments in the channel tree can be varied to facilitate frequency hopping, such as is described with regard to FIG. 11. If desired, user node allocation can be maintained (e.g., static) during node value assignment variation to maintain a constant distance from the root node of the offset tree, which in turn can facilitate ensuring that a precise number of subcarriers are assigned to a given user despite frequency hopping. According to a related aspect, a user whose frequency and/or subcarrier requirements have changed since a previous node allocation iteration can be dynamically reallocated to a node higher or lower on the channel tree based at least in part on information related to the user's resource requirements. In this manner, frequency hopping can be employed in a single carrier FDMA system, such as an LFDMA system to improve interference diversity and provide a more robust communication experience to users of the wireless network employing method 1200.

Figure 13:
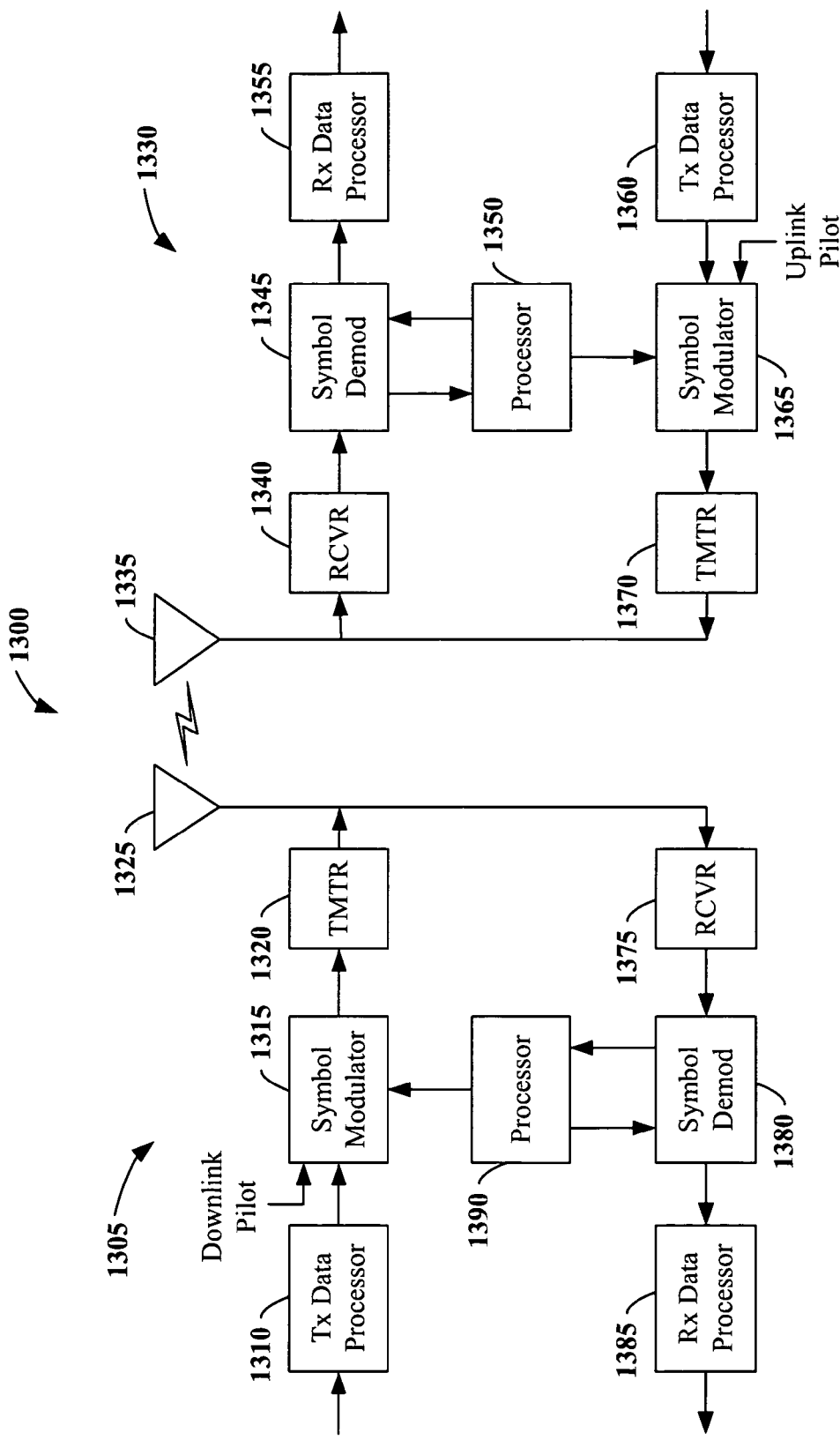
FIG. 13 is an illustration of a wireless network environment that can be employed in conjunction with the various systems and methods described herein in accordance with one or more aspects.

FIG. 13 shows an exemplary wireless communication system 1300. The wireless communication system 1300 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 1-8) and/or methods (FIGS. 9-12) described herein to facilitate wireless communication there between.

Referring now to FIG. 13, on a downlink, at access point 1305, a transmit (TX) data processor 1310 receives, formats, codes, interleaves, and modulates (or symbol maps) traffic data and provides modulation symbols ("data symbols"). A symbol modulator 1315 receives and processes the data symbols and pilot symbols and provides a stream of symbols. Symbol modulator 1315 multiplexes data and pilot symbols on the proper subbands, provides a signal value of zero for each unused subband, and obtains a set of N transmit symbols for the N subbands for each symbol period. Each transmit symbol may be a data symbol, a pilot symbol, or a signal value of zero. The pilot symbols may be sent continuously in each symbol period. It will be appreciated that the pilot symbols may be time division multiplexed (TDM), frequency division multiplexed (FDM), or code division multiplexed (CDM). Symbol modulator 1315 can transform each set of N transmit symbols to the time domain using an N-point IFFT to obtain a "transformed" symbol that contains N time-domain chips. Symbol modulator 1315 typically repeats a portion of each transformed symbol to obtain a corresponding symbol. The repeated portion is known as a cyclic prefix and is used to combat delay spread in the wireless channel.

A transmitter unit (TMTR) 1320 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1325 to the terminals. At terminal 1330, an antenna 1335 receives the downlink signal and provides a received signal to a receiver unit (RCVR) 1340. Receiver unit 1340 conditions (e.g., filters, amplifies, and frequency downconverts) the received signal and digitizes the conditioned signal to obtain samples. A symbol demodulator 1345 removes the cyclic prefix appended to each symbol, transforms each received transformed symbol to the frequency domain using an N-point FFT, obtains N received symbols for the N subbands for each symbol period, and provides received pilot symbols to a processor 1350 for channel estimation. Symbol demodulator 1345 further receives a frequency response estimate for the downlink from processor 1350, performs data demodulation on the received data symbols to obtain data symbol estimates (which are estimates of the transmitted data symbols), and provides the data symbol estimates to an RX data processor 1355, which demodulates (i.e., symbol demaps), deinterleaves, and decodes the data symbol estimates to recover the transmitted traffic data. The processing by symbol demodulator 1345 and RX data processor 1355 is complementary to the processing by symbol modulator 1315 and TX data processor 1310, respectively, at access point 1305.

On the uplink, a TX data processor 1360 processes traffic data and provides data symbols. A symbol modulator 1365 receives and multiplexes the data symbols with pilot symbols, performs symbol modulation, and provides a stream of symbols. The pilot symbols may be transmitted on subbands that have been assigned to terminal 1330 for pilot transmission, where the number of pilot subbands for the uplink may be the same or different from the number of pilot subbands for the downlink. A transmitter unit 1370 then receives and processes the stream of symbols to generate an uplink signal, which is transmitted by the antenna 1335 to the access point 1305.

At access point 1305, the uplink signal from terminal 1330 is received by the antenna 1325 and processed by a receiver unit 1375 to obtain samples. A symbol demodulator 1380 then processes the samples and provides received pilot symbols and data symbol estimates for the uplink. An RX data processor 1385 processes the data symbol estimates to recover the traffic data transmitted by terminal 1330. A processor 1390 performs channel estimation for each active terminal transmitting on the uplink. Multiple terminals may transmit pilot concurrently on the uplink on their respective assigned sets of pilot subbands, where the pilot subband sets may be interlaced.

Processors 1390 and 1350 direct (e.g., control, coordinate, manage, etc.) operation at access point 1305 and terminal 1330, respectively. Respective processors 1390 and 1350 can be associated with memory units (not shown) that store program codes and data. Processors 1390 and 1350 can also perform computations to derive frequency and impulse response estimates for the uplink and downlink, respectively.

In further aspects, it is possible to provide a multi-antenna transmitter. In such aspects, a demultiplexer may be provided at the input of TX data processor 1310, which generates multiple streams of data that are separately processed coded and modulated according to different subbands. Additionally, MIMO processing may be provided at the output of the TX data processor 1310 or symbol modulator 1315 so that multiple transmit streams are created prior to transmission but after data processing. At the receiver 1330 various techniques may be utilized to decode the signals from the multiple antennas.

For a multiple-access system (e.g., a frequency division multiple-access (FDMA) system, etc.), multiple terminals may transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1390 and 1350.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of generating single-carrier frequency division multiple-access (FDMA) symbols, comprising:
   obtaining a first subcarrier set assignment comprising a first set of contiguous subcarriers in a first time interval, the first set including a configurable number of subcarriers;
   generating at least one single-carrier FDMA symbol for transmission on the first set of contiguous subcarriers in the first time interval;
   obtaining a second subcarrier set assignment comprising a second set of contiguous subcarriers in a second time interval, the second set of contiguous subcarriers being varied from the first set of contiguous subcarriers according to a predetermined pattern, wherein a plurality of sets of contiguous subcarriers are flexibly defined in each time interval and assignable to different user devices; and
   generating at least one other single carrier FDMA symbol for transmission on the second set of contiguous subcarriers in the second time interval.

2. The method of claim 1, wherein the first and second sets of subcarriers are associated with different offsets in a predetermined set of offsets.

3. The method of claim 1, wherein the predetermined pattern is delineated by transmission of a number of frames.

4. The method of claim 1, wherein the predetermined pattern is delineated by expiration of a time period.

5. The method of claim 1, wherein each of the first and second subcarrier set assignments is used for transmission of a predetermined number of single-carrier FDMA symbols.

6. The method of claim 1, wherein the obtaining the first subcarrier set assignment comprises
   determining a channel tree including a plurality of nodes; and
   determining the first set of subcarriers based on a node in the channel tree assigned to a user device.

7. The method of claim 1, further comprising
   employing an interleaved frequency division multiple-access (IFDMA) protocol to generate at least one additional single carrier FDMA symbol.

8. The method of claim 1, further comprising
   determining the first set of subcarriers based on a channel tree comprising a plurality of nodes.

9. The method of claim 8, further comprising
   reading a path in the channel tree from a user device-assigned node upward to a root node of the tree.

10. The method of claim 9, further comprising
    assessing value of nodes in the path, beginning with the user device-assigned node and ending with a first child node of the root node.

11. The method of claim 10, further comprising
    performing a table lookup to identify the first set of subcarriers corresponding to the value of the path from the user device-assigned node to the first child node of the root node.

12. The method of claim 8, wherein node value assignments are periodically varied to alter subcarrier set assignments.

13. The method of claim 8, wherein each node in the channel tree is assigned a non-binary value.

14. The method of claim 8, wherein each node in the channel tree is assigned a binary value.

15. The method of claim 1, further comprising
    employing an interleaved frequency division multiple-access (IFDMA) protocol to generate one or more additional single-carrier FDMA symbols, and wherein subcarrier set assignments are varied upon transmission of each additional single-carrier FDMA symbol to enable channel estimation over an entire available bandwidth.

16. The method of claim 1, further comprising
    employing a localized frequency division multiple-access (LFDMA) protocol to generate the at least one single carrier FDMA symbol.

17. The method of claim 1, wherein subcarrier set assignments are varied as a function of sector identity, or time, or both.

18. The method of claim 1, wherein the first and second sets of subcarriers are constrained to a portion of system bandwidth.

19. The method of claim 1, wherein the first and second sets include equal number of subcarriers determined based on an allocated subcarrier set size among a plurality of supported subcarrier set sizes.

20. The method of claim 2, wherein the offsets of the first and second sets of subcarriers are determined based on the number of subcarriers in the first and second sets of subcarriers.

21. An apparatus comprising:
- means for obtaining a first subcarrier set assignment comprising a first set of contiguous subcarriers in a first time interval, the first set including a configurable number of subcarriers;
- means for generating at least one single-carrier frequency division multiple-access (FDMA) symbol for transmission on the first set of contiguous subcarriers in the first time interval;
- means for obtaining a second subcarrier set assignment comprising a second set of contiguous subcarriers in a second time interval, the second set of contiguous subcarriers being varied from the first set of contiguous subcarriers according to a predetermined pattern, wherein a plurality of sets of contiguous subcarriers are flexibly defined in each time interval and assignable to different user devices; and
- means for generating at least one other single carrier FDMA symbol for transmission on the second set of contiguous subcarriers in the second time interval.

22. The apparatus of claim 21, the means for obtaining the first subcarrier set assignment comprises
- means for determining the first set of subcarriers based on a node in a channel tree allocated to a user device.

23. The apparatus of claim 22, the means for determining the first set of subcarriers comprises
- means for reading a path in the channel tree from the allocated user node to a root node to determine a value for nodes in the path that identifies the first set of subcarriers assigned to the user device and the number of subcarriers to include in the first set.

24. The apparatus of claim 23, the means for obtaining the second subcarrier set assignment comprises means for altering values assigned to one or more nodes in the channel tree to vary the value of the path between the allocated user node and the root node.

25. The apparatus of claim 24, the means for obtaining the second subcarrier set assignment comprises means for determining the second set of subcarriers associated with the varied value of the path from the allocated user node to the root node.

26. The apparatus of claim 25, wherein node values are altered upon transmission of the at least one single carrier FDMA symbol.

27. The apparatus of claim 21, further comprising
- means for employing an interleaved frequency division multiple-access (IFDMA) protocol to generate one or more additional single-carrier FDMA symbols, and wherein subcarrier set assignments are varied upon transmission of each additional single-carrier FDMA symbol to enable channel estimation over an entire available bandwidth.

28. The apparatus of claim 21, further comprising
- means for employing a localized frequency division multiple-access (LFDMA) protocol to generate the at least one single carrier FDMA symbol.

29. A method of generating single-carrier frequency division multiple-access (FDMA) symbols, comprising:
- obtaining a first subcarrier set assignment comprising a first set of contiguous subcarriers in a first time interval, the first set including a configurable number of subcarriers;
- generating at least one single-carrier FDMA symbol at a user device for transmission on the first set of contiguous subcarriers in the first time interval;
- obtaining a second subcarrier set assignment comprising a second set of contiguous subcarriers in a second time interval, the second set of contiguous subcarriers being varied from the first set of contiguous subcarriers according to a predetermined pattern, wherein a plurality of sets of contiguous subcarriers are flexibly defined in each time interval and assignable to different user devices; and
- generating at least one other single carrier FDMA symbol at the user device for transmission on the second set of contiguous subcarriers in the second time interval.

30. The method of claim 29, wherein the obtaining the first subcarrier set assignment comprises
- determining a channel tree including a plurality of nodes; and
- determining the first set of subcarriers based on a node in the channel tree assigned to the user device.

31. The method of claim 29, wherein the predetermined pattern is delineated by transmission of a number of frames.

32. The method of claim 29, wherein the predetermined pattern is delineated by expiration of a time period.

33. The method of claim 29, wherein each of the first and second subcarrier set assignments is used for transmission of a predetermined number of single-carrier FDMA symbols.

34. An apparatus for wireless communication, comprising:
- at least one processor configured to obtain a first subcarrier set assignment comprising a first set of contiguous subcarriers in a first time interval, the first set including a configurable number of subcarriers, to generate at least one single-carrier frequency division multiple-access (FDMA) symbol for transmission on the first set of contiguous subcarriers in the first time interval, to obtain a second subcarrier set assignment comprising a second set of contiguous subcarriers in a second time interval, the second set of contiguous subcarriers being varied from the first set of contiguous subcarriers according to a predetermined pattern, wherein a plurality of sets of contiguous subcarriers are flexibly defined in each time interval and assignable to different user devices, and to generate at least one other single-carrier FDMA symbol for transmission on the second set of contiguous subcarriers in the second time interval.

35. The apparatus of claim 34, wherein the at least one processor is configured to use each of the first and second subcarrier set assignments for transmission of a predetermined number of single-carrier FDMA symbols.

36. The apparatus of claim 34, wherein the at least one processor is configured to determine a channel tree including a plurality of nodes, and to determine the first set of subcarriers based on a node in the channel tree assigned to a user device.

37. The apparatus of claim 34, wherein the first and second sets include equal number of subcarriers determined based on an allocated subcarrier set size among a plurality of supported subcarrier set sizes.

38. The apparatus of claim 34, wherein the first and second sets of subcarriers are constrained to a portion of system bandwidth.

39. The apparatus of claim 34, wherein the at least one processor is configured to generate one or more additional single-carrier FDMA symbols based on an interleaved frequency division multiple-access (IFDMA) protocol.

40. The apparatus of claim 34, wherein the at least one processor is configured to generate single-carrier FDMA symbols based on a localized frequency division multiple-access (LFDMA) protocol.

41. A non-transitory computer program medium encoded with a computer program, comprising:
- code for causing at least one computer to obtain a first subcarrier set assignment comprising a first set of contiguous subcarriers in a first time interval, the first set including a configurable number of subcarriers,
- code for causing the at least one computer to generate at least one single-carrier frequency division multiple-access (FDMA) symbol for transmission on the first set of contiguous subcarriers in the first time interval,
- code for causing the at least one computer to obtain a second subcarrier set assignment comprising a second set of contiguous subcarriers in a second time interval, the second set of contiguous subcarriers being varied from the first set of contiguous subcarriers according to a predetermined pattern, wherein a plurality of sets of contiguous subcarriers are flexibly defined in each time interval and assignable to different user devices, and
- code for causing the at least one computer to generate at least one other single-carrier FDMA symbol for transmission on the second set of contiguous subcarriers in the second time interval.

42. A method of receiving single-carrier frequency division multiple-access (FDMA) symbols, comprising:
- determining a first subcarrier set assignment comprising a first set of contiguous subcarriers in a first time interval, the first set including a configurable number of subcarriers;
- receiving at least one single-carrier FDMA symbol on the first set of contiguous subcarriers in the first time interval;
- determining a second subcarrier set assignment comprising a second set of contiguous subcarriers in a second time interval, the second set of contiguous subcarriers being varied from the first set of contiguous subcarriers according to a predetermined pattern, wherein a plurality of sets of contiguous subcarriers are flexibly defined in each time interval and assignable to different user devices; and
- receiving at least one other single-carrier FDMA symbol on the second set of contiguous subcarriers in the second time interval.

43. The method of claim 42, further comprising:
- selecting a subcarrier set size among a plurality of supported subcarrier set sizes to allocate to a user device, wherein the first and second sets include equal number of subcarriers determined by the selected subcarrier set size.

44. The method of claim 42, wherein each of the first and second subcarrier set assignments is valid for a predetermined number of single-carrier FDMA symbols.

45. The method of claim 42, wherein the first and second sets of subcarriers are associated with different offsets in a predetermined set of offsets, each offset being associated with a different starting subcarrier.

46. The method of claim 45, wherein the offsets of the first and second sets of subcarriers are determined based on the number of subcarriers in the first and second sets of subcarriers.

47. The method of claim 42, wherein the first and second sets of subcarriers are determined based on a channel tree including a plurality of nodes, each node being associated with a different set of subcarriers.

48. The method of claim 47, further comprising:
- assigning a node in the channel tree to a user device, wherein the first and second sets of subcarriers are determined based on the assigned node.

49. The method of claim 47, wherein the plurality of nodes in the channel tree are associated with at least two different subcarrier set sizes.

50. The method of claim 47, wherein the plurality of nodes in the channel tree are associated with equal subcarrier set size.

51. The method of claim 47, wherein nodes in the channel tree associated with equal subcarrier set size are further associated with different offsets.

52. The method of claim 47, wherein each node in the channel tree is associated with a unique combination of subcarrier set size and offset for the set of subcarriers associated with the node.

53. The method of claim 47, wherein the channel tree comprises multiple tiers, and wherein nodes in each tier are associated with different non-overlapping sets of subcarriers having different offsets.

54. The method of claim 42, further comprising:
- varying subcarrier set assignments as a function of sector identity, or time, or both.

55. The method of claim 42, further comprising:
- processing at least one additional single-carrier FDMA symbol in accordance with an interleaved frequency division multiple-access (IFDMA) protocol.

56. The method of claim 42, further comprising:
- processing the at least one single-carrier FDMA symbol in accordance with a localized frequency division multiple-access (LFDMA) protocol.

57. An apparatus for wireless communication, comprising:
- means for determining a first subcarrier set assignment comprising a first set of contiguous subcarriers in a first time interval, the first set including a configurable number of subcarriers;
- means for receiving at least one single-carrier frequency division multiple-access (FDMA) symbol on the first set of contiguous subcarriers in the first time interval;
- means for determining a second subcarrier set assignment comprising a second set of contiguous subcarriers in a second time interval, the second set of contiguous subcarriers being varied from the first set of contiguous subcarriers according to a predetermined pattern, wherein a plurality of sets of contiguous subcarriers are flexibly defined in each time interval and assignable to different user devices; and
- means for receiving at least one other single-carrier FDMA symbol on the second set of contiguous subcarriers in the second time interval.

58. The apparatus of claim 57, further comprising:
- means for selecting a subcarrier set size among a plurality of supported subcarrier set sizes to allocate to a user device, wherein the first and second sets include equal number of subcarriers determined by the selected subcarrier set size.

59. The apparatus of claim 57, further comprising:
- means for assigning a user device to a node in a channel tree, wherein the first and second sets of subcarriers are determined based on the assigned node.

60. An apparatus for wireless communication, comprising:
- at least one processor configured to determine a first subcarrier set assignment comprising a first set of contiguous subcarriers in a first time interval, the first set including a configurable number of subcarriers, to receive at least one single-carrier frequency division multiple-access (FDMA) symbol on the first set of contiguous subcarriers in the first time interval, to determine a second subcarrier set assignment comprising a second set of contiguous subcarriers in a second time interval, the second set of contiguous subcarriers being varied from the first set of contiguous subcarriers according to a predetermined pattern, wherein a plurality of sets of contiguous subcarriers are flexibly defined in each time interval and assignable to different user devices, and to receive at least one other single-carrier FDMA symbol on the second set of contiguous subcarriers in the second time interval.

61. The apparatus of claim 60, wherein the at least one processor is configured to select a subcarrier set size among a plurality of supported subcarrier set sizes to allocate to a user device, and wherein the first and second sets include equal number of subcarriers determined by the selected subcarrier set size.

62. The apparatus of claim 60, wherein the at least one processor is configured to assign a user device to a node in a channel tree, and wherein the first and second sets of subcarriers are determined based on the assigned node.

63. A non-transitory computer program medium encoded with a computer program, comprising:
code for causing at least one computer to determine a first subcarrier set assignment comprising a first set of contiguous subcarriers, the first set including a configurable number of subcarriers in a first time interval,
code for causing the at least one computer to receive at least one single-carrier frequency division multiple-access (FDMA) symbol on the first set of contiguous subcarriers in the first time interval,
code for causing the at least one computer to determine a second subcarrier set assignment comprising a second set of contiguous subcarriers in a second time interval, the second set of contiguous subcarriers being varied from the first set of contiguous subcarriers according to a predetermined pattern, wherein a plurality of sets of contiguous subcarriers are flexibly defined in each time interval and assignable to different user devices, and
code for causing the at least one computer to receive at least one other single-carrier FDMA symbol on the second set of contiguous subcarriers in the second time interval.

64. A method of generating single-carrier frequency division multiple-access (FDMA) symbols, comprising:
obtaining an assignment of a set of subcarriers in a first time interval, the set including a configurable number of subcarriers, wherein a plurality of sets of subcarriers are flexibly defined in the first time interval and assignable to different user devices;
mapping pilot symbols to the set of subcarriers; and
generating at least one single-carrier FDMA symbol with the pilot symbols mapped to the set of subcarriers.

65. The method of claim 64, further comprising:
obtaining a second assignment of a second set of subcarriers in a second time interval, the second set of subcarriers being varied from the first set of subcarriers according to a predetermined pattern;
mapping pilot symbols to the second set of subcarriers; and
generating at least one other single-carrier FDMA symbol with the pilot symbols mapped to the second set of subcarriers.

66. The method of claim 64, wherein the set of subcarriers includes contiguous subcarriers.

67. The method of claim 64, wherein the set of subcarriers includes evenly-spaced subcarriers.

68. The method of claim 67, wherein the plurality of sets of subcarriers are assigned to a plurality of user devices for pilot transmission, the plurality of sets of subcarriers being interlaced.

69. The method of claim 64, wherein the set of subcarriers is determined based on a channel tree.

70. An apparatus for wireless communication, comprising:
means for obtaining an assignment of a set of subcarriers in a first time interval, the set including a configurable number of subcarriers, wherein a plurality of sets of subcarriers are flexibly defined in the first time interval and assignable to different user devices;
means for mapping pilot symbols to the set of subcarriers; and
means for generating at least one single-carrier frequency division multiple-access (FDMA) symbol with the pilot symbols mapped to the set of subcarriers.

71. The apparatus of claim 70, further comprising:
means for obtaining a second assignment of a second set of subcarriers in a second time interval, the second set of subcarriers being varied from the first set of subcarriers according to a predetermined pattern;
means for mapping pilot symbols to the second set of subcarriers; and
means for generating at least one other single-carrier FDMA symbol with the pilot symbols mapped to the second set of subcarriers.

72. The apparatus of claim 70, wherein the set of subcarriers includes contiguous subcarriers.

73. The apparatus of claim 70, wherein the set of subcarriers includes evenly-spaced subcarriers.

74. The apparatus of claim 73, wherein the plurality of sets of subcarriers are assigned to a plurality of user devices for pilot transmission, the plurality of sets of subcarriers being interlaced.

75. The apparatus of claim 70, wherein the set of subcarriers is determined based on a channel tree.

76. An apparatus for wireless communication, comprising:
at least one processor configured to obtain an assignment of a set of subcarriers in a first time interval, the set including a configurable number of subcarriers, wherein a plurality of sets of subcarriers are flexibly defined in the first time interval and assignable to different user devices, to map pilot symbols to the set of subcarriers, and to generate at least one single-carrier frequency division multiple-access (FDMA) symbol with the pilot symbols mapped to the set of subcarriers.

77. The apparatus of claim 76, wherein the at least one processor is configured to obtain a second assignment of a second set of subcarriers in a second time interval, the second set of subcarriers being varied from the first set of subcarriers according to a predetermined pattern, to map pilot symbols to the second set of subcarriers, and to generate at least one other single-carrier FDMA symbol with the pilot symbols mapped to the second set of subcarriers.

78. The apparatus of claim 76, wherein the set of subcarriers includes contiguous subcarriers.

79. The apparatus of claim 76, wherein the set of subcarriers includes evenly-spaced subcarriers.

80. The apparatus of claim 79, wherein the plurality of sets of subcarriers are assigned to a plurality of user devices for pilot transmission, the plurality of sets of subcarriers being interlaced.

81. The apparatus of claim 76, wherein the set of subcarriers is determined based on a channel tree.

82. A non-transitory computer program medium encoded with a computer program, comprising:
code for causing at least one computer to obtain an assignment of a set of subcarriers in a first time interval, the set including a configurable number of subcarriers, wherein a plurality of sets of subcarriers are flexibly defined in the first time interval and assignable to different user devices, code for causing the at least one computer to map pilot symbols to the set of subcarriers, and code for causing the at least one computer to generate at least one single-carrier frequency division multiple-access (FDMA) symbol with the pilot symbols mapped to the set of subcarriers.

\* \* \* \* \*